United States Patent
Hiwatari et al.

(10) Patent No.: US 12,283,899 B2
(45) Date of Patent: Apr. 22, 2025

(54) POWER CONVERSION DEVICE

(71) Applicants: Mitsubishi Electric Corporation, Tokyo (JP); National University Corporation Nagaoka University of Technology, Nagaoka (JP)

(72) Inventors: Tenjiro Hiwatari, Tokyo (JP); Sota Sano, Tokyo (JP); Akira Satake, Tokyo (JP); Kiyoshi Ohishi, Nagaoka (JP); Yuki Yokokura, Nagaoka (JP); Yuto Kobayashi, Nagaoka (JP)

(73) Assignees: MITSUBISHI ELECTRIC CORPORATION, Tokyo (JP); NATIONAL UNIVERSITY CORPORATION MAGAOKA UNIVERSITY OF TECHNOLOGY, Nagaoka (JP)

( * ) Notice: Subject to any disclaimer, the term of this patent is extended or adjusted under 35 U.S.C. 154(b) by 217 days.

(21) Appl. No.: 18/033,586

(22) PCT Filed: Nov. 18, 2021

(86) PCT No.: PCT/JP2021/042379
§ 371 (c)(1),
(2) Date: Apr. 25, 2023

(87) PCT Pub. No.: WO2022/107838
PCT Pub. Date: May 27, 2022

(65) Prior Publication Data
US 2023/0402942 A1 Dec. 14, 2023

(30) Foreign Application Priority Data

Nov. 20, 2020 (WO) .................. PCT/JP2020/043320
Nov. 20, 2020 (WO) .................. PCT/JP2020/043321

(51) Int. Cl.
  H02M 7/5395 (2006.01)
  H02M 1/00 (2006.01)
  H02P 27/08 (2006.01)

(52) U.S. Cl.
  CPC ....... *H02M 7/5395* (2013.01); *H02M 1/0058* (2021.05); *H02P 27/08* (2013.01)

(58) Field of Classification Search
  CPC .... H02M 7/5395; H02M 1/0058; H02P 27/08
  See application file for complete search history.

(56) References Cited

U.S. PATENT DOCUMENTS 4,477,763 A 10/1984 Asano et al.
11,581,839 B2 * 2/2023 Hongyo .................. H02P 27/06
(Continued)

FOREIGN PATENT DOCUMENTS

| JP | 59-025592 A | 2/1984 |
| JP | 11-089244 A | 3/1999 |
| JP | 2011-152038 A | 8/2011 |

OTHER PUBLICATIONS

International Search Report and Written Opinion mailed on Jan. 11, 2022, received for PCT Application PCT/JP2021/042379, filed on Nov. 18, 2021, 8 pages including English Translation.

*Primary Examiner* — Adolf D Berhane
(74) *Attorney, Agent, or Firm* — XSENSUS LLP

(57) ABSTRACT

A power conversion device comprises: power conversion circuitry for converting DC power into AC power and supplying it into a load according to a switching state quantity defined by combinations among switching parameters of switching devices; a voltage output calculation device for calculating a voltage output value on the power conversion circuitry, based on the switching state quantity; an integration value calculation device for acquiring a voltage reference integration value and a voltage output integration value by integrating a voltage reference value (Continued)

and the calculated voltage output value; a switching update-determination unit for outputting an update signal of the switching state quantity, based on the voltage reference integration value, its allowance value, and the voltage output integration value; and a switching determination table for determining a switching state quantity of the switching devices, based on the voltage reference integration value, the voltage output integration value and the update signal.

20 Claims, 47 Drawing Sheets

(56) References Cited

U.S. PATENT DOCUMENTS

2011/0181225 A1     7/2011   Geyer
2024/0266984 A1*   8/2024   Tanabe .................. H02P 29/032

* cited by examiner

FIG. 3

| SWITCHING STATE INDEX | PHASE-u: SWu | | PHASE-v: SWv | | PHASE-w: SWw | |
|---|---|---|---|---|---|---|
| | Q1 | Q2 | Q3 | Q4 | Q5 | Q6 |
| SW0 | 0 | 1 | 0 | 1 | 0 | 1 |
| SW1 | 1 | 0 | 0 | 1 | 0 | 1 |
| SW2 | 1 | 0 | 1 | 0 | 0 | 1 |
| SW3 | 0 | 1 | 1 | 0 | 0 | 1 |
| SW4 | 0 | 1 | 1 | 0 | 1 | 0 |
| SW5 | 0 | 1 | 0 | 1 | 1 | 0 |
| SW6 | 1 | 0 | 0 | 1 | 1 | 0 |
| SW7 | 1 | 0 | 1 | 0 | 1 | 0 |
| SW8 | 0 | 0 | 0 | 0 | 0 | 0 |

FIG. 4

| SWITCHING STATE INDEX | Vu | Vv | Vw |
|---|---|---|---|
| SW0 | $-V_{dc}/2$ | $-V_{dc}/2$ | $-V_{dc}/2$ |
| SW1 | $V_{dc}/2$ | $-V_{dc}/2$ | $-V_{dc}/2$ |
| SW2 | $V_{dc}/2$ | $V_{dc}/2$ | $-V_{dc}/2$ |
| SW3 | $-V_{dc}/2$ | $V_{dc}/2$ | $-V_{dc}/2$ |
| SW4 | $-V_{dc}/2$ | $V_{dc}/2$ | $V_{dc}/2$ |
| SW5 | $-V_{dc}/2$ | $-V_{dc}/2$ | $V_{dc}/2$ |
| SW6 | $V_{dc}/2$ | $-V_{dc}/2$ | $V_{dc}/2$ |
| SW7 | $V_{dc}/2$ | $V_{dc}/2$ | $V_{dc}/2$ |
| SW8 | 0 | 0 | 0 |

| SWITCHING STATE INDEX | PHASE-u: SWu | | PHASE-v: SWv | | PHASE-w: SWw | |
|---|---|---|---|---|---|---|
| | Q1 | Q2 | Q3 | Q4 | Q5 | Q6 |
| SW0 | 0 | 1 | 0 | 1 | 0 | 1 |
| SW1 | 1 | 0 | 0 | 1 | 0 | 1 |
| SW2 | 1 | 0 | 1 | 0 | 0 | 1 |
| SW3 | 0 | 1 | 1 | 0 | 0 | 1 |
| SW4 | 0 | 1 | 1 | 0 | 1 | 0 |
| SW5 | 0 | 1 | 0 | 1 | 1 | 0 |
| SW6 | 1 | 0 | 0 | 1 | 1 | 0 |
| SW7 | 1 | 0 | 1 | 0 | 1 | 0 |
| SW8 | 0 | 0 | 0 | 0 | 0 | 0 |

POWER CONVERSION DEVICE

CROSS-REFERENCE TO RELATED APPLICATIONS

The present application is based on PCT filing PCT/JP2021/042379, filed on Nov. 18, 2021, which claims priority to PCT Filings PCT/JP2020/043320, and PCT/JP2020/043321, both of which are filed on Nov. 20, 2020, the entire contents of each are incorporated herein by reference.

TECHNICAL FIELD

The disclosure of the present application relates to an electrical power conversion device.

BACKGROUND ART

In an electrical power conversion device using a PWM (pulse-width modulation, or Pulse Width Modulation) scheme, a triangular wave carrier comparison PWM scheme is in general used in which a triangular wave carrier and a voltage reference value are compared with each other so that switching states of respective switching devices are determined; however, because an output voltage is made of rectangular pulses simulating a sinusoidal wave, harmonics are caused in addition to the sinusoidal wave being a fundamental wave, so that there results in causing pulsation (which is also referred to as a "ripple") in an electric current flowing into a rotating electric machine, and/or that in torque produced thereby.

For dealing therewith, in order to resolve the aforementioned problem, a scheme of directly determining switching states of respective switching devices in an electric power conversion unit (direct switching control scheme) is proposed. As one of the direct switching control schemes, a direct torque control has been known. The direct torque control is a scheme in which, with respect to an instruction or reference vale of torque of a rotating electric machine and to that of magnetic flux thereof, permissible or allowable vales are set, and the switching states are changed over at a time when these reference values exceed the allowable vales. Because the switching states are determined so that pulsation of magnetic flux and that of torque are suppressed, the pulsation of an electric current flowing into the rotating electric machine and/or that of torque produced thereby can be reduced with respect to the aforementioned PWM scheme. In addition, by setting the allowable vales larger, the number of transitions of the switching states of respective switching devices in an electric power conversion unit is lowered, so that it is also possible to reduce switching losses caused at times in transitions of the switching states.

In addition, as a direct switching control scheme in which the direct torque control described above is improved, a model predictive control is known. The model predictive control is a scheme in which an electric current flowing into a rotating electric machine, torque produced thereby and/or magnetic flux produced thereby in accordance with all-candidate switching states in an electric power conversion unit are calculated based on a state equation(s) of the rotating electric machine, and the switching states are determined on the basis of these values having been calculated. According to the above, switching states are controlled on the basis of a prediction value(s) of a drive state of the rotating electric machine, whereby, in comparison with the aforementioned PWM scheme and with the aforementioned direct torque control, a time constant of the electric current, that of the torque and that of the magnetic flux in a transient state can be enhanced, and pulsation of an electric current and/or that of torque in a steady state can be reduced, so that the number of transitions of the switching states can also be lowered, and switching losses can also be made smaller.

However, in order to calculate a value(s) of the rotating electric machine in accordance with all-candidate switching states, it is necessary to calculate a state equation(s) of the rotating electric machine, so that the amount of calculations becomes significantly large. In addition, there are many parameters used for the rotating electric machine, so that an influence of parameter errors may easily be encountered, which has caused shortcomings.

For example, in a conventional technology stated in Patent Document 1 described below, considerations have been underway for a direct switching control scheme which is based on a value where a voltage value is integrated. The aforementioned control scheme is a control scheme in which an error between a voltage instruction value vector and a voltage output vector is integrated, and, when the integration value exceeds a boundary circle being set on the voltage instruction value vector, a voltage output vector in a direction nearest to the center of the boundary circle is outputted. For this reason, switching states are determined so that a voltage integration error between the voltage instruction value vector and the voltage output vector remains in the boundary circle for long; and so, while curbing the number of switching transitions of switching devices in an electric power conversion unit at a minimum in their requirements, an output voltage is controlled in the shape of a sinusoidal wave.

In addition, in a conventional technology stated in Patent Document 2 described below, considerations have been underway for a direct switching control scheme which is based on magnetic flux of a rotating electric machine. The aforementioned control scheme is a control scheme in which reference rotating magnetic flux of magnetic flux of the rotating electric machine is set in advance, and a zero voltage vector(s) and a nonzero voltage vector(s) are appropriately outputted so that the deviation of magnetic flux being calculated stays within an allowable range being set on the reference rotating magnetic flux. For this reason, the control is performed so that magnetic flux of the rotating electric machine follows along the reference rotating magnetic flux being set by the circumference; and so, suppressed are pulsation of iron losses, that of copper losses and that of torque which are originated in a harmonic current(s) flowing into a rotating electric machine.

Moreover, in a conventional technology stated in Patent Document 3 described below, considerations have been underway for a direct switching control scheme by means of a direct torque control which is based on a model predictive control. This control scheme performs the prediction calculation on torque of a rotating electric machine and on stator's magnetic flux thereof in an interval where they are defined based on a state equation(s) of the rotating electric machine, and searches a switching pattern (combinations of a plurality of switching states) so that, in a predicted interval, the number of switching transitions of each phase's switching devices becomes the smallest while the torque and the stator's magnetic flux satisfy desired allowable or allowance values. For this reason, in a steady state, the number of switching transitions becomes at the irreducible minimum under the conditions of a ripple of desired torque and of that of stator's desired magnetic flux. In addition, in a transient state of a step instruction related to torque or the like, switching states are selected by which a torque instruction is followed up to a most extent within a prediction value of torque of the rotating electric machine and that of stator's magnetic flux thereof; and thus, a high-speed torque response time can be accomplished.

RELATED ART DOCUMENTS

Patent Documents

[Patent Document 1] Japanese Patent Laid-Open No. H11-89244
[Patent Document 2] Japanese Patent Laid-Open No. S59-025592
[Patent Document 3] Japanese Patent Laid-Open No. 2011-152038

SUMMARY OF THE INVENTION

Problems to be Solved by the Invention

In a direct switching control scheme which is based on a value where a voltage value is integrated as stated in Patent Document 1, switching states are changed over so that the number of switching transitions is lowered, when an integration value of an error between a voltage instruction value vector and a voltage output vector exceeds a boundary circle being set on the voltage instruction value vector. However, because a voltage output vector in a direction nearest to the center of the boundary circle is always selected, a zero voltage vector(s) cannot be actively selected, so that there exists a limitation(s) in an effect to lower the number where switching states perform transitions.

In addition, in a direct switching control scheme which is based on magnetic flux of a rotating electric machine as stated in Patent Document 2, a zero voltage vector(s) and a nonzero voltage vector(s) are appropriately selected so that magnetic flux of the rotating electric machine stays within a circular allowable range being set on reference rotating magnetic flux. For this reason, in comparison with Patent Document 1, it is easier to lower the number of switching transitions by selecting the zero voltage vector(s); however, there arises the necessity to change over a voltage vector(s) being selected for every region or range in which magnetic flux of a rotating electric machine is included, so that a table for determining switching states becomes complicated. In addition, because determination is performed whether or not a voltage vector(s) is changed over on the basis of the circular allowable range being set with respect to a vector(s) of reference rotating magnetic flux, the amount of calculations at those times of determining the changeovers becomes in large numbers.

Moreover, in a direct torque control which is based on a model predictive control as stated in Patent Document 3, a prediction value of torque of a rotating electric machine and that of stator's magnetic flux thereof each being a control target are calculated, so that switching states are determined; and so, in comparison with the control of Patent Document 1 and that of Patent Document 2, switching losses in a steady state can be reduced while maintaining a high-speed torque response time in a transient state; however, because the switching states are calculated based on the state equation(s) of a rotating electric machine, a velocity of the rotating electric machine and a value of an electric current flowing into the rotating electric machine are used, in addition to the usage of many parameters of the rotating electric machine, so that there results in degrading a reduction effect of switching losses when an error is caused in each parameter.

The present disclosure in the application concerned has been directed at disclosing technologies for solving those problems as described above, an object of the disclosure is to provide an electrical power conversion device whose switching state quantity is determined on the basis of a value in which a voltage value of each phase of multi-phase alternating currents acquired from a switching state quantity in an electric power conversion unit is integrated and on that of a value in which a voltage instruction or reference value is integrated, whereby an inexpensive microcomputer can also be mounted on the power conversion device, and switching losses in its electric power conversion unit can be reduced.

Means for Solving the Problems

An electrical power conversion device disclosed in the disclosure of the application concerned is a power conversion device which comprises:
  an electric power conversion unit including a plurality of switching devices, for converting direct-current power into alternating-current power in accordance with a switching state quantity of the plurality of switching devices each, and for supplying the alternating-current power into a load;
  a voltage output calculation unit for calculating a voltage output value on a multi-phase alternating current supplied from the electric power conversion unit into the load, on the basis of a switching state quantity in the electric power conversion unit;
  an integration value calculation unit for acquiring through calculation a voltage reference integration value and a voltage output integration value by integrating a voltage reference value on the multi-phase alternating current supplied from the electric power conversion unit and a voltage output value on a multi-phase alternating current calculated by the voltage output calculation unit, respectively; and
  a switching determination unit for determining a switching state quantity in the electric power conversion unit by using the voltage reference integration value and the voltage output integration value, and for outputting the switching state quantity being determined.

Effects of the Invention

According to the power conversion device disclosed in the disclosure of the application concerned, it becomes possible to provide a power conversion device whose switching state quantity is determined on the basis of a value in which a voltage value of each phase of multi-phase alternating currents acquired from a switching state quantity in an electric power conversion unit is integrated and on that of a value in which a voltage instruction or reference value is integrated, whereby an inexpensive microcomputer can also be mounted on the power conversion device, and switching losses in its electric power conversion unit can be reduced.

BRIEF DESCRIPTION OF DRAWINGS

FIG. 3 is a diagram showing all-candidate switching states in an electric power conversion unit according to Embodiment 1;

FIG. 4 is a diagram showing the relationships between switching state indexes each and a respective multi-phase voltage output value Vout in the electric power conversion unit according to Embodiment 1;

EMBODIMENTS FOR CARRYING OUT THE INVENTION

Embodiment 1

Figure 1:
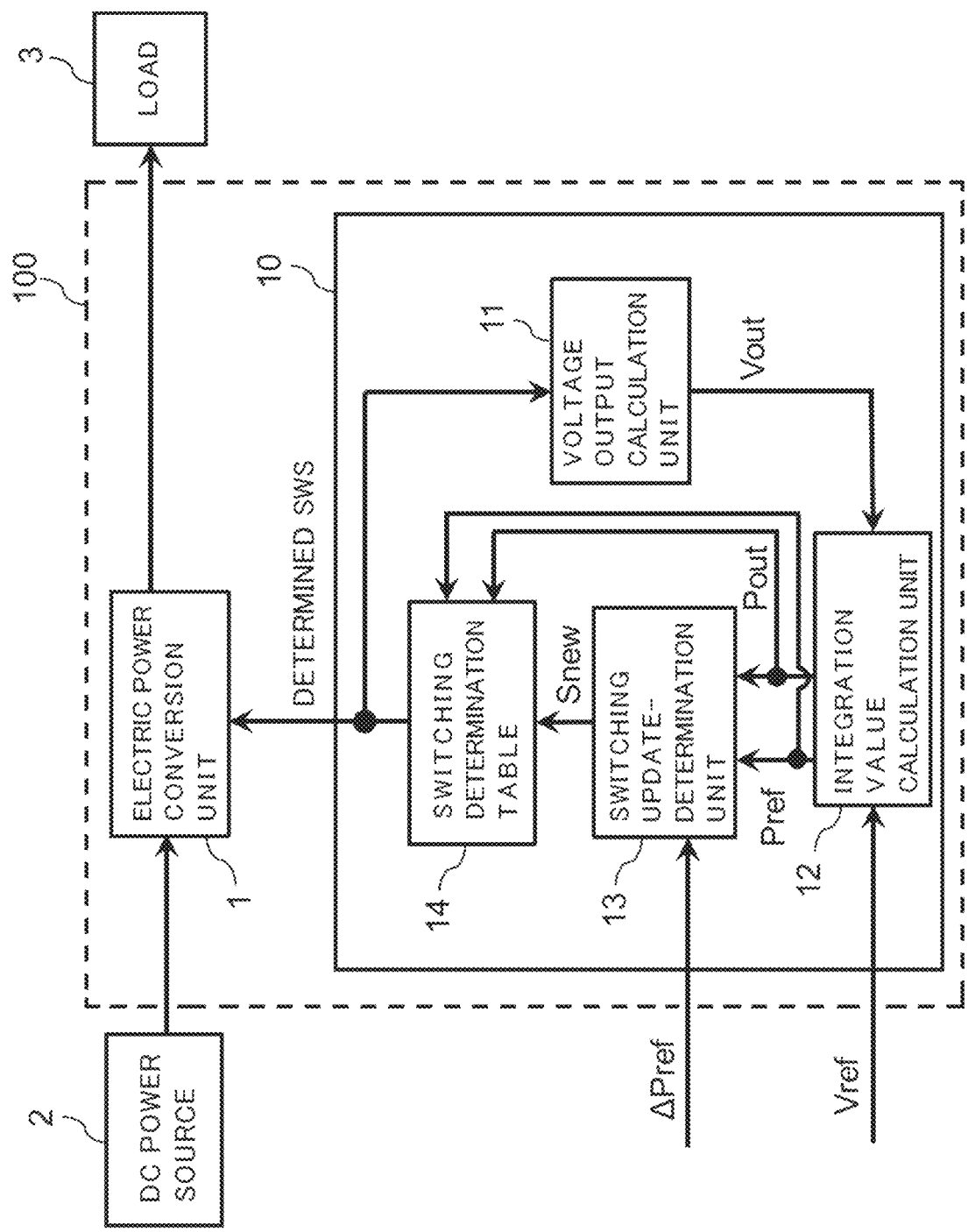
FIG. 1 is a block diagram illustrating a configuration of an electrical power conversion device according to Embodiment 1.

The disclosure of the present application relates to an electrical power conversion device for converting direct-current (DC) power into alternating-current (AC) power, and, in particular, relates to the electrical power conversion device for performing the controls on switching states of a plurality of switching devices in an electric power conversion unit for supplying electric power into a rotating electric machine. Hereinafter, the explanation will be made referring to the drawings for the electrical power conversion device according to Embodiment 1 disclosed in the disclosure of the application concerned.

FIG. 1 is a block diagram illustrating a configuration of the power conversion device 100 according to Embodiment 1. As illustrated in FIG. 1, the power conversion device 100 comprises an electric power conversion unit 1 being main circuitry of the power conversion device 100, and a control device 10 for controlling an output(s) of the electric power conversion unit 1; and the power conversion device 100 is connected between a direct-current (DC) power source 2 and a load 3.

The electric power conversion unit 1 converts DC power from the DC power source 2 into AC power which is supplied into the load 3, and drives the load 3. The load 3 is driven by means of the AC power supplied from the electric power conversion unit 1. Note that, as for the load 3, a transformer or an electromagnetic reactor, or such an electric motor of various kinds as an induction motor, a synchronous motor and the like can be used, for example.

The control device 10 comprises: a voltage output calculation unit 11 for calculating, on the basis of a switching state quantity SWS of the plurality of switching devices in the electric power conversion unit 1, a multi-phase voltage output value Vout to output it from the electric power conversion unit 1 into the load 3; an integration value calculation unit 12 for calculating a voltage instruction or reference integration value Pref and a voltage output integration value Pout by integrating a multi-phase voltage instruction or reference value Vref, and the multi-phase voltage output value Vout, respectively; a switching update-determination unit 13 for calculating an update signal Snew for determining whether or not a switching state quantity SWS of the plurality of switching devices in the electric power conversion unit 1 is to be updated, on the basis of the voltage instruction or reference integration value Pref, on that of the voltage output integration value Pout and on that of an permissible or allowable reference range ΔPref (here, the permissible or allowable reference range is not necessarily limited to be determined only from one value, but may be determined from a tolerance region or range having a spread of it; hereinafter, an "allowable reference range" ΔPref is referred to in order to include both of these meanings) to be set on the voltage reference integration value Pref; and a switching determination table 14 for determining a switching state quantity SWS of the plurality of switching devices in the electric power conversion unit 1, on the basis of the voltage reference integration value Pref, on that of the voltage output integration value Pout and on that of the update signal Snew. Because the switching state quantity SWS in the electric power conversion unit 1 is determined by means of the switching update-determination unit 13 and the switching determination table 14, both of which correspond to a switching determination unit 300 as will be described later.

The switching update-determination unit 13 determines whether or not a switching state quantity SWS of the plurality of switching devices in the electric power conversion unit 1 is to be updated, on the basis of a voltage allowance value Pdelta where an allowable reference range ΔPref is set on a voltage reference integration value Pref, and on that of a voltage output integration value Pout. For example, when a switching state quantity SWS in the electric power conversion unit 1 is to be updated, numeral "1" is outputted as an update signal Snew, whereas, when the switching state quantity SWS is not to be updated, numeral "0" is outputted as the update signal Snew. The explanation will be made later in detail for a calculation method of the update signal Snew.

The switching determination table 14 determines a switching state quantity SWS in the electric power conversion unit 1, on the basis of the voltage reference integration value Pref, on that of the voltage output integration value Pout and on that of the update signal Snew. The switching state quantity having been determined is thereafter referred to as a "determined SWS." For example, when an update signal Snew is at "1," a switching state quantity SWS in the electric power conversion unit 1 is updated, whereas, when the update signal Snew is at "0," a switching state quantity SWS in the electric power conversion unit 1 is not updated, namely, the switching state quantity SWS is maintained as it is. The explanation will be made later in detail for the switching determination table 14.

Figure 2:
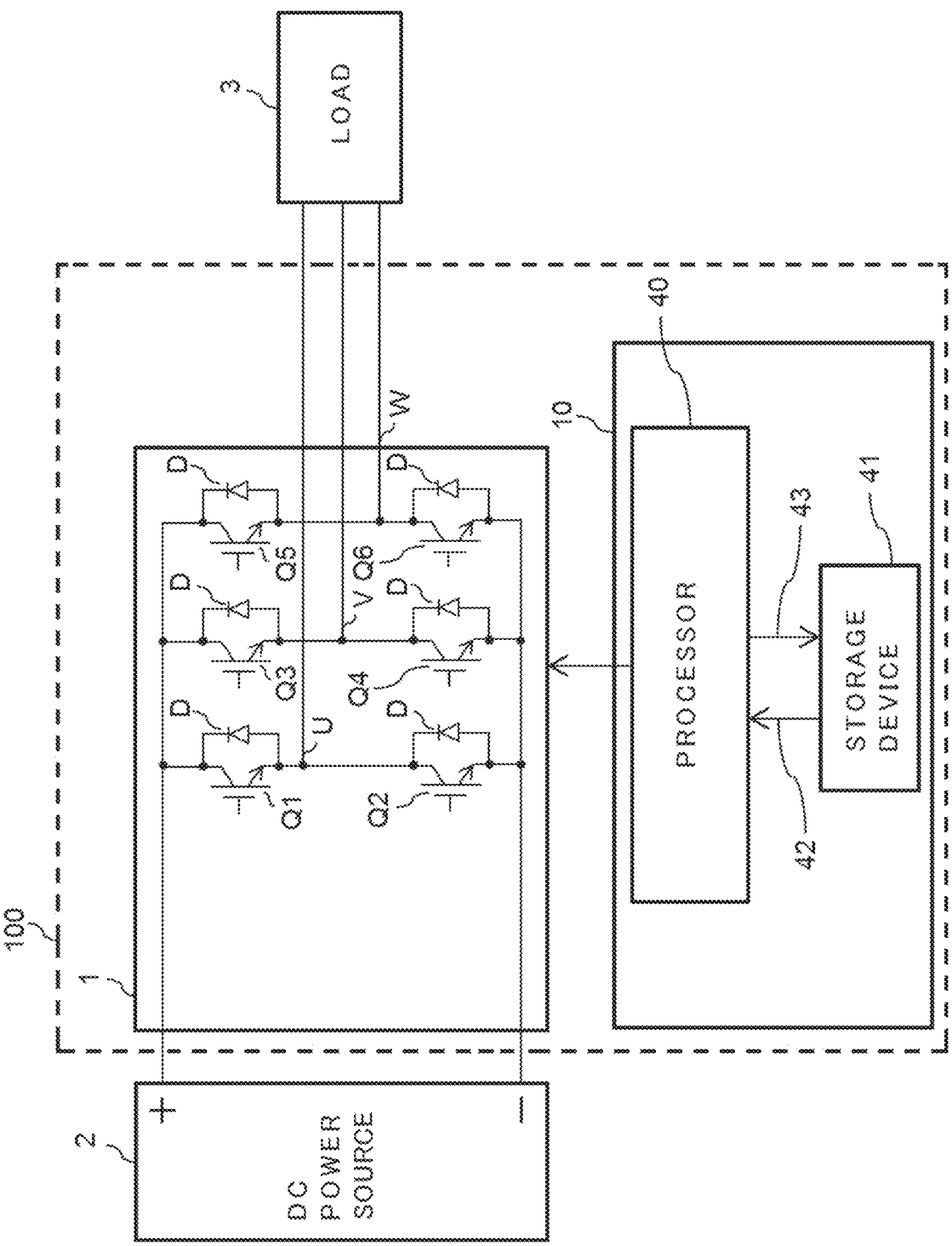
FIG. 2 is a diagram illustrating a hardware configuration of the power conversion device according to Embodiment 1.

FIG. 2 is a diagram illustrating a hardware configuration for implementing the power conversion device 100.

The electric power conversion unit 1 is made of three-phase inverter circuitry for converting DC power of the DC power source 2 into three-phase AC power, and drives thereby the load 3. The electric power conversion unit 1 includes a plurality of switching devices Q1 through Q6 to each of which a diode D is connected in antiparallel with each other. And then, from the connection points between the upper arm of each phase and the lower arm thereof, their points are connected to the load 3 through its input terminals of the phases each by way of its busbars. In this case, the phase-u is provided with the switching devices Q1 and Q2; the phase-v, provided with the switching devices Q3 and Q4; and the phase-w, provided with the switching devices Q5 and Q6.

The control device 10 is constituted of a processor 40 and a storage device 41.

The storage device 41 includes a volatile storage device (omitted to show in the figure) such as a RAM (Random Access Memory) and the like, and a nonvolatile auxiliary storage device (omitted to show in the figure) such as an HDD (Hard Disk Drive), an SSD (Solid State Drive) and the like. Note that, as for the nonvolatile auxiliary storage device, a flash memory may also be used in place of the HDD.

The processor 40 executes a control program(s) inputted from the storage device 41.

The storage device 41 includes the auxiliary storage device and the volatile storage device. Into the processor 40, a control program(s) 42 is inputted from the auxiliary storage device by way of the volatile storage device.

The processor 40 outputs processing data 43 such as a calculation result(s) and the like into the volatile storage device of the storage device 41, and stores these pieces of processing data into the auxiliary storage device by way of the volatile storage device on an as-needed basis.

As described above, the control device 10 outputs a switching state quantity SWS of the plurality of switching devices Q1 through Q6 in the electric power conversion unit 1, and controls the electric power conversion unit 1.

FIG. 3 is a diagram showing an example of switching state quantities of the plurality of switching devices in a case in which two levels in the electric power conversion unit 1 become a subject matter under consideration. A switching state quantity SWS is defined by a combination of the signals of turn-on (: 1) and turn-off (: 0) in each of the switching devices Q1 through Q6. In this case, the combination is defined which uniquely corresponds to switching parameters (numerical values standing for levels of switching states) which are indicated by the level "1" being a switching state corresponding to a turn-on and the level "0" being a switching state corresponding to a turn-off, so that it is possible to define the combination as an indicator or index indicating the switching states.

In FIG. 3, there exist nine ways of combinations in total in numerical values of switching state levels of the switching devices Q1 and Q2, Q3 and Q4, and Q5 and Q6 where each pair specifies respective switching states of phase-u, SWu, respective switching states of phase-v, SWv, and respective switching states of phase-w, SWw, so that it is so arranged as to distinguish by indicating these by the nine ways of switching state indexes SW0 through SW8.

To be specific, there exist the nine ways of switching state quantities SWS consisting of eight ways of switching state quantities SWS (switching state quantities corresponding to the respective switching state indexes SW0, SW1, SW2, SW3, SW4, SW5, SW6 and SW7) where, among the switching devices Q1 through Q6 of the upper arms and lower arms, one arm turns on and the other turns off, and of a switching state quantity SWS (a switching state quantity corresponding to the switching state index SW8) where all of the switching devices Q1 through Q6 are turned off at the time of an operation stoppage of the electric power conversion unit 1.

The voltage output calculation unit 11 calculates, in a case in which multi-phase voltages are of three-phase voltages, a voltage output of each phase of a three-phase voltage output value $V_3$out, namely, a value of phase-u voltage Vu, that of phase-v voltage Vv and that of phase-w voltage Vw as shown in FIG. 4, on the basis of the switching state quantities SWS in the electric power conversion unit 1 shown in FIG. 3. As shown in FIG. 4, the values of phase-u voltage Vu, phase-v voltage Vv and phase-w voltage Vw are indicated as those made corresponding to the switching state indexes SW0 through SW8. Here, symbol "Vdc" designates a busbar voltage Vdc of the DC power source 2.

Figure 5A:
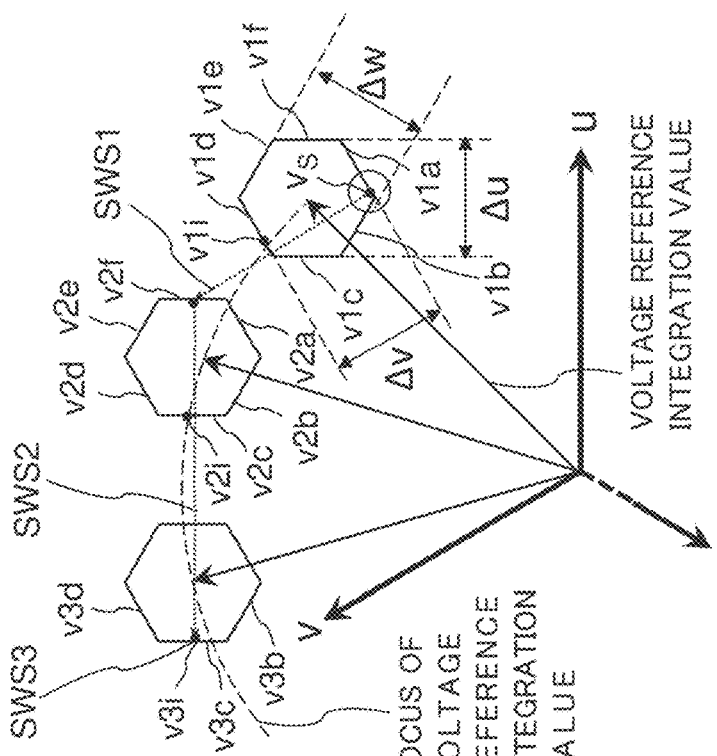
FIG. 5A and FIG. 5B are diagrams each for explaining an update determination method of a switching state quantity and a determination method thereof in the electric power conversion unit according to Embodiment 1.
Figure 5B:
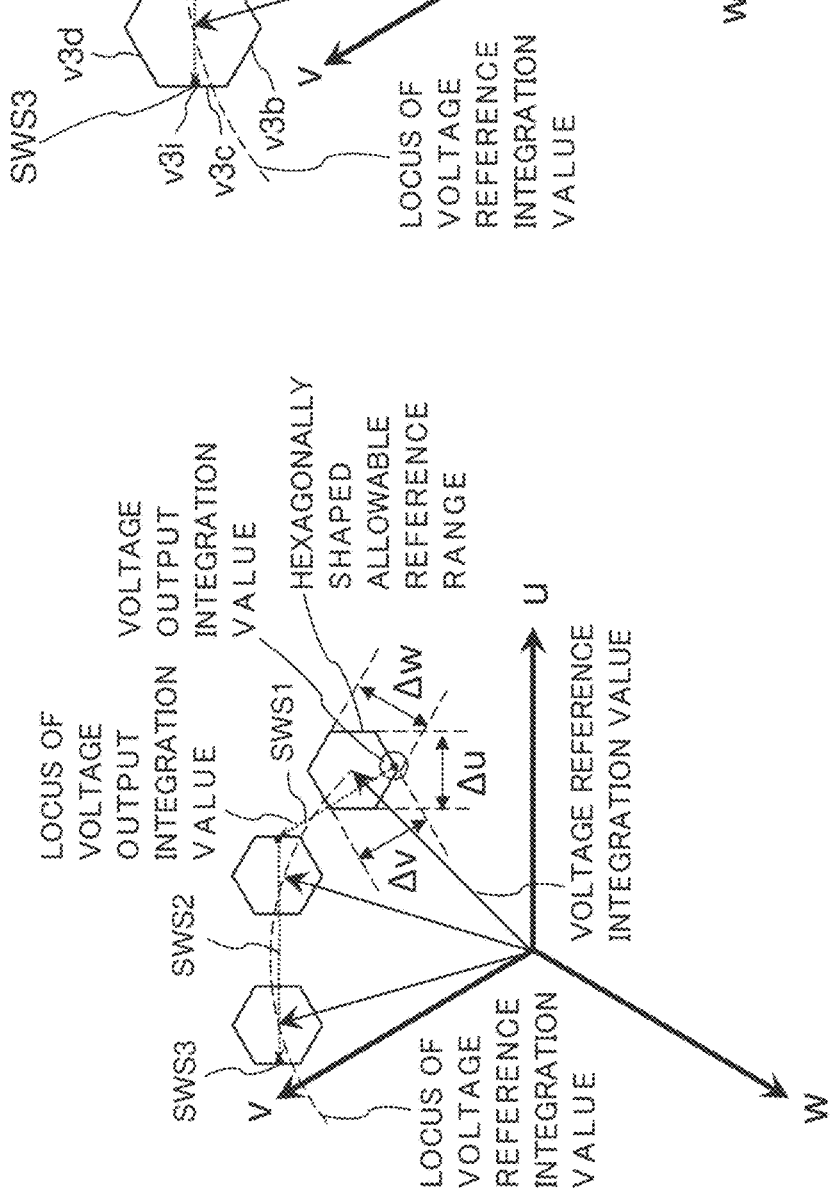

FIG. 5 is a diagram FIG. 5A and FIG. 5B are diagrams each for explaining a method of determining a switching state quantity SWS in the electric power conversion unit 1 by means of the switching update-determination unit 13 and the switching determination table 14. Note that, to make a supplementary explanation in detail, FIG. 5A and FIG. 5B are two diagrams which are composed of FIG. 5A and FIG. 5B being a partially enlarged view of FIG. 5A each. It should be noted that, in FIG. 5A and FIG. 5B, a case is shown as a representative example in which a switching state quantity SWS in the electric power conversion unit 1 is determined with respect to a voltage reference integration value Pref where a multi-phase voltage reference value Vref is integrated and to a voltage output integration value Pout where a multi-phase voltage output value Vout is integrated, in the uvw coordinate system being a three-phase static coordinate system.

When it is presumed that a multi-phase voltage reference value Vref is in a steady state in a static coordinate system of the three-phases uvw herein, the multi-phase voltage reference value Vref changes in accordance with a frequency of the voltage reference value of the three-phases uvw. And then, for example, when the frequency is positive, the multi-phase voltage reference value Vref changes in circular counterclockwise. For this reason, a three-phase voltage instruction or reference integration value $P_3$ref in which a three-phase voltage reference value $V_3$ref is integrated also changes in circular counterclockwise.

A three-phase voltage output value $V_3$out is a value determined in accordance with a switching state quantity SWS in the electric power conversion unit 1 in such a manner as of FIG. 4, and results in being drawn in accordance with the two values of "Vdc/2" and "−Vdc/2" corresponding to the switching state indexes SW0 through SW7 each on the uvw coordinates. And then, a composite or resultant vector on all voltages of the phase-u, phase-v and phase-w takes on a voltage output value which is actually outputted. At this time of occasion, as for each of switching state quantities corresponding to the switching state indexes SW0, SW7 and SW8, a composite or resultant vector in accordance with the switching state quantities SWS at upper arms of the phases each takes on zero, so that zero voltage output values result in three ways, and nonzero voltage output values, in six ways.

As shown in FIG. 5A and FIG. 5B, a hexagonally shaped permissible or allowable reference range $\Delta_6$Pref is drawn in accordance with allowable reference ranges $\Delta P_3$ref being set with respect to a three-phase voltage reference integration value $P_3$ref in which a three-phase voltage reference value $V_3$ref is integrated. A three-phase voltage allowance value $P_3$delta on which allowable reference ranges $\Delta P_3$ref are set with respect to a three-phase voltage reference integration value $P_3$ref takes on a hexagonally shaped allowable reference range $\Delta_6$Pref because the allowable reference ranges $\Delta P_3$ref are set with respect to each phase of the three-phase voltage reference integration value $P_3$ref (in the figures, symbol $\Delta u$ indicates an allowable reference range of phase-u; $\Delta v$, an allowable reference range of phase-v; and $\Delta w$, an allowable reference range of phase-w). On the basis of the hexagonally shaped allowable reference range $\Delta_6$Pref and on that of a three-phase voltage output integration value $P_3$out, the switching update-determination unit 13 performs determination whether or not it is necessary to update a switching state quantity SWS in the electric power conversion unit 1. Hereinafter, the explanation will be made in more detail for this scheme.

As shown in FIG. 5A and FIG. 5B, a point at which a three-phase voltage output integration value $P_3$out intersects onto a lower limit value of phase-v of a hexagonally shaped allowable reference range $\Delta_6$Pref each other (refer to the pint $V_S$ in FIG. 5B) is defined as an initial or start point.

First, the three-phase voltage output integration value $P_3$out intersects onto a lower limit value of phase-v of a hexagonally shaped allowable reference range $\Delta_6$Pref each other (an intersection point is the point $V_S$), so that the switching update-determination unit 13 outputs numeral "1" for updating a switching state quantity SWS as an update signal Snew. The switching determination table 14 updates the switching state quantity SWS because the update signal Snew is at "1."

At this time of occasion, the three-phase voltage output integration value $P_3$out reaches at the lower limit value of phase-v being a line segment (to be specific, the line segment is the side line V1$a$ of FIG. 5B) which is not one of three line segments including a line segment of allowable reference range $\Delta_6$Pref (the line segment is the side line Vid of FIG. 5B) of the hexagon (an intersection point of the both is the point V1$i$ of FIG. 5B) on which a proceeding direction of a vector of three-phase voltage reference integration value $P_3$ref intersects, and including those adjacent line segments (these line segments are the side line V1$c$ of FIG. 5B and the side line V1$e$ thereof), so that a nonzero voltage vector is outputted as the switching state quantity SWS.

Here, as for the nonzero voltage vector, the switching state quantity SWS is outputted to change toward a line segment of hexagonally shaped allowable reference range $\Delta_6$Pref (the line segment is the side line Vid of FIG. 5B) on which the proceeding direction of the three-phase voltage reference integration value $P_3$ref intersects, so that the switching state index SW3 by which the three-phase voltage output integration value $P_3$out changes in a direction toward an upper limit value of phase-v (corresponding to the side line Vid of FIG. 5B) is selected as a switching state quantity SWS1.

Next, the three-phase voltage output integration value $P_3$out reaches at an upper limit value of phase-u being a line segment (to be specific, the line segment is the side line V2$f$ of FIG. 5B) which is not one of three line segments including a line segment of allowable reference range $\Delta_6$Pref (the line segment is the side line V2$c$ of FIG. 5B) of the hexagon (an intersection point of the both is the point V2$i$ of FIG. 5B) on which the proceeding direction of the vector of three-phase voltage reference integration value $P_3$ref intersects, and including those adjacent line segments (these line segments are the side line V2$b$ of FIG. 5B and the side line V2$d$ thereof), so that a nonzero voltage vector is outputted as the switching state quantity SWS.

Here, as for the nonzero voltage vector, the switching state quantity SWS is outputted to change toward a line segment of hexagonally shaped allowable reference range $\Delta_6$Pref (to be specific, the line segment is the side line V2$c$ of FIG. 5B) on which the proceeding direction of the three-phase voltage reference integration value $P_3$ref intersects, so that, as for a switching state quantity SWS2, the switching state index SW4 by which a three-phase voltage output integration value $P_3$out changes in a direction toward a lower limit value of phase-u (corresponding to the side line V2$c$ of FIG. 5B) is selected.

From that time onward, the three-phase voltage output integration value $P_3$out reaches at a lower limit value of phase-u (corresponding to the side line V3$c$ of FIG. 5B) among three line segments including a line segment of allowable reference range $\Delta_6$Pref of the hexagon (an intersection point of the both is the point V3$i$ of FIG. 5B) on which the proceeding direction of the vector of three-phase voltage reference integration value $P_3$ref intersects, and including those adjacent line segments, so that a switching state quantity is outputted as a switching state quantity SWS3 to give a zero voltage vector on the basis of the switching state index SW0 or SW7.

According to a roundup of the manner described above, at the time of making the intersection onto the lower limit value of phase-v of the hexagonally shaped allowable reference range $\Delta_6$Pref being a start time-point as shown in FIG. 5A and FIG. 5B, a switching state quantity corresponding to the switching state index SW3 is outputted as the switching state quantity SWS1 which changes in a direction toward the upper limit value of phase-v of the hexagonally shaped allowable reference range $\Delta_6$Pref which intersects onto the proceeding direction of the three-phase voltage reference integration value $P_3$ref.

Next, at the time of making the intersection onto the upper limit value of phase-u, a switching state quantity corresponding to the switching state index SW4 is outputted as a switching state quantity SWS2 which changes in a direction toward the lower limit value of phase-u of the hexagonally shaped allowable reference range $\Delta_6$Pref which intersects onto the proceeding direction of the three-phase voltage reference integration value $P_3$ref.

From that time onward, at the time of making the intersection onto the lower limit value of phase-u, a switching state quantity corresponding to the switching state index SW0 or SW7 is outputted as the switching state quantity SWS3 to give a zero voltage vector. Namely, even in any one of the cases, it can be said that the switching state quantity is determined from a vector indicating a change of the aforementioned voltage reference integration value.

In this manner described above, an update signal Snew for determining whether or not a switching state quantity SWS is to be updated is calculated by the switching update-determination unit 13 on the basis of a voltage reference integration value Pref of each phase, on that of a voltage output integration value Pout thereof and on that of an allowable reference range $\Delta$Pref thereof, and a switching state quantity SWS in the electric power conversion unit 1 is determined by following a switching state index of the switching determination table 14 on the basis of the voltage reference integration value Pref, on that of the voltage output integration value Pout and on that of the update signal Snew, whereby, with a small amount of calculations, a switching loss SWloss is reduced which is caused at the time of the transfer of a switching state quantity SWS of the plurality of switching devices in the electric power conversion unit 1.

Next, the explanation will be hereinafter made in detail referring to the drawings for the control operations in the power conversion device 100 according to Embodiment 1.

Figure 6:
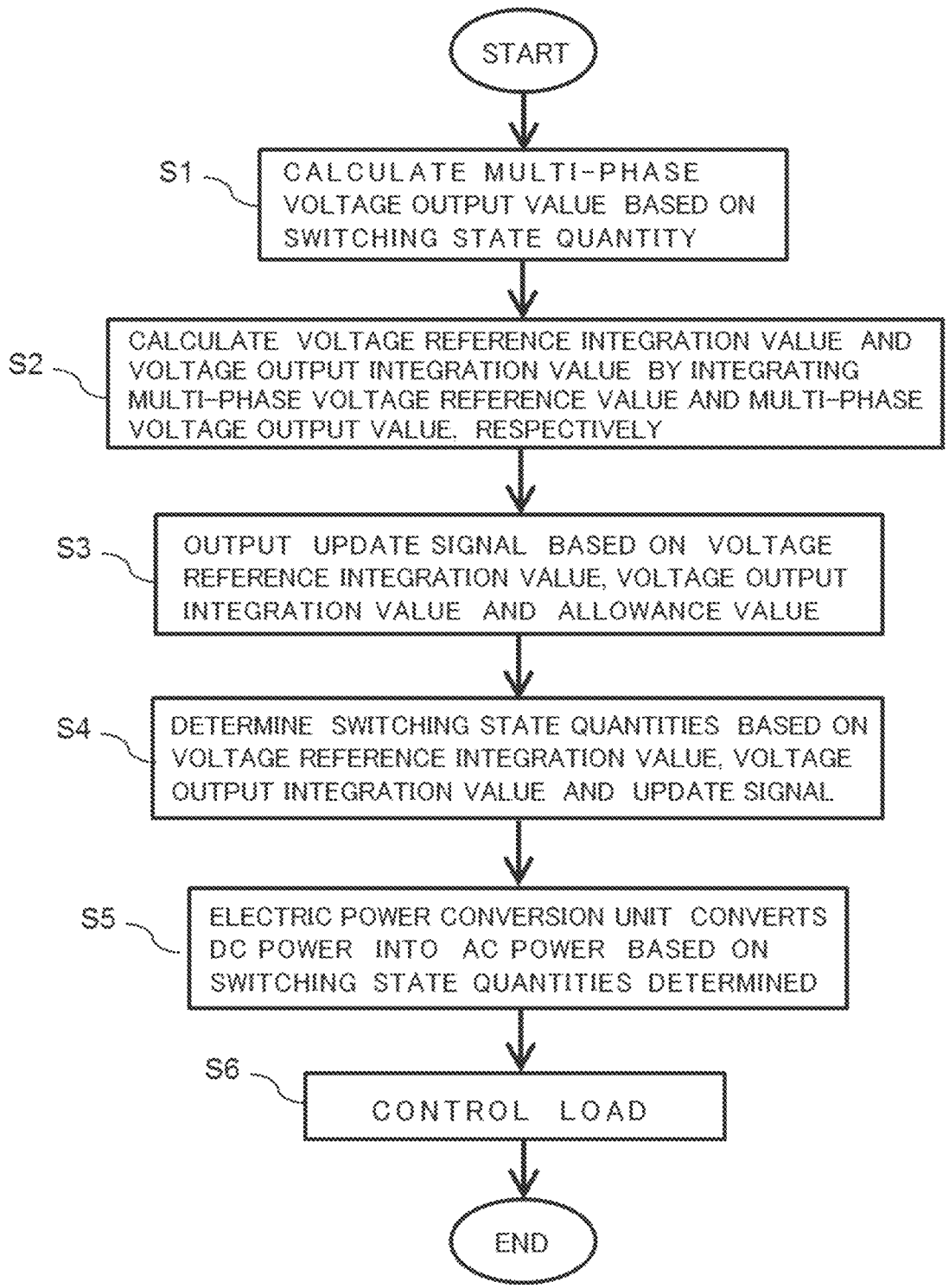
FIG. 6 is a flowchart diagram showing, by way of example, the operations of the power conversion device according to Embodiment 1.

FIG. 6 is a diagram showing a flowchart for explaining the control operations in the power conversion device 100.

First, the voltage output calculation unit 11 calculates a multi-phase voltage output value Vout on the basis of a switching state quantity SWS where the switching determination table 14 outputs (Step S1).

Next, the integration value calculation unit 12 calculates a voltage reference integration value Pref and a voltage output integration value Pout by integrating a multi-phase voltage reference value Vref and the multi-phase voltage output value Vout, respectively (Step S2).

The switching update-determination unit 13 calculates an update signal Snew for defining whether or not a switching state quantity SWS in the electric power conversion unit 1 is to be updated in such a manner as shown in FIG. 5A and FIG. 5B, on the basis of the voltage reference integration value Pref, on that of the voltage output integration value Pout and on that of an allowable reference range ΔPref to be set on the voltage reference integration value Pref (Step S3).

The switching determination table 14 determines switching state quantities SWS in the electric power conversion unit 1, on the basis of the voltage reference integration value Pref, on that of the voltage output integration value Pout and on that of an update signal Snew, by following the changes in switching state quantities as shown in FIG. 5A and FIG. 5B (Step S4).

The electric power conversion unit 1 converts DC power of the DC power source 2 into AC power on the basis of the switching state quantities SWS determined by the switching determination table 14, and outputs the AC power into the load 3 (Step S5).

The load 3 is drive-controlled by means of the AC power outputted from the electric power conversion unit 1 (Step S6).

As described above, the power conversion device 100 of Embodiment 1 comprises: the electric power conversion unit 1 for converting DC power of the DC power source 2 into AC power, and for supplying it into the load 3;

the voltage output calculation unit 11 for calculating a multi-phase voltage output value Vout on the basis of a switching state quantity SWS where the switching determination table 14 outputs; the integration value calculation unit 12 for calculating a voltage reference integration value Pref and a voltage output integration value Pout by integrating a multi-phase voltage reference value Vref and the multi-phase voltage output value Vout, respectively; the switching update-determination unit 13 for determining whether or not a switching state quantity SWS in the electric power conversion unit 1 is to be updated, on the basis of the voltage reference integration value Pref, on that of the voltage output integration value Pout and on that of an allowable reference range ΔPref to be set on the voltage reference integration value Pref; and the switching determination table 14 for determining a switching state quantity SWS in the electric power conversion unit 1 on the basis of the voltage reference integration value Pref, on that of the voltage output integration value Pout, on that of a proceeding direction of the vector of voltage reference integration value Pref calculated from an allowable reference range ΔPref and on that of an update signal Snew. In the power conversion device 100, the switching update-determination unit 13 outputs numeral "1" as an update signal Snew in a case in which any phase of a three-phase voltage output integration value $P_3$out reaches at any line segment of hexagonally shaped allowable reference range $\Delta_6$Pref made of a voltage allowance value Pdelta where an allowable reference range ΔPref is set on a three-phase voltage reference integration value $P_3$ref, and outputs numeral "0" as the update signal Snew in another case other than the above; and the switching determination table 14 updates a switching state quantity SWS in the electric power conversion unit 1 when the update signal Snew is at "1."

The switching determination table 14 outputs a zero voltage vector as a switching state quantity SWS in the electric power conversion unit 1, in a case in which the voltage output integration value Pout reaches at three line segments including a line segment of hexagonally shaped allowable reference range $\Delta_6$Pref on which a proceeding direction of a vector of voltage reference integration value Pref intersects, and including those adjacent line segments; and the switching determination table 14 outputs as a switching state quantity SWS in the electric power conversion unit 1 a nonzero voltage vector by which the voltage output integration value Pout changes in the proceeding direction of the vector of voltage reference integration value Pref, in a case in which the voltage output integration value Pout reaches at the remaining three line segments.

For this reason, the power conversion device 100 of Embodiment 1 performs, while by making a voltage output integration value Pout in which a multi-phase voltage output value Vout is integrated following with a voltage reference integration value Pref in which a multi-phase voltage reference value Vref is integrated, the calculation on update determination of a switching state quantity SWS in the electric power conversion unit 1 on the basis of a value of each phase to the voltage reference integration value Pref, that to the voltage output integration value Pout and that to an allowable reference range ΔPref, and determines a switching state quantity SWS in the electric power conversion unit 1 on the basis of the voltage reference integration value Pref, on that of the voltage output integration value Pout, on that of a proceeding direction of the vector of voltage reference integration value Pref calculated from the voltage reference integration value Pref and on that of an update signal Snew; and thus, with the amount of calculations capable of mounting it also on an inexpensive microcomputer, the load 3 can be drive-controlled so that a switching loss SWloss in the electric power conversion unit 1 is reduced.

Embodiment 2

The explanation will be made hereinafter referring to FIG. 7 for an electrical power conversion device according to Embodiment 2. Here, FIG. 7 is a block diagram illustrating a configuration of the power conversion device 100A according to Embodiment 2.

Figure 7:
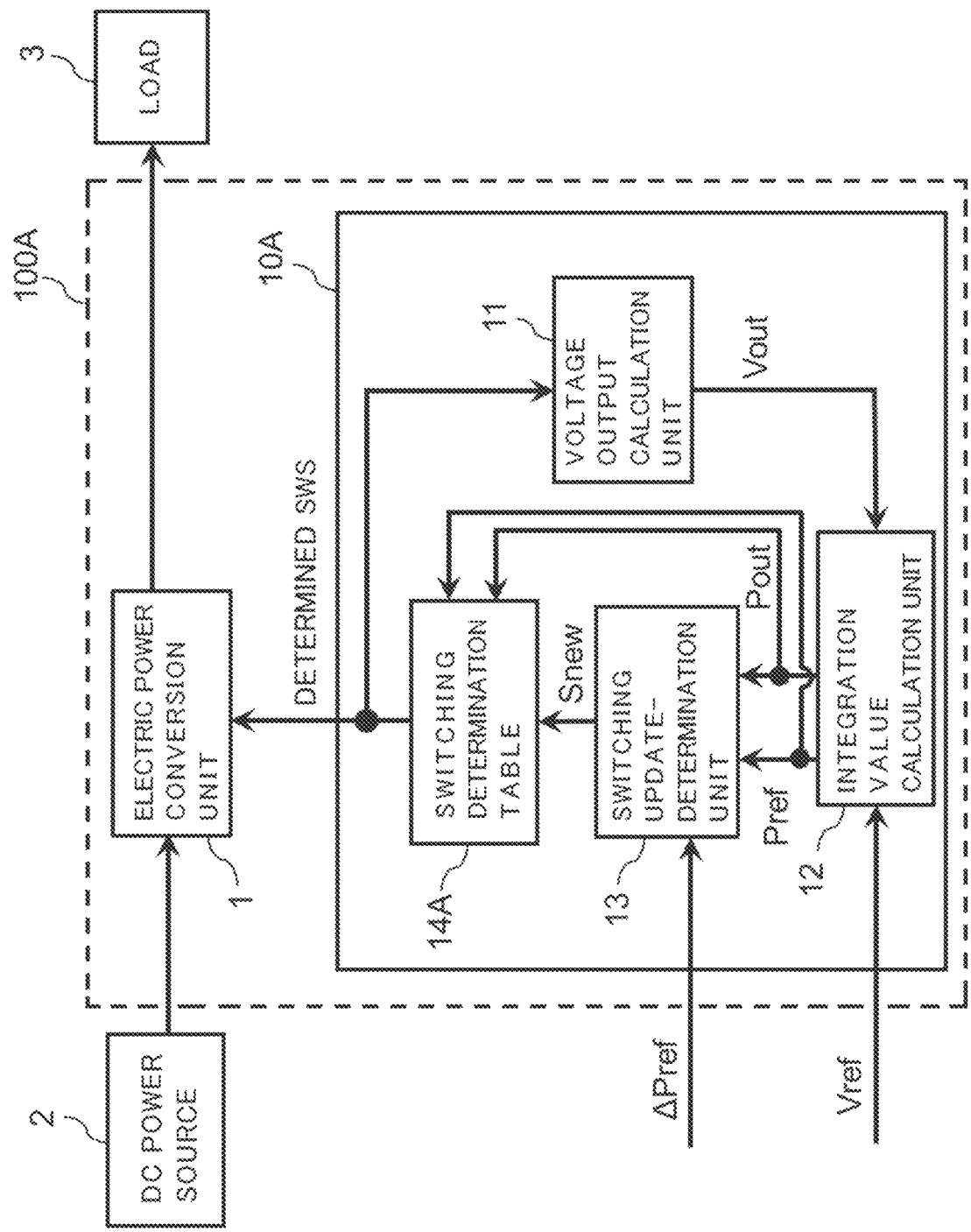
FIG. 7 is a block diagram illustrating a configuration of an electrical power conversion device according to Embodiment 2.

As illustrated in FIG. 7, a switching determination table 14A of the power conversion device 100A differs from the switching determination table 14 of the power conversion device 100 according to Embodiment 1 described above in a selection method at a time when a nonzero voltage vector is outputted as a switching state quantity SWS in the electric power conversion unit 1. In what follows, the same reference numerals and symbols designate equivalent items or portions for a constituent element(s) having a similar function(s) to Embodiment 1, and thus their explanation is omitted. And then, the explanation will be made focusing on different points from those of Embodiment 1.

As illustrated in FIG. 7, the power conversion device 100A according to Embodiment 2 comprises the switching determination table 14A where a control device 10A includes, in place of the switching determination table 14 where the control device 10 according to Embodiment 1 includes. Because the switching state quantity SWS in the electric power conversion unit 1 is determined by means of the switching update-determination unit 13 and the switching determination table 14A, both of which correspond to the switching determination unit 300 as will be described later.

The switching determination table 14A determines a switching state quantity SWS in the electric power conversion unit 1 on the basis of a voltage reference integration value Pref, on that of a voltage output integration value Pout and on that of an update signal Snew. The explanation will be made later in detail for a determination method of the switching state quantity SWS.

Figure 8:
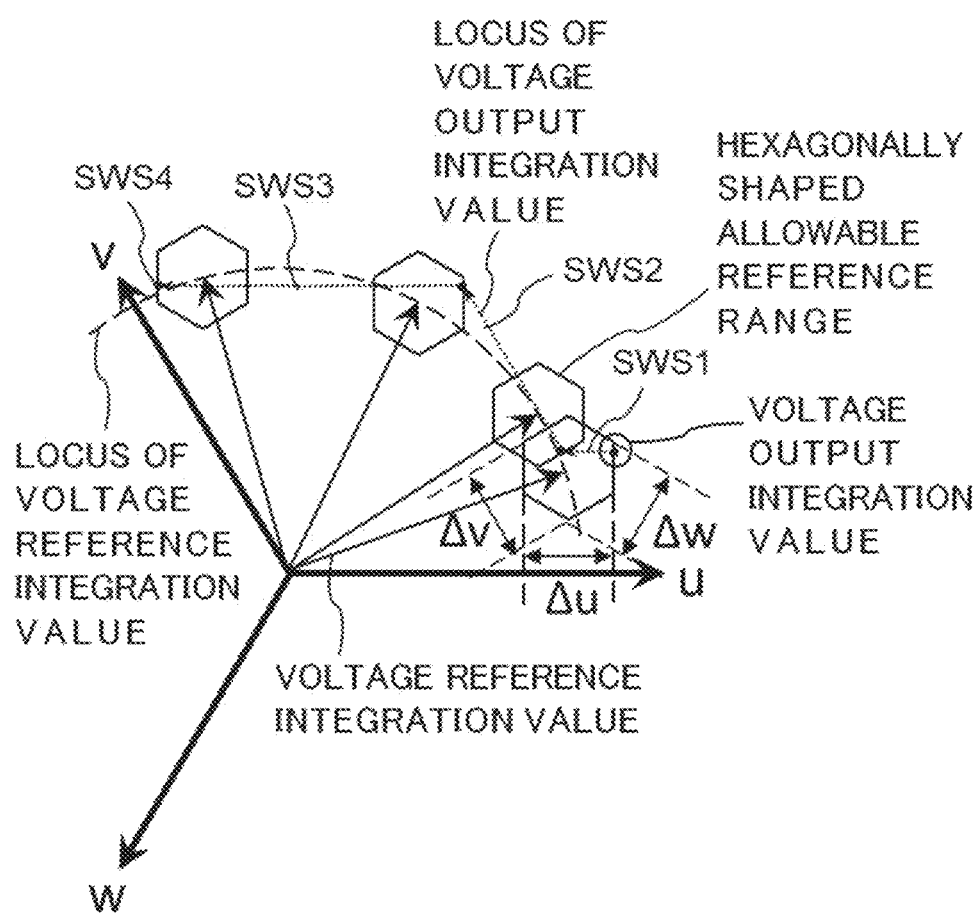
FIG. 8 is a diagram for explaining an update determination method of a switching state quantity and a determination method thereof in an electric power conversion unit according to Embodiment 2.

FIG. 8 is a diagram for explaining a method of determining a switching state quantity SWS in the electric power conversion unit 1 by means of the switching update-determination unit 13 and the switching determination table 14A. In FIG. 8, a case is defined in such a manner that a switching state quantity SWS in the electric power conversion unit 1 is determined, in relation to a voltage reference integration value Pref and a voltage output integration value Pout, on the uvw coordinates being a three-phase static coordinate system. A determination method of performing the determination whether or not a switching state quantity SWS is to be updated in the switching update-determination unit 13 is similar to that of Embodiment 1, so that the explanation will be omitted herein.

The difference between the switching determination table 14A in Embodiment 2 and the switching determination table 14 in Embodiment 1 is a selection method of a nonzero voltage vector to output it as a switching state quantity SWS.

In Embodiment 1, in a case in which a three-phase voltage output integration value P3out reaches at a line segment which is not one of three line segments including a line segment of hexagonally shaped allowable reference range $\Delta_6$Pref on which a proceeding direction of a vector of three-phase voltage reference integration value $P_3$ref intersects, and including those adjacent line segments, a nonzero voltage vector is outputted as a switching state quantity SWS in the electric power conversion unit 1, and, as for the nonzero voltage vector, a nonzero voltage vector is outputted which changes in the proceeding direction of the vector of voltage reference integration value Pref.

For dealing therewith, as for the nonzero voltage vector of Embodiment 2, a nonzero voltage vector is outputted which changes in a direction of a phase at which a voltage output integration value Pout reaches, and also changes within a hexagonally shaped allowable reference range $\Delta_6$Pref. In FIG. 8, a time-point at which a three-phase voltage output integration value $P_3$out intersects onto an upper limit value of phase-u of hexagonally shaped allowable reference range $\Delta_6$Pref each other is defined as an initial or start time-point.

First, the three-phase voltage output integration value $P_3$out intersects onto the hexagonally shaped allowable reference range $\Delta_6$Pref each other, so that the switching update-determination unit 13 outputs numeral "1" as an update signal Snew. The switching determination table 14A updates a switching state quantity SWS because the update signal Snew is at "1."

At this time of occasion, the three-phase voltage output integration value $P_3$out reaches at an upper limit value of phase-u of a line segment which is not one of three line segments including a line segment of hexagonally shaped allowable reference range $\Delta_6$Pref on which a proceeding direction of a vector of three-phase voltage reference integration value $P_3$ref intersects, and including those adjacent line segment, so that a nonzero voltage vector is outputted as a switching state quantity SWS.

As for the nonzero voltage vector, a nonzero voltage vector is outputted which changes in a direction of a phase at which the three-phase voltage output integration value $P_3$out reaches, and also within the hexagonally shaped allowable reference range $\Delta_6$Pref, so that, as for a switching state quantity SWS1, a switching state quantity corresponding to a switching state index SW4 is outputted in which a three-phase voltage output integration value $P_3$out changes in a direction toward a lower limit value of phase-u of the hexagonally shaped allowable reference range $\Delta_6$Pref.

Next, the three-phase voltage output integration value $P_3$out reaches at a lower limit value of phase-v of a line segment which is not one of three line segments including a line segment of hexagonally shaped allowable reference range $\Delta_6$Pref on which the proceeding direction of the vector of three-phase voltage reference integration value $P_3$ref intersects, and including those adjacent line segments, so that a nonzero voltage vector is outputted as a switching state quantity SWS.

As for the nonzero voltage vector, a nonzero voltage vector is outputted which changes in a direction of a phase at which the three-phase voltage output integration value $P_3$out reaches, and also changes within the hexagonally shaped allowable reference range $\Delta_6$Pref, so that a switching state quantity corresponding to a switching state index SW3 is outputted as a switching state quantity SWS2 in which a three-phase voltage output integration value $P_3$out changes in a direction toward an upper limit value of phase-v of the hexagonally shaped allowable reference range $\Delta_6$Pref.

Next, the three-phase voltage output integration value $P_3$out reaches at an upper limit value of phase-u of a line segment which is not one of three line segments including a line segment of hexagonally shaped allowable reference range $\Delta_6$Pref on which the proceeding direction of the vector of three-phase voltage reference integration value $P_3$ref intersects, and including those adjacent line segments, so that a nonzero voltage vector is outputted as a switching state quantity SWS.

As for the nonzero voltage vector, a nonzero voltage vector is outputted which changes in a direction of a phase at which the three-phase voltage output integration value $P_3$out reaches, and also changes within the hexagonally shaped allowable reference range $\Delta_6$Pref, so that a switching state quantity corresponding to the switching state index SW4 is outputted as a switching state quantity SWS3 in which the three-phase voltage output integration value $P_3$out changes in a direction toward a lower limit value of phase-u of the hexagonally shaped allowable reference range $\Delta_6$Pref.

From that time onward, the three-phase voltage output integration value $P_3$out reaches at a lower limit value of phase-u among three line segments including a line segment of hexagonally shaped allowable reference range $\Delta_6$Pref on which the proceeding direction of the vector of three-phase voltage reference integration value $P_3$ref intersects, and including those adjacent line segments, so that a switching state quantity corresponding to a switching state index SW0 or SW7 is outputted as a switching state quantity SWS4 to give a zero voltage vector.

Therefore, in comparison with the switching determination method of Embodiment 1, outputted in Embodiment 2 is a nonzero voltage vector in such a transition from the switching state quantity SWS1 of FIG. 8 to that of SWS2 thereof so that an error of a voltage output integration value Pout with respect to a voltage reference integration value Pref becomes smaller; and thus, a harmonic voltage Vthd (also referred to as a harmonic voltage component Vthd) and a harmonic current Ithd originating in the harmonic voltage Vthd are suppressed without increasing calculation costs.

Figure 9:
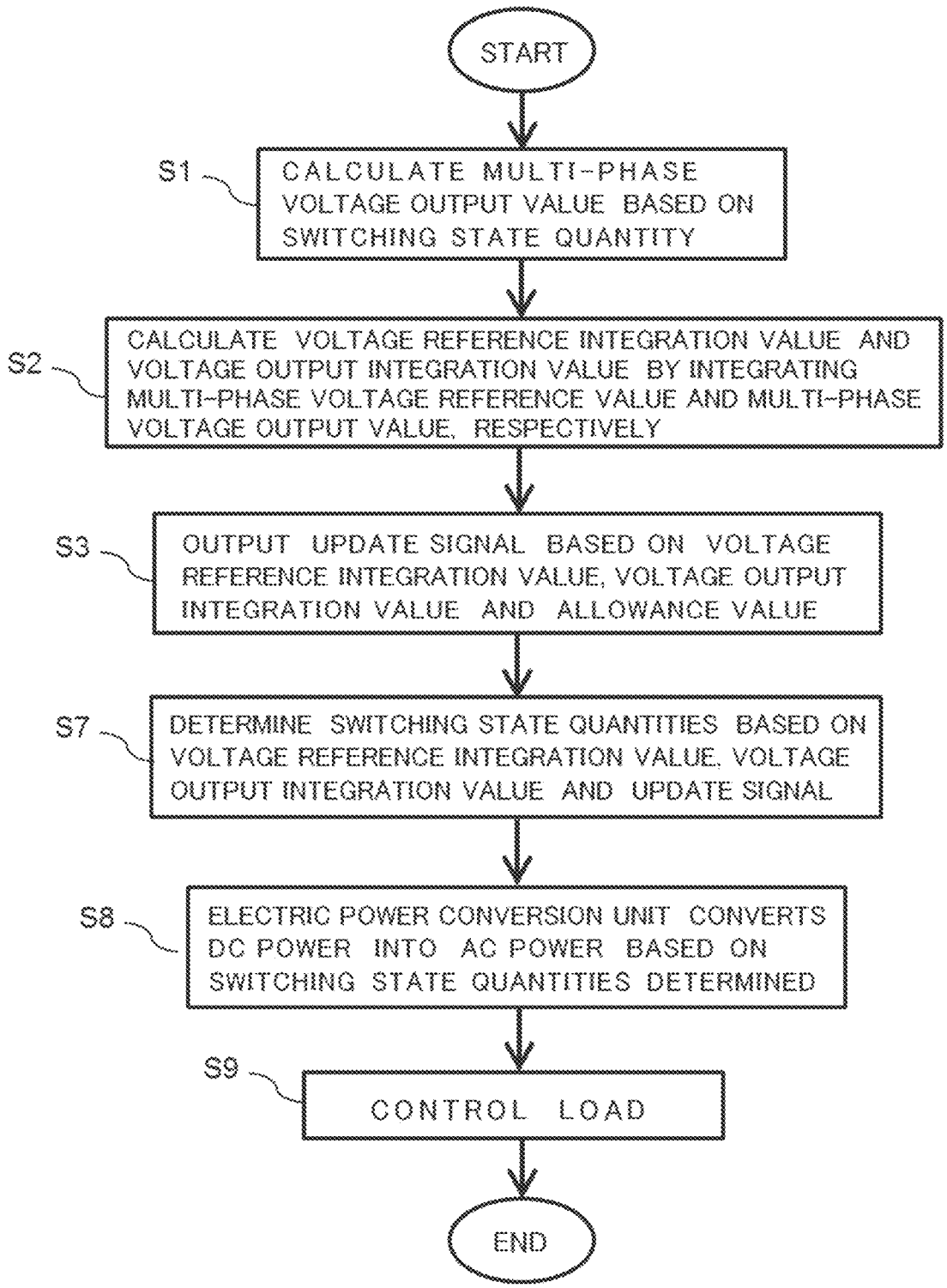
FIG. 9 is a flowchart diagram showing, by way of example, the operations of the power conversion device according to Embodiment 2.

Next, the explanation will be hereinafter made in detail referring to FIG. 9 for the control operations in the power conversion device 100A according to Embodiment 2. FIG. 9 is a flowchart for explaining the control operations in the power conversion device 100A.

First, the processing is carried out in similar procedures to those of Embodiment 1, and the switching update-determination unit 13 outputs an update signal Snew for defining whether or not a switching state quantity SWS in the electric power conversion unit 1 is to be updated on the basis of an allowable reference range ΔPref and on that of a voltage reference integration value Pref and a voltage output integration value Pout calculated by the voltage output calculation unit 11 and by the integration value calculation unit 12 (from Step S1 through Step S3).

Next, the switching determination table 14A determines a switching state quantity SWS in the electric power conversion unit 1, on the basis of the voltage reference integration value Pref, on that of the voltage output integration value Pout and on that of an update signal Snew, by following the changes of switching state quantities as shown in FIG. 8 (Step S7).

And then, the electric power conversion unit 1 converts DC power of the DC power source 2 into AC power on the basis of the switching state quantities SWS determined by the switching determination table 14A, and outputs the AC power into the load 3, so that a drive control is performed on the load 3 (Step S8 and Step S9). Here, the operations at Step S8 are the same as the operations at Step S5 shown in FIG. 6, and the operations at Step S9 are the same as the operations at Step S6 shown in FIG. 6.

The power conversion device 100A of Embodiment 2 comprises: the electric power conversion unit 1 for converting DC power of the DC power source 2 into AC power, and for supplying it into the load 3; the voltage output calculation unit 11 for calculating a multi-phase voltage output value Vout on the basis of a switching state quantity SWS where the switching determination table 14A outputs; the integration value calculation unit 12 for calculating a voltage reference integration value Pref and a voltage output integration value Pout by integrating a multi-phase voltage reference value Vref and the multi-phase voltage output value Vout, respectively; the switching update-determination unit 13 for determining whether or not a switching state quantity SWS in the electric power conversion unit 1 is to be updated on the basis of the voltage reference integration value Pref, on that of the voltage output integration value Pout and on that of an allowable reference range ΔPref to be set on the voltage reference integration value Pref; and the switching determination table 14A for determining a switching state quantity SWS in the electric power conversion unit 1 on the basis of the voltage reference integration value Pref, on that of the voltage output integration value Pout, on that of a proceeding direction of the vector of voltage reference integration value Pref calculated from the voltage reference integration value Pref, and on that of an update signal Snew. In the power conversion device 100A, the switching update-determination unit 13 outputs numeral "1" as an update signal Snew in a case in which any phase of a three-phase voltage output integration value $P_3$out reaches at any line segment of hexagonally shaped allowable reference range $\Delta_P$Pref made of a voltage allowance value Pdelta where an allowable reference range ΔPref is set on a three-phase voltage reference integration value $P_3$ref, and outputs numeral "0" as the update signal Snew in another case other than the above; and the switching determination table 14A updates a switching state quantity SWS in the electric power conversion unit 1 when the update signal Snew is at "1."

The switching determination table 14A outputs a zero voltage vector as a switching state quantity SWS in the electric power conversion unit 1, in a case in which a voltage output integration value Pout reaches at three line segments including a line segment of hexagonally shaped allowable reference range $\Delta_6$Pref on which the proceeding direction of the vector of voltage reference integration value Pref intersects, and including those adjacent line segment; and the switching determination table 14A outputs a nonzero voltage vector as a switching state quantity SWS in the electric power conversion unit 1 which changes in a direction of a phase at which the voltage output integration value Pout reaches, and also changes within the hexagonally shaped allowable reference range $\Delta_6$Pref, in a case in which the voltage output integration value Pout reaches at the remaining three line segments.

For this reason, the power conversion device 100A of Embodiment 2 can make an error between a voltage reference integration value Pref and a voltage output integration value Pout smaller than that of Embodiment 1; and thus, a harmonic voltage Vthd and a harmonic current Ithd originating in the harmonic voltage Vthd can be suppressed without increasing calculation costs.

Embodiment 3

The explanation will be made hereinafter referring to FIG. 10 for an electrical power conversion device according to Embodiment 3. Here, FIG. 10 is a block diagram illustrating a configuration of the power conversion device 100B according to Embodiment 3.

Figure 10:
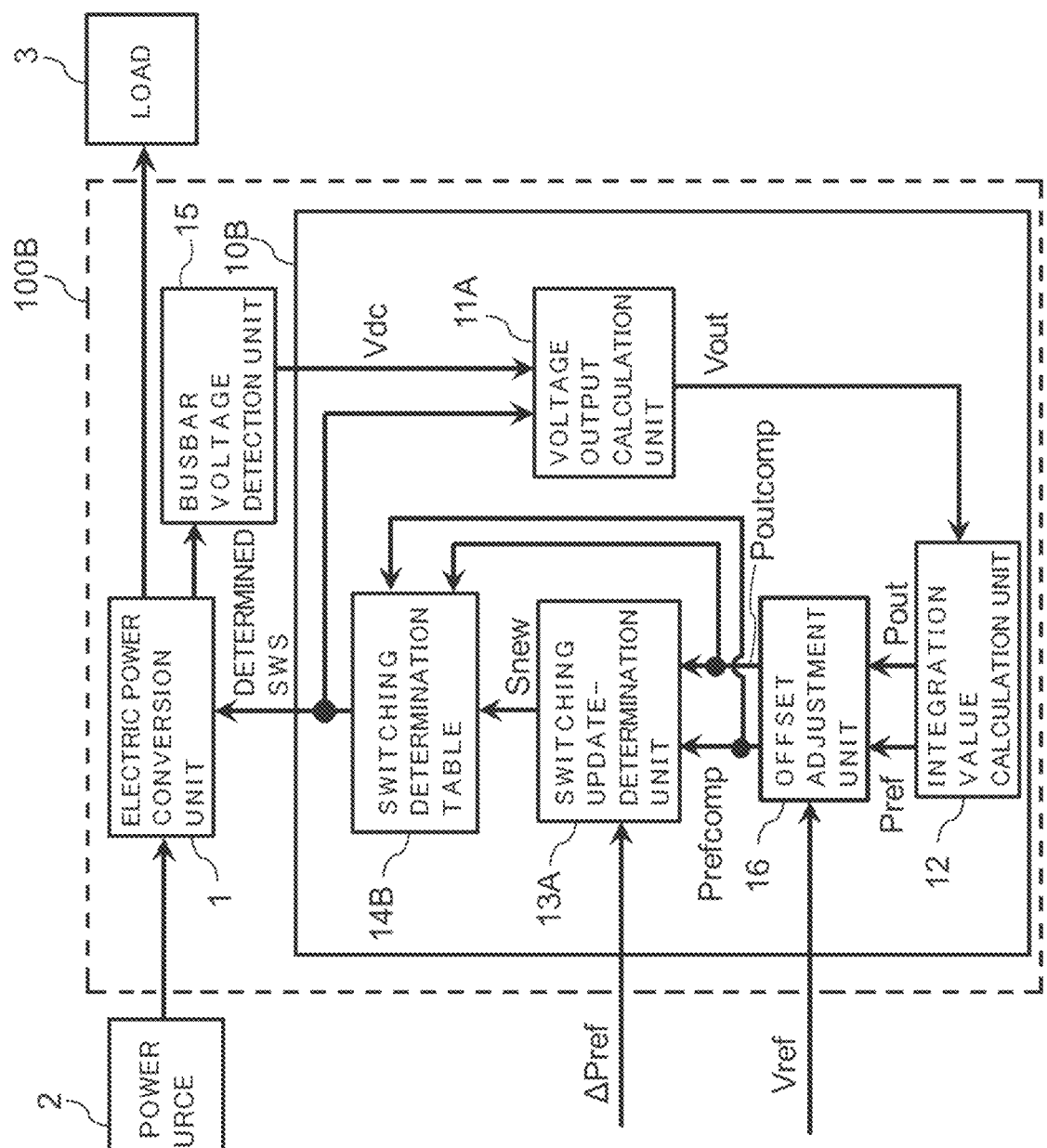
FIG. 10 is a block diagram illustrating a configuration of an electrical power conversion device according to Embodiment 3.

As illustrated in FIG. 10, the power conversion device 100B differs from the power conversion device 100A according to Embodiment 2 in a point in which the power conversion device 100B further comprises a busbar voltage detection unit 15 for detecting a busbar voltage Vdc in the electric power conversion unit 1, and an offset adjustment unit 16 for adjusting an offset value of a voltage reference integration value Pref and that of a voltage output integration value Pout. The power conversion device 100B also differs in a point in which a voltage output calculation unit 11A calculates a multi-phase voltage output value Vout on the basis of the busbar voltage Vdc detected by the busbar voltage detection unit 15 and on that of a switching state quantity SWS where a switching determination table 14B outputs, in a point in which a switching update-determination unit 13A determines whether or not a switching state quantity SWS in the electric power conversion unit 1 is to be updated on the basis of a post-compensation or compensated voltage reference integration value Prefcomp calculated by the offset adjustment unit 16 and on that of a post-compensation or compensated voltage output integration value Poutcomp calculated thereby, and in a point of a selection method at a time when the switching determination table 14B outputs a nonzero voltage vector as a switching state quantity SWS in the electric power conversion unit 1.

In what follows, the same reference numerals and symbols designate equivalent items or portions for a constituent element(s) having a similar function(s) to Embodiments 1 and 2, and thus their explanation is omitted. And then, the explanation will be made focusing on different points from those of Embodiments 1 and 2.

As illustrated in FIG. 10, the power conversion device 100B according to Embodiment 3 further comprises the busbar voltage detection unit 15 in comparison with the power conversion device 100A according to Embodiment 2; and, in places of the voltage output calculation unit 11, the switching update-determination unit 13 and the switching determination table 14A where the control device 10A according to Embodiment 2 includes, the power conversion device 100B comprises the voltage output calculation unit 11A, the switching update-determination unit 13A and the switching determination table 14B where a control device 10B includes, and yet further comprises the offset adjustment unit 16 where the control device 10B includes. Because the switching state quantity SWS in the electric power conversion unit 1 is determined by means of the switching update-determination unit 13A and the switching determination table 14B, both of which correspond to the switching determination unit 300 as will be described later.

Next, the explanation will be made for the functions of the voltage output calculation unit 11A in the power conversion device 100B according to Embodiment 3, the switching update-determination unit 13A therein, the switching determination table 14B therein, the busbar voltage detection unit 15 therein and the offset adjustment unit 16 therein, which are the differences from the power conversion device 100A according to Embodiment 2.

The busbar voltage detection unit 15 detects a busbar voltage Vdc in the electric power conversion unit 1.

The voltage output calculation unit 11A calculates a multi-phase voltage output value Vout, on the basis of a switching state quantity SWS where the switching determination table 14B outputs and on that of the busbar voltage Vdc detected by the busbar voltage detection unit 15.

The offset adjustment unit 16 adjusts an offset value of a voltage reference integration value Pref in value and that of a voltage output integration value Pout in value to reach at "0" each, and outputs a compensated voltage reference integration value Prefcomp and a post-compensation or compensated voltage output integration value Poutcomp, respectively.

The switching update-determination unit 13A outputs an update signal Snew by which determination is performed whether or not a switching state quantity SWS in the electric power conversion unit 1 is to be updated, on the basis of the compensated voltage reference integration value Prefcomp, on that of the compensated voltage output integration value Poutcomp and on that of an allowable reference range ΔPref being set on the compensated voltage reference integration value Prefcomp. For example, when a switching state quantity SWS in the electric power conversion unit 1 is to be updated, numeral "1" is outputted as an update signal Snew, whereas, when the switching state quantity SWS is not to be updated, numeral "0" is outputted as the update signal Snew.

The switching determination table 14B determines a switching state quantity SWS in the electric power conversion unit 1, on the basis of the aforementioned voltage reference integration value Pref, on that of the aforementioned voltage output integration value Pout and on that of the update signal Snew. The explanation will be made later in detail for a determination method of the switching state quantity SWS.

Figure 11:
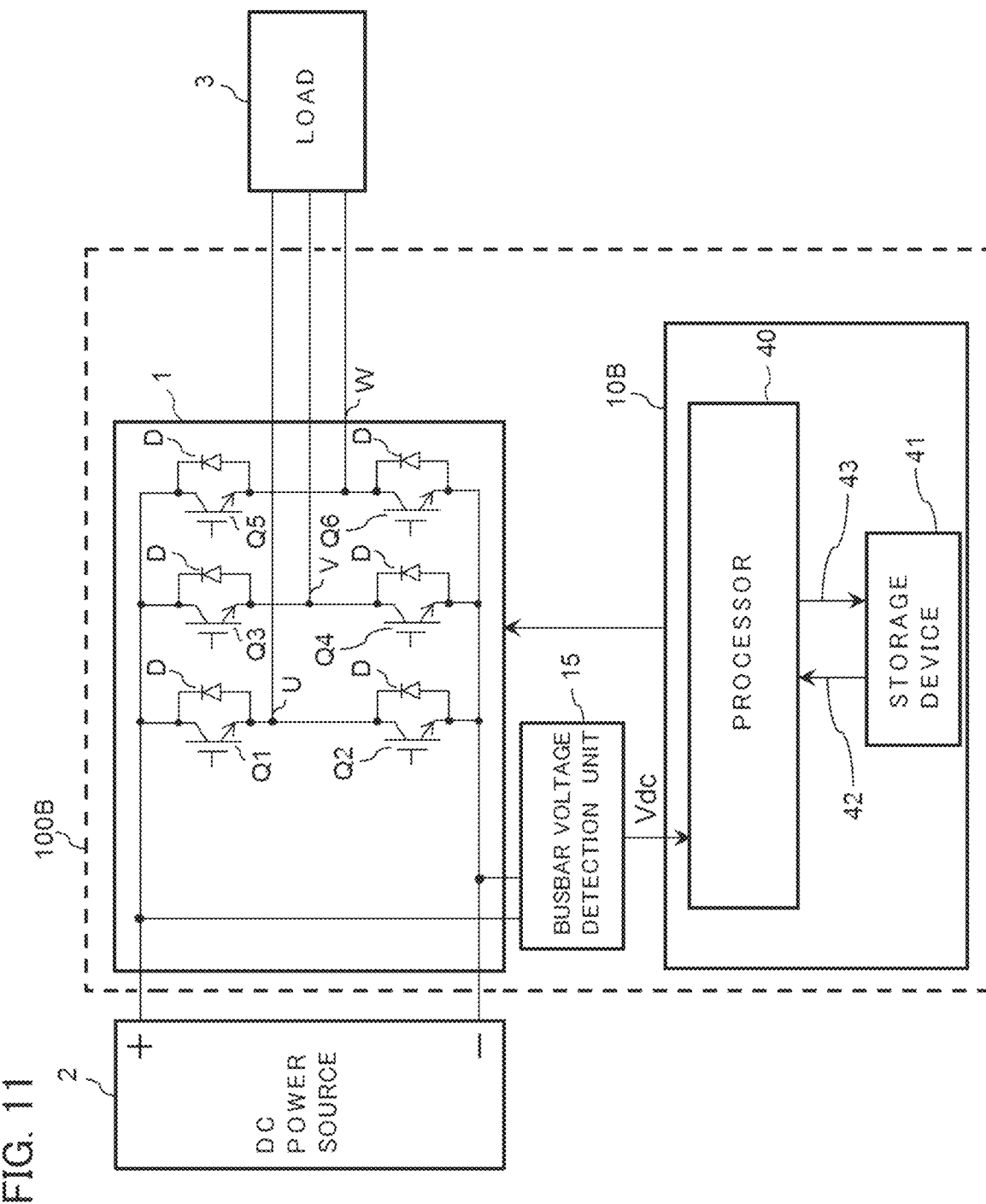
FIG. 11 is a diagram illustrating a hardware configuration of the power conversion device according to Embodiment 3.

FIG. 11 is a diagram illustrating a hardware configuration for implementing the power conversion device 100B.

In comparison with the power conversion device 100 according to Embodiment 1, the hardware configuration diagram of the power conversion device 100B according to Embodiment 3 differs in a point in which the power conversion device 100B further comprises the busbar voltage detection unit 15. Here, the busbar voltage detection unit 15 is a mechanism for detecting a busbar voltage Vdc by measuring a voltage difference across the positive side (+) of the DC power source 2 and the negative side (−) thereof.

Figure 12:
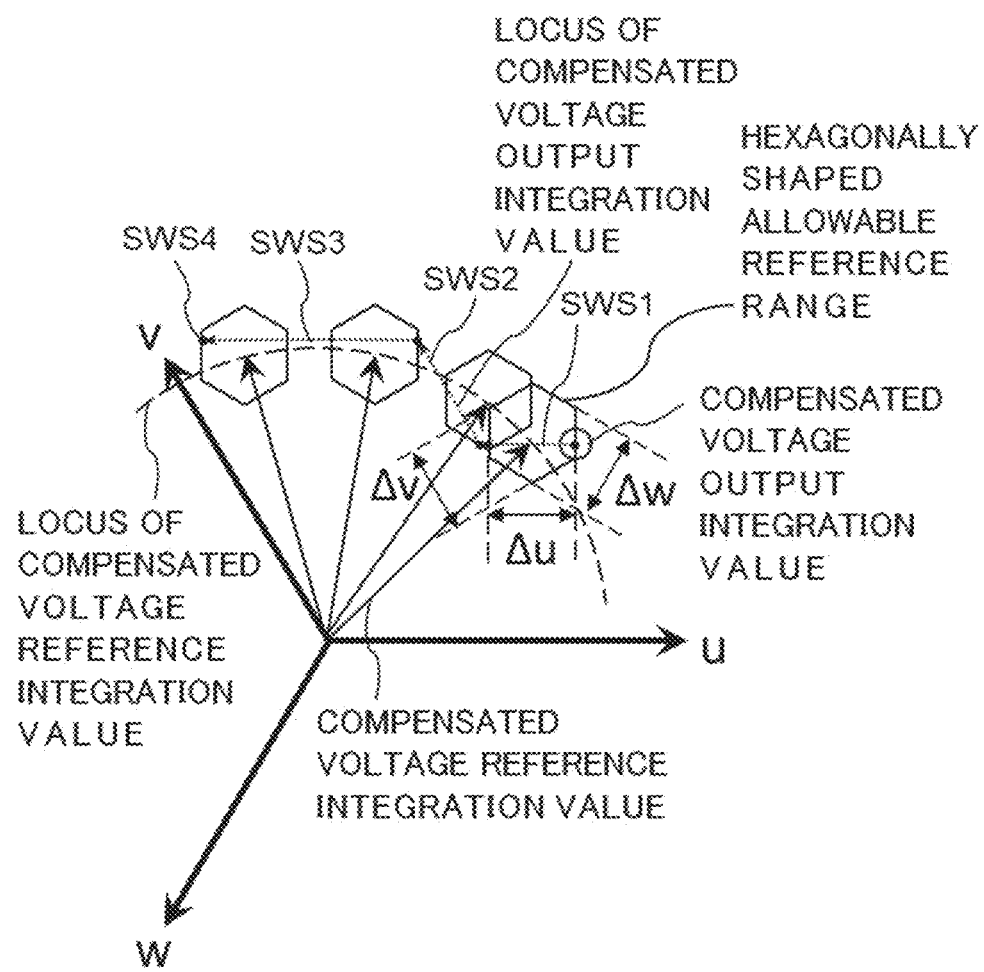
FIG. 12 is a diagram for explaining an update determination method of a switching state quantity and a determination method thereof in an electric power conversion unit according to Embodiment 3.

FIG. 12 is a diagram for explaining a method of determining a switching state quantity SWS in the electric power conversion unit 1 by means of the switching update-determination unit 13A and the switching determination table 14B. In FIG. 12, shown is a case in which a switching state quantity SWS in the electric power conversion unit 1 is determined with respect to a post-compensation or compensated voltage reference integration value Prefcomp and to a post-compensation or compensated voltage output integration value Poutcomp in the uvw coordinate system being a three-phase static coordinate system.

As for a method of determining whether or not a switching state quantity SWS is to be updated in the switching update-determination unit 13A, its input values are only modified to a compensated voltage reference integration value Prefcomp and a compensated voltage output integration value Poutcomp, so that the method itself is similar to those of Embodiments 1 and 2; and so, the explanation will be omitted herein.

Next, the explanation will be made for the difference between the switching determination table 14B in Embodiment 3 and the switching determination table 14A in Embodiment 2. The difference is attributed to a selection method of a nonzero voltage vector outputted as a switching state quantity SWS.

In Embodiment 2, in a case in which a three-phase voltage output integration value $P_3$out reaches at a line segment which is not one of three line segments including a line segment of hexagonally shaped allowable reference range $\Delta_6$Pref on which a proceeding direction of a vector of three-phase voltage reference integration value $P_3$ref intersects, and including those adjacent line segments, a nonzero voltage vector is outputted as a switching state quantity SWS in the electric power conversion unit 1, and, as for the nonzero voltage vector, a nonzero voltage vector is outputted which changes in a direction of a phase at which the voltage output integration value Pout reaches, and also changes within the hexagonally shaped allowable reference range $\Delta_6$Pref.

For dealing therewith, as for the nonzero voltage vector of Embodiment 3, a nonzero voltage vector is outputted which changes in a direction oriented toward either one of two line segments including a line segment intersecting to the proceeding direction of a vector of compensated voltage reference integration value Prefcomp each other, and including a nearer line segment to the line segment intersecting thereto.

In FIG. 12, a time-point at which a compensated three-phase voltage output integration value $P_3$outcomp intersects onto an upper limit value of phase-u of a hexagonally shaped allowable reference range $\Delta_6$Pref each other is defined as an initial or start time-point.

First, the compensated three-phase voltage output integration value $P_3$outcomp intersects onto the hexagonally shaped allowable reference range $\Delta_6$Pref each other, so that the switching update-determination unit 13A outputs numeral "1" as an update signal Snew. The switching determination table 14B updates a switching state quantity SWS because the update signal Snew is at "1."

At this time of occasion, the compensated three-phase voltage output integration value $P_3$outcomp reaches at an upper limit value of phase-u of a line segment which is not one of three line segments including a line segment of hexagonally shaped allowable reference range $\Delta_6$Pref on which the proceeding direction of a vector of compensated three-phase voltage reference integration value $P_3$refcomp intersects, and including those adjacent line segments, so that a nonzero voltage vector is outputted as a switching state quantity SWS.

As for the nonzero voltage vector, a nonzero voltage vector is outputted which changes in a direction oriented toward either one of two line segments including a line segment intersecting to the proceeding direction of the vector of compensated voltage reference integration value Prefcomp each other and including a nearer line segment to the line segment intersecting thereto, so that a switching state quantity corresponding to a switching state index SW4 is outputted as a switching state quantity SWS1 which changes in a direction toward a lower limit value of phase-u of the hexagonally shaped allowable reference range $\Delta_6$Pref.

Next, the compensated three-phase voltage output integration value $P_3$outcomp reaches at an upper limit value of phase-w of a line segment which is not one of three line segments including a line segment of hexagonally shaped allowable reference range $\Delta_6$Pref on which the proceeding direction of the vector of compensated three-phase voltage reference integration value $P_3$refcomp intersects, and including those adjacent line segment, so that a nonzero voltage vector is outputted as a switching state quantity SWS.

As for the nonzero voltage vector, a nonzero voltage vector is outputted which changes in a direction oriented toward either one of two line segments including a line segment intersecting to the proceeding direction of the vector of compensated voltage reference integration value Prefcomp each other and including a nearer line segment to the line segment intersecting thereto, so that a switching state quantity corresponding to a switching state index SW3 is outputted as a switching state quantity SWS2 which changes in a direction toward an upper limit value of phase-v of the hexagonally shaped allowable reference range $\Delta_6$Pref.

Next, the compensated three-phase voltage output integration value $P_3$outcomp reaches at an upper limit value of phase-u of a line segment which is not one of three line segments including a line segment of hexagonally shaped allowable reference range $\Delta_6$Pref on which the proceeding direction of the vector of compensated three-phase voltage reference integration value $P_3$refcomp intersects, and including those adjacent line segments, so that a nonzero voltage vector is outputted as a switching state quantity SWS.

As for the nonzero voltage vector, a nonzero voltage vector is outputted which changes in a direction oriented toward either one of two line segments including a line segment intersecting to the proceeding direction of the vector of compensated voltage reference integration value Prefcomp each other and including a nearer line segment to the line segment intersecting thereto, so that a switching state quantity corresponding to the switching state index SW4 is outputted as a switching state quantity SWS3 which changes in a direction toward a lower limit value of phase-u of the hexagonally shaped allowable reference range $\Delta_6$Pref.

From that time onward, the compensated three-phase voltage output integration value $P_3$outcomp reaches at a lower limit value of phase-u among three line segments including a line segment of hexagonally shaped allowable reference range $\Delta_6$Pref on which the proceeding direction of the vector of compensated three-phase voltage reference integration value $P_3$refcomp intersects, and including those adjacent line segments, so that a switching state quantity corresponding to a switching state index SW0 or SW7 is outputted as a switching state quantity SWS4 to give a zero voltage vector.

Therefore, in comparison with the switching determination method of Embodiment 1, outputted in Embodiment 3 is a nonzero voltage vector which changes in a direction of phase (here, a direction in parallel with a specific coordinate axis among the uvw coordinate axes) at the time of the switching state quantity SWS1 of FIG. 12; and thus, a harmonic voltage Vthd and a harmonic current Ithd originating in the harmonic voltage Vthd are suppressed, in comparison with Embodiment 1.

And then, in comparison with the switching determination method of Embodiment 2, outputted in Embodiment 3 is a nonzero voltage vector which changes in a direction toward an upper limit value of phase-v such as the transition from the switching state quantity SWS1 of FIG. 12 to the switching state quantity SWS2 thereof; and thus, a harmonic voltage Vthd and a harmonic current Ithd originating in the harmonic voltage Vthd are further suppressed than the method in which a nonzero voltage vector changing in a direction of a phase at which a voltage output integration value Pout of Embodiment 2 reaches is outputted. Calculation costs in the switching determination method are almost the same also in comparison with those of Embodiments 1 and 2.

Figure 13:
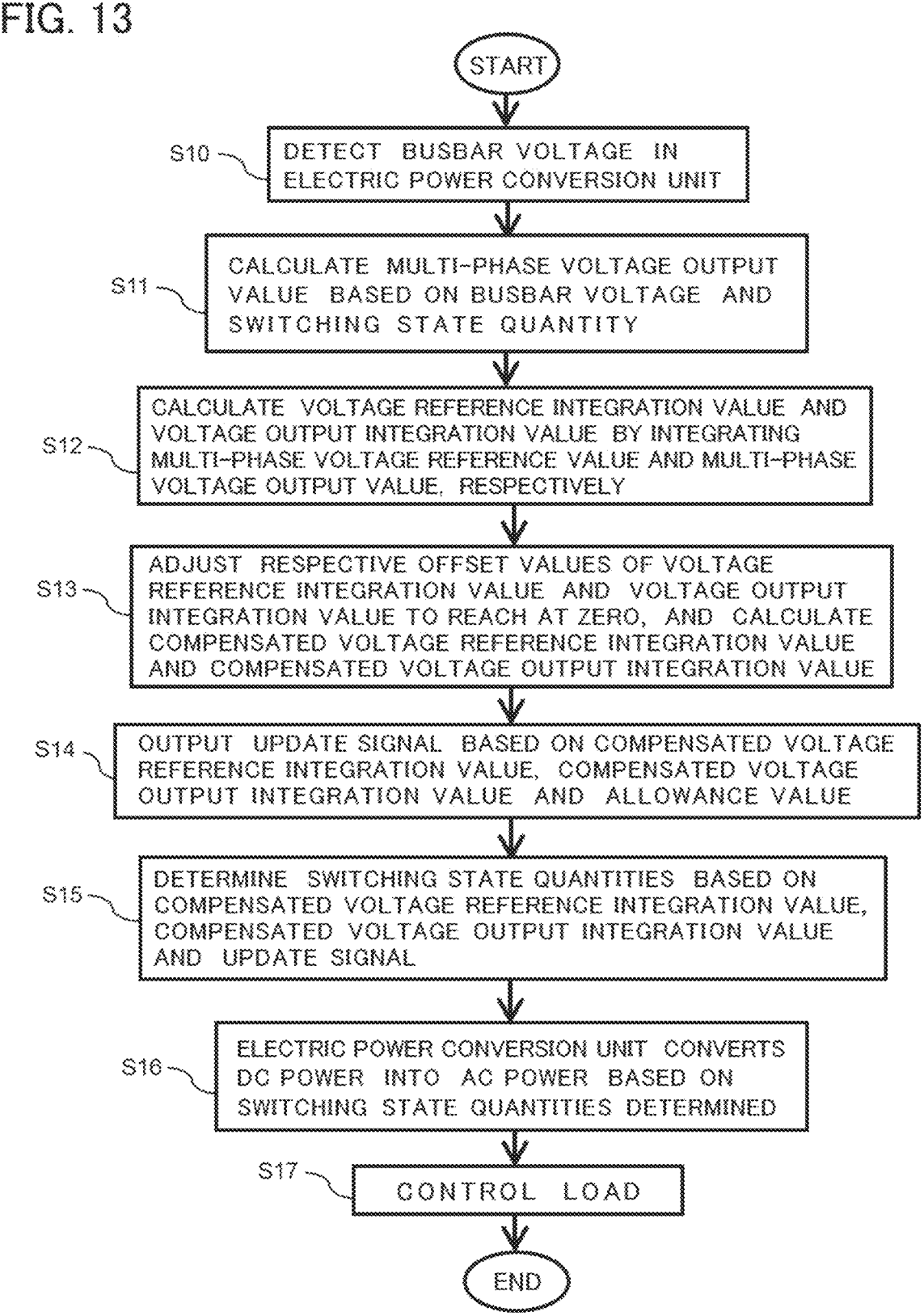
FIG. 13 is a flowchart diagram showing, by way of example, the operations of the power conversion device according to Embodiment 3.

Next, the explanation will be hereinafter made in detail referring to FIG. 13 for the control operations in the power conversion device 100B according to Embodiment 3. FIG. 13 is a flowchart diagram for explaining the control operations in the power conversion device 100B (refer to FIG. 10).

In FIG. 13, first, the busbar voltage detection unit 15 detects a busbar voltage Vdc in the electric power conversion unit 1 (Step S10).

Next, the voltage output calculation unit 11A calculates a multi-phase voltage output value Vout, on the basis of the busbar voltage Vdc detected by the busbar voltage detection unit 15 and on that of a switching state quantity SWS where the switching determination table 14B outputs (Step S11).

Subsequently, the processing is carried out in similar procedures to those of Embodiments 1 and 2, and the integration value calculation unit 12 calculates a voltage reference integration value Pref and a voltage output integration value Pout by integrating a multi-phase voltage reference value Vref and the multi-phase voltage output value Vout, respectively (Step S12).

The offset adjustment unit 16 adjusts an offset value of a voltage reference integration value Pref and that of a voltage output integration value Pout to reach at zero (0) each, and outputs an adjusted voltage reference integration value Pref and an adjusted voltage output integration value Pout as a post-compensation or compensated voltage reference integration value Prefcomp and a post-compensation or compensated voltage output integration value Poutcomp, respectively (Step S13).

The switching update-determination unit 13A outputs an update signal Snew whether or not a switching state quantity SWS in the electric power conversion unit 1 is to be updated, on the basis of the compensated voltage reference integration value Prefcomp, on that of the compensated voltage output integration value Poutcomp and on that of an allowable reference range $\Delta$Pref (Step S14).

The switching determination table 14B determines a switching state quantity SWS in the electric power conversion unit 1, on the basis of the compensated voltage reference integration value Prefcomp, on that of the compensated voltage output integration value Poutcomp and on that of the update signal Snew, by following the changes of switching state quantities as shown in FIG. 12 (Step S15).

And then, the electric power conversion unit 1 converts DC power of the DC power source 2 into AC power on the basis of the switching state quantities SWS determined by the switching determination table 14B, and outputs the AC power into the load 3, so that a drive control is performed on the load 3 (Step S16 and Step S17).

The power conversion device 100B of Embodiment 3 comprises: the electric power conversion unit 1 for converting DC power of the DC power source 2 into AC power, and for supplying it into the load 3; the busbar voltage detection unit 15 for detecting a busbar voltage Vdc in the electric power conversion unit 1; the voltage output calculation unit 11A for calculating a multi-phase voltage output value Vout, on the basis of the busbar voltage Vdc detected by the busbar voltage detection unit 15 and on that of a switching state quantity SWS outputted from the switching determination table 14B; the integration value calculation unit 12 for calculating a voltage reference integration value Pref and a voltage output integration value Pout by integrating a multi-phase voltage reference value Vref and the multi-phase voltage output value Vout, respectively; the offset adjustment unit 16 for adjusting an offset value of the voltage reference integration value Pref and that of the voltage output integration value Pout to reach at "0" each, and for outputting respective integration values as a post-compensation or compensated voltage reference integration value Prefcomp and a post-compensation or compensated voltage output integration value Poutcomp; the switching update-determination unit 13A for determining whether or not a switching state quantity SWS in the electric power conversion unit 1 is to be updated on the basis of the compensated voltage reference integration value Prefcomp, on that of the compensated voltage output integration value Poutcomp and on that of an allowable reference range ΔPref to be set on the compensated voltage reference integration value Prefcomp; and the switching determination table 14B for determining a switching state quantity SWS in the electric power conversion unit 1 on the basis of the compensated voltage reference integration value Prefcomp, on that of the compensated voltage output integration value Poutcomp, on that of a proceeding direction of the vector of compensated voltage reference integration value Prefcomp calculated from the compensated voltage reference integration value Prefcomp and on that of an update signal Snew. In the power conversion device 100B, the switching update-determination unit 13A outputs numeral "1" as an update signal Snew in a case in which any phase of a three-phase voltage output integration value $P_3$out reaches at any line segment of hexagonally shaped allowable reference range $\Delta_6$Pref made of a voltage allowance value Pdelta where an allowable reference range ΔPref is set on a three-phase voltage reference integration value $P_3$ref, and outputs numeral "0" as the update signal Snew in another case other than the above; and the switching determination table 14B updates a switching state quantity SWS in the electric power conversion unit 1 when the update signal Snew is at "1."

The switching determination table 14B outputs a zero voltage vector as a switching state quantity SWS in the electric power conversion unit 1, in a case in which the compensated voltage output integration value Poutcomp reaches at three line segments including a line segment of hexagonally shaped allowable reference range $\Delta_6$Pref on which the proceeding direction of a vector of compensated voltage reference integration value Prefcomp intersects, and including those adjacent line segments; and the switching determination table 14B outputs a switching state quantity SWS in the electric power conversion unit 1 a nonzero voltage vector is outputted which changes in a direction oriented toward either one of two line segments including a line segment intersecting to the proceeding direction of the vector of compensated voltage reference integration value Prefcomp each other and including a nearer line segment to the line segment intersecting thereto, in a case in which the compensated voltage output integration value Poutcomp reaches at the remaining three line segments.

For this reason, the power conversion device 100B of Embodiment 3 can make an error between a voltage reference integration value Pref and a voltage output integration value Pout smaller than those of Embodiments 1 and 2; and thus, a harmonic voltage Vthd and a harmonic current Ithd originating in the harmonic voltage Vthd can be suppressed without increasing calculation costs, and a value in which a multi-phase voltage value is integrated takes on being multi-phase balanced at all times by means of the offset adjustment unit 16, so that the performance of update determination on a switching state quantity SWS and that of determining the switching state quantity SWS do not be degraded.

Embodiment 4

The explanation will be made hereinafter referring to FIG. 14 for an electrical power conversion device according to Embodiment 4. Here, FIG. 14 is a block diagram illustrating a configuration of the power conversion device 100C according to Embodiment 4.

Figure 14:
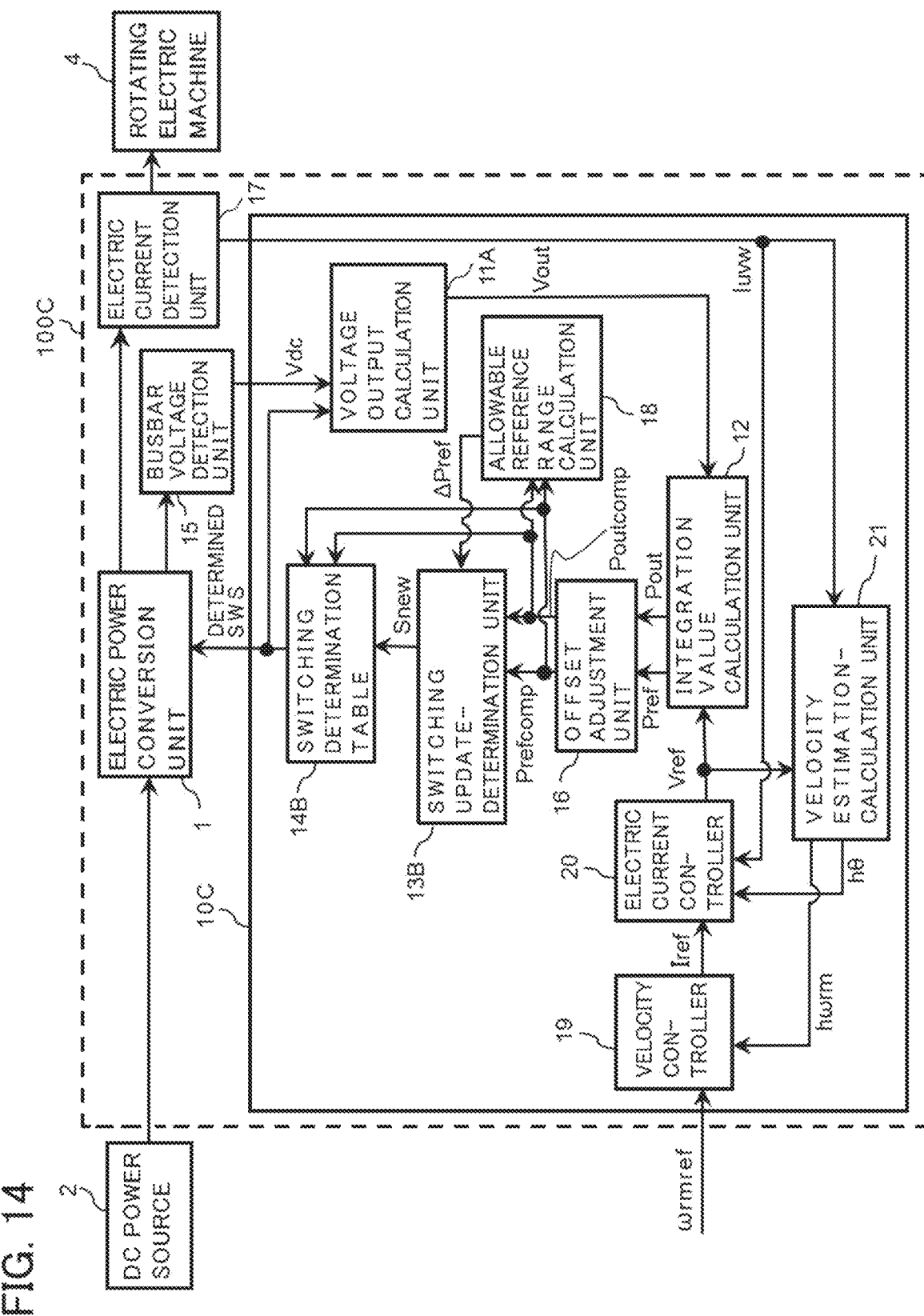
FIG. 14 is a block diagram illustrating a configuration of an electrical power conversion device according to Embodiment 4.

As illustrated in FIG. 14, the power conversion device 100C differs from the power conversion devices 100, 100A and 100B of Embodiments 1 through 3 in a point in which the load 3 is replaced by a rotating electric machine 4, and the power conversion device 100C comprises an electric current detection unit 17 for detecting an electric current flowing between the electric power conversion unit 1 and the rotating electric machine 4. The power conversion device 100C also differs therefrom in a point in which the power conversion device 100C comprises a velocity estimation-calculation unit 21 being an adjustive or adaptive magnetic-flux observer as an angular velocity estimation means of the rotating electric machine 4, and a point in which the power conversion device 100C further comprises a velocity controller 19 for controlling an angular velocity of the rotating electric machine 4, and an electric current controller 20 for controlling an electric current thereof. The power conversion device 100C yet further differs therefrom in a point in which a switching state quantity is calculated, on the basis of a post-compensation or compensated voltage reference integration value Prefcomp, where an allowable reference range ΔPref is compensated, which is used in a switching update-determination unit 13B, and on that of post-compensation or compensated voltage output integration value Poutcomp which is also used therein.

In what follows, the same reference numerals and symbols designate equivalent items or portions for a constituent element(s) having a similar function(s) to Embodiments 1 through 3, and thus their explanation is omitted. And then, the explanation will be made focusing on different points from those of Embodiments 1 through 3.

FIG. 14 is the block diagram illustrating the configuration of the power conversion device 100C according to Embodiment 4. As illustrated in FIG. 14, the power conversion device 100C according to Embodiment 4 differs, in comparison with that according to Embodiment 3, in a point in which the load 3 is replaced by the rotating electric machine 4, and the power conversion device 100C comprises the electric current detection unit 17 between the electric power conversion unit 1 and the rotating electric machine 4, and in a point in which a control device 10C comprises the switching update-determination unit 13B in place of the switching update-determination unit 13A. The power conversion device 100C also differs in a point in which the power conversion device further comprises: the velocity estimation-calculation unit 21 for estimating an angular velocity of the rotating electric machine 4 and a phase thereof; the velocity controller 19 for controlling an angular velocity ωrm of the rotating electric machine 4; the electric current controller 20 for controlling an electric current Ir into the rotating electric machine 4; and an allowable reference range calculation unit 18 for calculating an allowable reference range ΔPref to be newly set, from a compensated voltage reference integration value Prefcomp and from a compensated voltage output integration value Poutcomp.

Next, the explanation will be made hereinafter for the functions of the switching update-determination unit 13B of Embodiment 4, the electric current detection unit 17 thereof, the allowable reference range calculation unit 18 thereof, the velocity controller 19 thereof, the electric current controller 20 thereof and the velocity estimation-calculation unit 21, which are the differences from those of Embodiment 3.

The electric current detection unit 17 detects an electric current flowing between the electric power conversion unit 1 and the rotating electric machine 4.

The allowable reference range calculation unit 18 calculates an allowable reference range ΔPref to be newly set, on the basis of a compensated voltage reference integration value Prefcomp calculated by the offset adjustment unit 16 and on that of a compensated voltage output integration value Poutcomp calculated thereby.

Here, when the allowable reference range ΔPref is calculated, phase information calculated from the compensated voltage reference integration value Prefcomp may be used. In addition, the allowable reference range ΔPref may be calculated as a mathematical function which depends on any value related to an input value.

The switching update-determination unit 13B outputs an update signal Snew for which determination is performed whether or not a switching state quantity SWS in the electric power conversion unit 1 is to be updated, on the basis of a compensated voltage reference integration value Prefcomp, on that of a compensated voltage output integration value Poutcomp and on that of an allowable reference range ΔPref calculated by the allowable reference range calculation unit 18. For example, when a switching state quantity SWS in the electric power conversion unit 1 is to be updated, numeral "1" is outputted as an update signal Snew, whereas, when the switching state quantity SWS is not to be updated, numeral "0" is outputted as the update signal Snew.

The velocity controller 19 calculates an electric current instruction or reference value Iref for controlling an angular velocity ωrm of the rotating electric machine, on the basis of an angular velocity instruction or reference value ωrmref and on that of an angular velocity estimate value hωrm having been calculated by the velocity estimation-calculation unit 21. As an method for calculating the electric current reference value Iref, it is only necessary for the method to make an angular velocity ωrm of a rotating electric machine be coincident with respect to an angular velocity reference value ωrmref, and so, a proportional and integral (PI) controller (PI controller) and/or a proportional integral and differential controller (PID controller) may be used.

The electric current controller 20 calculates a multi-phase voltage reference value Vref for controlling an electric current Ir flowing into the rotating electric machine, on the basis of an electric current reference value Iref having been calculated by the velocity controller 19, on that of a detected electric current value Iuvw having been detected by the electric current detection unit 17 and on that of a phase estimate value hθ having been calculated by the velocity estimation-calculation unit 21. As an method for calculating a multi-phase voltage reference value Vref, it is only necessary for the method to make an electric current Ir flowing into a rotating electric machine be coincident with respect to an electric current reference value Iref in a rotational coordinate system, and so, it may also be so arranged that, after performing the transformation of coordinate system on the electric current Ir flowing into the rotating electric machine into a value(s) in a rotational coordinate system, a voltage reference value in the rotational coordinate system is calculated by using a PI controller and/or a PID controller, and that the multi-phase voltage reference value Vref is calculated by performing the transformation of coordinate system.

The velocity estimation-calculation unit 21 carries out estimation calculations on an angular velocity ωrm of the rotating electric machine and a phase θ thereof, on the basis of a multi-phase voltage reference value Vref and on that of a detected electric current value Iuvw of the electric current detection unit 17.

Figure 15:
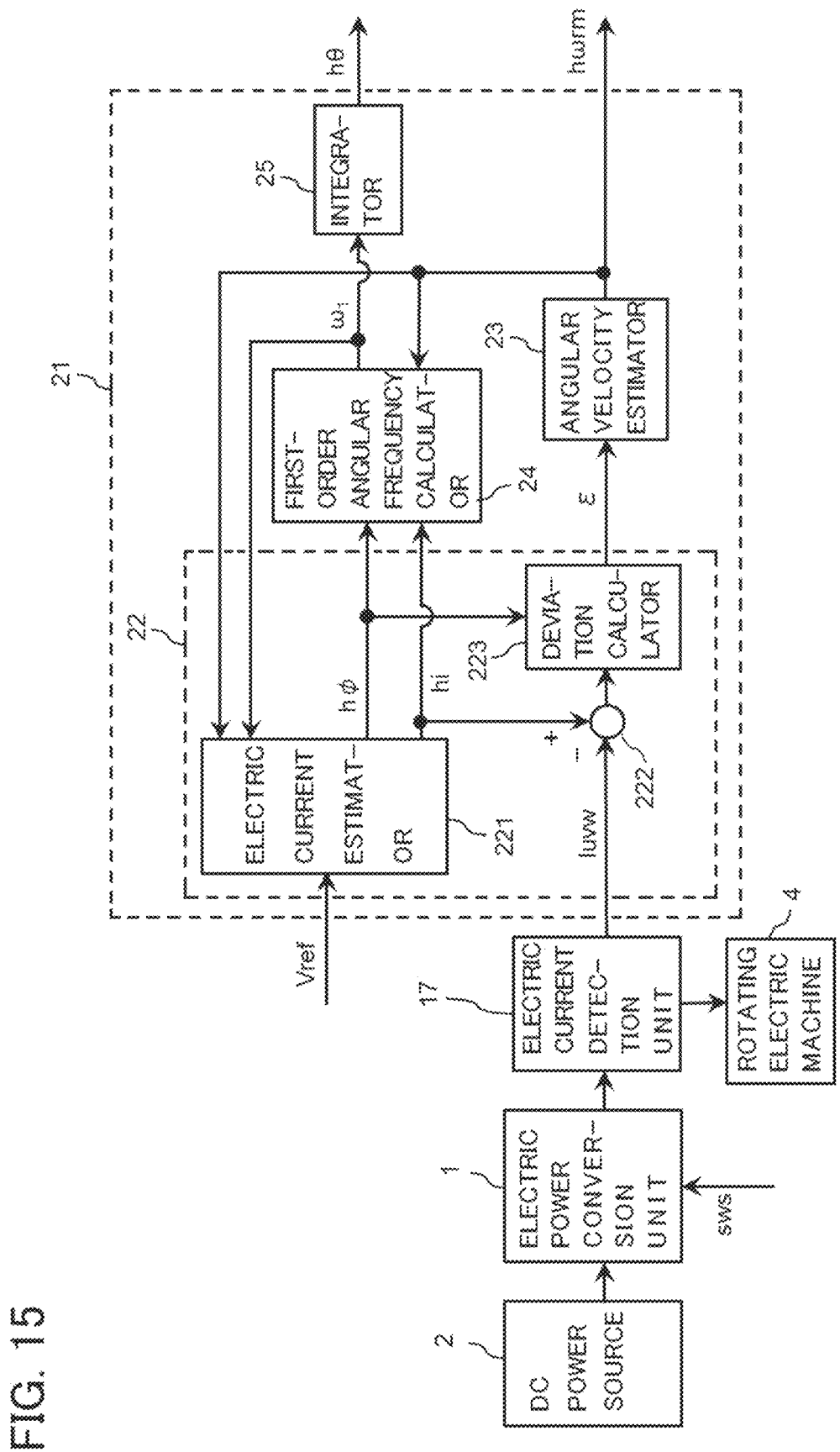
FIG. 15 is a block diagram illustrating a configuration of a velocity estimation-calculation unit according to Embodiment 4.

FIG. 15 is a block diagram illustrating a configuration of the velocity estimation-calculation unit 21. The velocity estimation-calculation unit 21 is made of an adjustive or adaptive observer, and carries out estimation calculations on a phase θ of the rotating electric machine 4 and on an angular velocity ωrm thereof. Because the adaptive observer is specified by an equation of states taking on stator's magnetic flux φs of the rotating electric machine 4 and rotor's magnetic flux φr thereof as state parameters, the adaptive observer is also referred to as an adaptive magnetic-flux observer. Note that, as those state parameters, the adaptive observer can also be made by utilizing an extended induced-voltage, an electric current or the like.

The velocity estimation-calculation unit 21 illustrated in FIG. 15 calculates an angular velocity estimate value hωrm and a phase estimate value hθ by using a multi-phase voltage reference value Vref and a detected electric current value Iuvw, and outputs an angular velocity estimate value hωrm and a phase estimate value hθ having been calculated, respectively. The multi-phase voltage reference value Vref is a value calculated by the electric current controller 20, and the detected electric current value Iuvw is a value detected by the electric current detection unit 17. Here, into the velocity estimation-calculation unit 21, the multi-phase voltage reference value Vref is inputted; however, by detecting a voltage value outputted from the electric power conversion unit 1, the voltage output value having been detected therefrom may also be used as an input value into the velocity estimation-calculation unit 21.

The velocity estimation-calculation unit 21 includes a model deviation calculation unit 22, an angular velocity estimator 23, a primary or first-order angular frequency calculator 24 and an integrator 25. The model deviation calculation unit 22 calculates a model deviation ε on the basis of a multi-phase voltage reference value Vref, on that of a detected electric current value Iuvw, on that of a primary or first-order angular frequency $\omega_1$ and on that of an angular velocity estimate value hωrm. The angular velocity estimator 23 calculates an angular velocity estimate value hωrm on the basis of the model deviation ε. The first-order angular frequency calculator 24 calculates a primary or first-order angular frequency $\omega_1$ on the basis of a magnetic flux estimate value hφ, on that of an electric current estimate value hi and on that of the angular velocity estimate value. The integrator 25 outputs a phase estimate value hθ by integrating the first-order angular frequency ω₁.

The model deviation calculation unit 22 includes an electric current estimator 221, a subtracter 222 and a deviation calculator 223. The electric current estimator 221 calculates a magnetic flux estimate value hφ and an electric current estimate value hi on the basis of a multi-phase voltage reference value Vref, on that of a detected electric current value Iuvw, on that of a first-order angular frequency ω₁ and on that of an angular velocity estimate value hωrm, and outputs the magnetic flux estimate value hφ having been calculated and the electric current estimate value hi having been calculated. The subtracter 222 calculates an electric current deviation Ierr by subtracting the detected electric current value Iuvw from the electric current estimate value hi, and outputs the electric current deviation Ierr having been calculated.

The deviation calculator 223 calculates a model deviation ε on the basis of the electric current deviation Ierr having been calculated by the subtracter 222 and on that of the magnetic flux estimate value hφ having been calculated thereby. Here, when an electric current deviation Ierr is expressed as a vector quantity and a magnetic flux estimate value hφ is expressed as a vector quantity, a vector of electric current deviation Ierr is defined as an input, and an orthogonal or quadrature component of the vector of magnetic flux estimate value hφ is extracted as a scalar quantity, so that the scalar quantity being extracted is outputted as the model deviation E. As a scheme of extracting an orthogonal or quadrature component of the vector of magnetic flux estimate value hφ as the scalar quantity, publicly known technologies are a scheme of performing the transformation of coordinate system for a vector of electric current deviation Ierr onto a rotating orthogonal coordinate system, and a scheme of calculating the magnitude of an outer product value between the vector of electric current deviation Ierr and a vector of magnetic flux estimate value hφ.

The electric current estimator 221 calculates an electric current estimate value hi and a magnetic flux estimate value hφ from equations of states of the rotating electric machine 4. It is presumed herein that the rotating electric machine 4 is an interior permanent magnet synchronous motor of a general type; however, as far as an equation(s) of states can be formulated as an expression(s), such an electric motor of any kinds as an induction motor, a surface permanent magnet type synchronous motor, a field winding type synchronous motor, or a reluctance-type synchronous motor and the like may also be suitable for. Namely, the electric current estimator 221 can also perform the electric current estimation on a rotating electric machine other than the interior permanent magnet synchronous motor according to a similar method.

In a case in which the rotating electric machine 4 is an interior permanent magnet synchronous motor, equations of states are expressed as given in Expression (1) and Expression (2) described below. Here, "Ld" designates a d-axis inductance; "Lq," a q-axis inductance; "id," a d-axis electric current; "iq," a q-axis electric current; "φds," stator's d-axis magnetic flux; "φqs," stator's q-axis magnetic flux; "φdr," rotor's d-axis magnetic flux; and symbol "^" (an item to which the symbol "^" is added in an upper portion of a character), an estimate value (for example, "hφ" being an estimate value of φ is represented; the same also applies to a case of another estimate value). In addition, "Ra" designates an armature resistance; "ω₁," a first-order angular frequency; "vd," a d-axis voltage; "vq," a q-axis voltage; and, from "h11" through "h32," observer gains each.

In addition, a first-order angular frequency ω₁ is given as Expression (3) described below. In Expression (3), symbols "h41" and "h42" designate observer gains each.

[Expression Figure–1]

$$\frac{d}{dt}\begin{bmatrix}\hat{\phi}_{ds}\\\hat{\phi}_{qs}\\\hat{\phi}_{dr}\end{bmatrix}=\begin{pmatrix}-\frac{R_a}{L_d} & \omega_1 & 0\\-\omega_1 & -\frac{R_a}{L_q} & -\hat{\omega}_{rm}\\0 & 0 & 0\end{pmatrix}\begin{bmatrix}\hat{\phi}_{ds}\\\hat{\phi}_{qs}\\\hat{\phi}_{dr}\end{bmatrix}+\begin{bmatrix}v_d\\v_q\\0\end{bmatrix}-\begin{bmatrix}h_{11} & h_{12}\\h_{21} & h_{22}\\h_{31} & h_{32}\end{bmatrix}\begin{bmatrix}\hat{i}_d-i_d\\\hat{i}_q-i_q\end{bmatrix} \quad (1)$$

[Expression Figure–2]

$$\begin{bmatrix}\hat{i}_d\\\hat{i}_q\end{bmatrix}=\begin{bmatrix}1/L_d & 0 & 0\\0 & 1/L_q & 0\end{bmatrix}\begin{bmatrix}\hat{\phi}_{ds}\\\hat{\phi}_{qs}\\\hat{\phi}_{dr}\end{bmatrix} \quad (2)$$

[Expression Figure–3]

$$\omega_1=\hat{\omega}_{rm}-\frac{h_{41}(\hat{i}_d-i_d)+h_{42}(\hat{i}_q-i_q)}{\hat{\phi}_{dr}} \quad (3)$$

Expression (1) and Expression (2) described above are expressions given on the basis of usual induced-voltages; however, by adding the modification to Expression (1) and that to Expression (2) described above, similar calculations can also be achieved by expressing in a form of extended induced-voltages. Note that, Expression (1) and Expression (2) described above are mathematical expressions in d-q coordinates on the rotational coordinates; however, similar calculations can also be achieved by performing transformation of coordinate system on Expression (1) and that on Expression (2) described above, and by expressing them by another system of coordinates such as an α-β coordinate system of two-phase alternating currents on the static coordinates, or a uvw coordinate system of three-phase alternating currents. In Expression (1), an angular velocity estimate value hωrm is included, and so, when the angular velocity estimate value hωrm and an angular velocity ωrm of an actual rotation are not coincident with each other, an error is caused in an electric current estimate value hi.

Here, a model deviation ε is defined as given in Expression (4) described below, and the velocity estimation-calculation unit 21 adjusts the angular velocity estimate value hωrm by using the angular velocity estimator 23 so that the model deviation ε takes on zero. The angular velocity estimator 23 is made of, for example, a PI controller to which an integrator is directly connected.

[Expression Figure–4]

$$\varepsilon=\frac{\hat{i}_q-i_q}{\hat{\phi}_{dr}} \quad (4)$$

Moreover, in accordance with Expression (3) described above, the first-order angular frequency calculator 24 calculates a first-order angular frequency ω₁ on the basis of a magnetic flux estimate value hφ, on that of an electric current estimate value hi and on that of angular velocity estimate value hωrm. The integrator 25 calculates a phase estimate value hθ by integrating the first-order angular frequency ω₁. Advantageous effects of an adaptive observer are points in which the robustness is achieved with respect to variation of the number of interlinkage magnetic-flux lines, and a velocity estimation error in a steady state is not caused. For these reasons, the adaptive observer is capable of estimating at a high level in its performance an angular velocity ωrm of the rotating electric machine 4.

Figure 16:
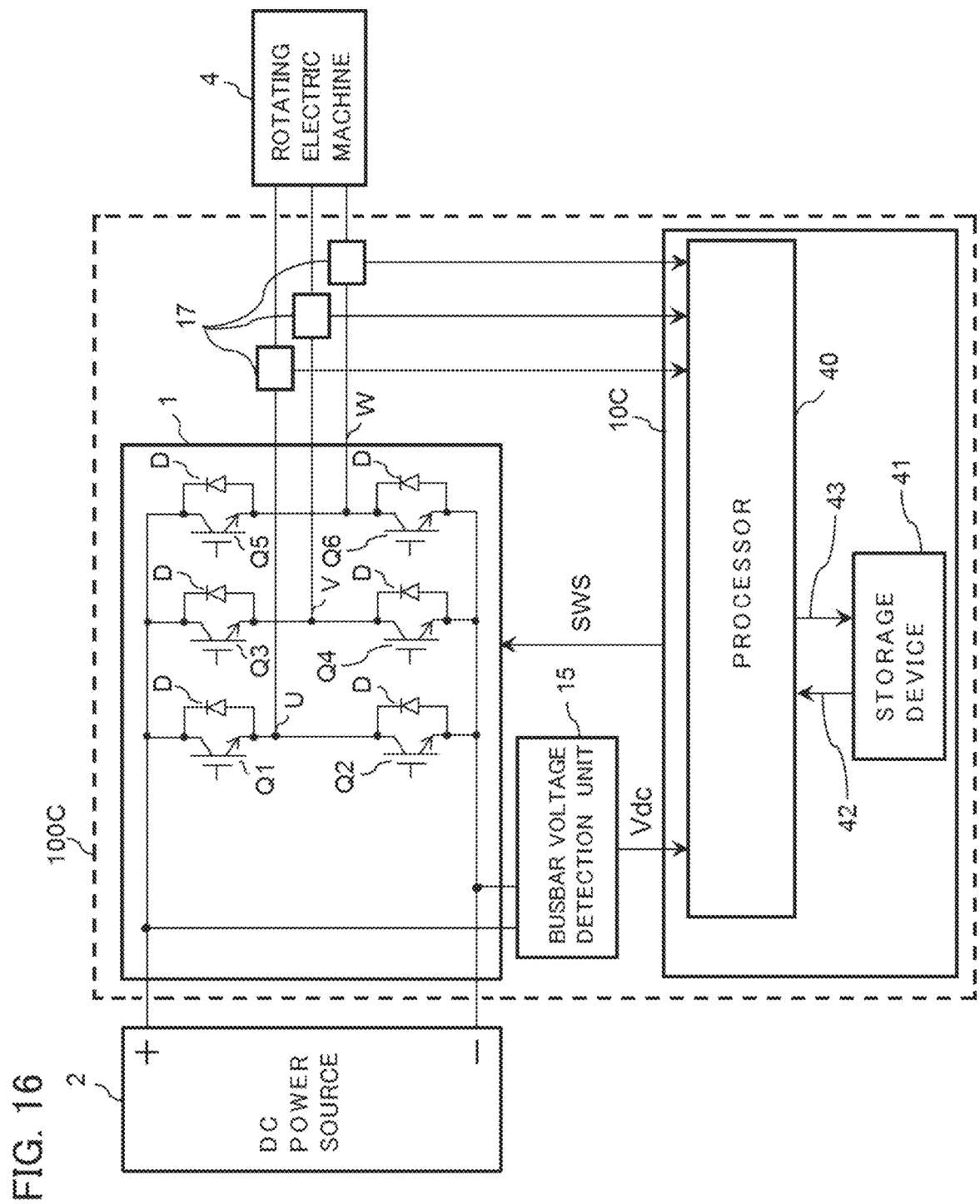
FIG. 16 is a diagram illustrating a hardware configuration of the power conversion device according to Embodiment 4.

FIG. 16 is a diagram illustrating a hardware configuration for implementing the power conversion device 100C. In FIG. 16, the hardware configuration diagram of the power conversion device 100C differs, in comparison with the power conversion device 100B according to Embodiment 3, in a point in which the electric current detection unit 17 is newly added to between the electric power conversion unit 1 and the rotating electric machine 4.

The electric current detection unit 17 detects electric current values of three phase quantities, $I_3uvw$, where the electric power conversion unit 1 outputs an electric current into the rotating electric machine 4. Here, as for the electric current detection unit 17, any one of electric current detectors among a CT (Current Transformer) detector(s), a shunt resistor(s) and the like may be used. A detector may be used in which, among electric currents of three phases, electric currents of two phases are detected and the remaining electric current of one phase is calculated. Moreover, a single shunt electric current detection scheme where three-phase AC current values are restored by one electric current detector may be used.

Figure 17:
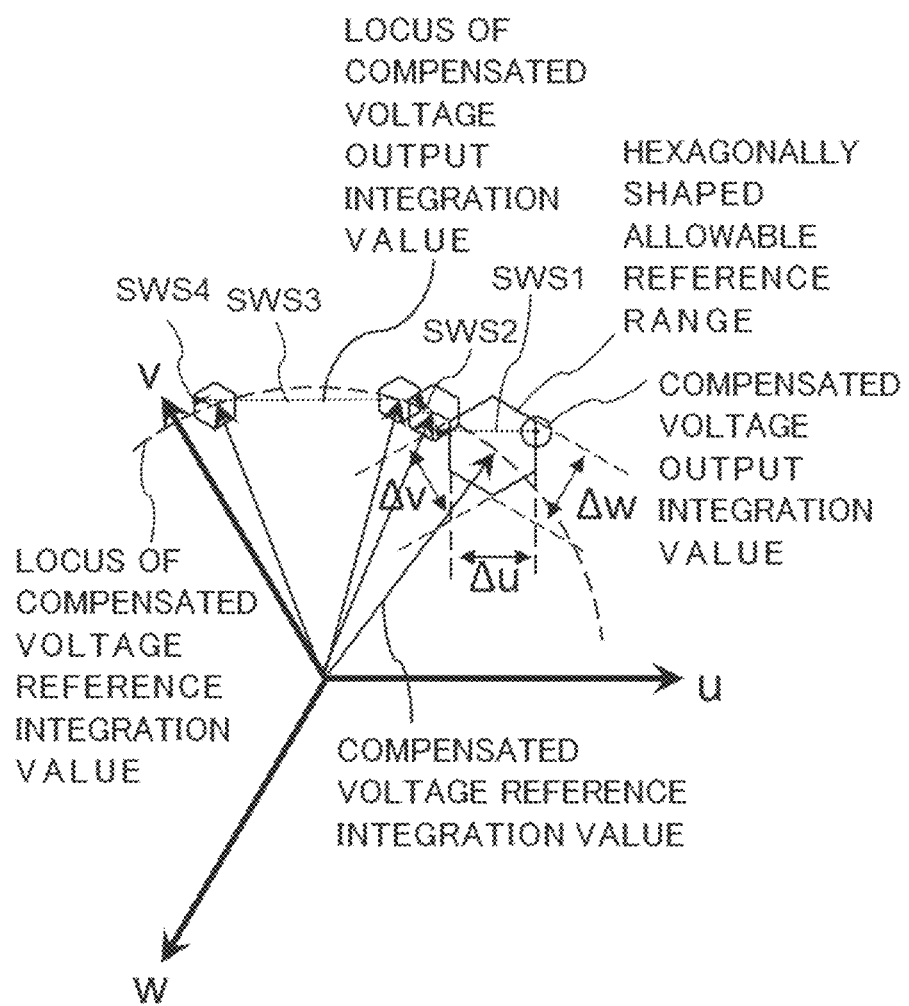
FIG. 17 is a diagram for explaining an update determination method of a switching state quantity and a determination method thereof in an electric power conversion unit according to Embodiment 4.

FIG. 17 is a diagram for explaining a method of determining a switching state quantity SWS in the electric power conversion unit 1 by means of the switching update-determination unit 13B and the switching determination table 14B. In FIG. 17, shown is a case in which a switching state quantity SWS in the electric power conversion unit 1 is determined with respect to a compensated voltage reference integration value Prefcomp and to a compensated voltage output integration value Poutcomp on the uvw coordinate system being a three-phase static coordinate system.

The difference between the switching update-determination unit 13B in Embodiment 4 and the switching update-determination unit 13A in Embodiment 3 is attributed to a point in which, as an allowable reference range ΔPref used at a time when an update signal Snew is calculated whether or not a switching state quantity SWS is to be updated, the allowable reference range ΔPref is calculated on the basis of a compensated voltage reference integration value Prefcomp and on that of a compensated voltage output integration value Poutcomp.

In Embodiment 3, the magnitude of a hexagonally shaped allowable reference range $\Delta_6$Pref drawn by setting an allowable reference range ΔPref on a three-phase voltage reference value $V_3$ref being compensated is made always constant; however, in Embodiment 4, the magnitude of the hexagonally shaped allowable reference range $\Delta_6$Pref changes.

As shown in FIG. 17, a point at which a compensated three-phase voltage output integration value $P_3$outcomp intersects onto an upper limit value of phase-u of the hexagonally shaped allowable reference range $\Delta_6$Pref each other is defined as an initial or start point.

First, the compensated three-phase voltage output integration value $P_3$outcomp intersects onto a hexagonally shaped allowable reference range $\Delta_6$Pref each other, so that the switching update-determination unit 13B outputs numeral "1" as an update signal Snew. The switching determination table 14B carries out the processing in similar procedures to those of Embodiment 3, and outputs a switching state quantity corresponding to a switching state index SW4 as a switching state quantity SWS1 which changes in a direction toward a lower limit value of phase-u of hexagonally shaped allowable reference range $\Delta_6$Pref.

Here, when the magnitude of hexagonally shaped allowable reference range $\Delta_6$Pref changes in such a manner as of FIG. 17 on the basis of a phase of a compensated voltage reference integration value Prefcomp, and after the switching state quantity SWS1 is used, the compensated three-phase voltage output integration value $P_3$outcomp reaches at a lower limit value of phase-v of a line segment which is not one of three line segments including a line segment of hexagonally shaped allowable reference range $\Delta_6$Pref on which a proceeding direction of the vector of compensated three-phase voltage reference integration value $P_3$refcomp intersects, and including those adjacent line segments, so that a switching state quantity corresponding to a switching state index SW3 is outputted as a switching state quantity SWS2 which changes in a direction toward an upper limit value of phase-v of the hexagonally shaped allowable reference range $\Delta_6$Pref.

Next, the compensated three-phase voltage output integration value $P_3$outcomp reaches at an upper limit value of phase-u of a line segment which is not one of three line segments including a line segment of hexagonally shaped allowable reference range $\Delta_6$Pref on which the proceeding direction of the vector of compensated three-phase voltage reference integration value $P_3$refcomp intersects, and including those adjacent line segments, so that a switching state quantity corresponding to the switching state index SW4 is outputted as a switching state quantity SWS3 which changes in a direction toward a lower limit value of phase-u of the hexagonally shaped allowable reference range $\Delta_6$Pref.

From that time onward, the compensated three-phase voltage output integration value $P_3$outcomp reaches at a lower limit value of phase-u among three line segments including a line segment of hexagonally shaped allowable reference range $\Delta_6$Pref on which the proceeding direction of the vector of compensated three-phase voltage reference integration value $P_3$refcomp intersects, and including those adjacent line segments, so that a switching state quantity corresponding to a switching state index SW0 or SW7 is outputted as a switching state quantity SWS4 to give a zero voltage vector.

Therefore, in comparison with the switching determination method of Embodiment 3, the magnitude of allowable reference range ΔPref becomes smaller in Embodiment 4 when a direction of a nonzero voltage vector whose direction changes becomes closer to the proceeding direction of a vector of compensated three-phase voltage reference integration value $P_3$refcomp in such the time of transition from the switching state quantity SWS1 of FIG. 17 to the switching state quantity SWS2 thereof, whereby an error between a three-phase voltage reference integration value $P_3$ref and a three-phase voltage output integration value $P_3$out can be made smaller.

For this reason, according to the switching update determination method in Embodiment 4, a harmonic voltage Vthd and a harmonic current Ithd originating in the harmonic voltage Vthd are further suppressed, in comparison with Embodiment 3.

Figure 18:
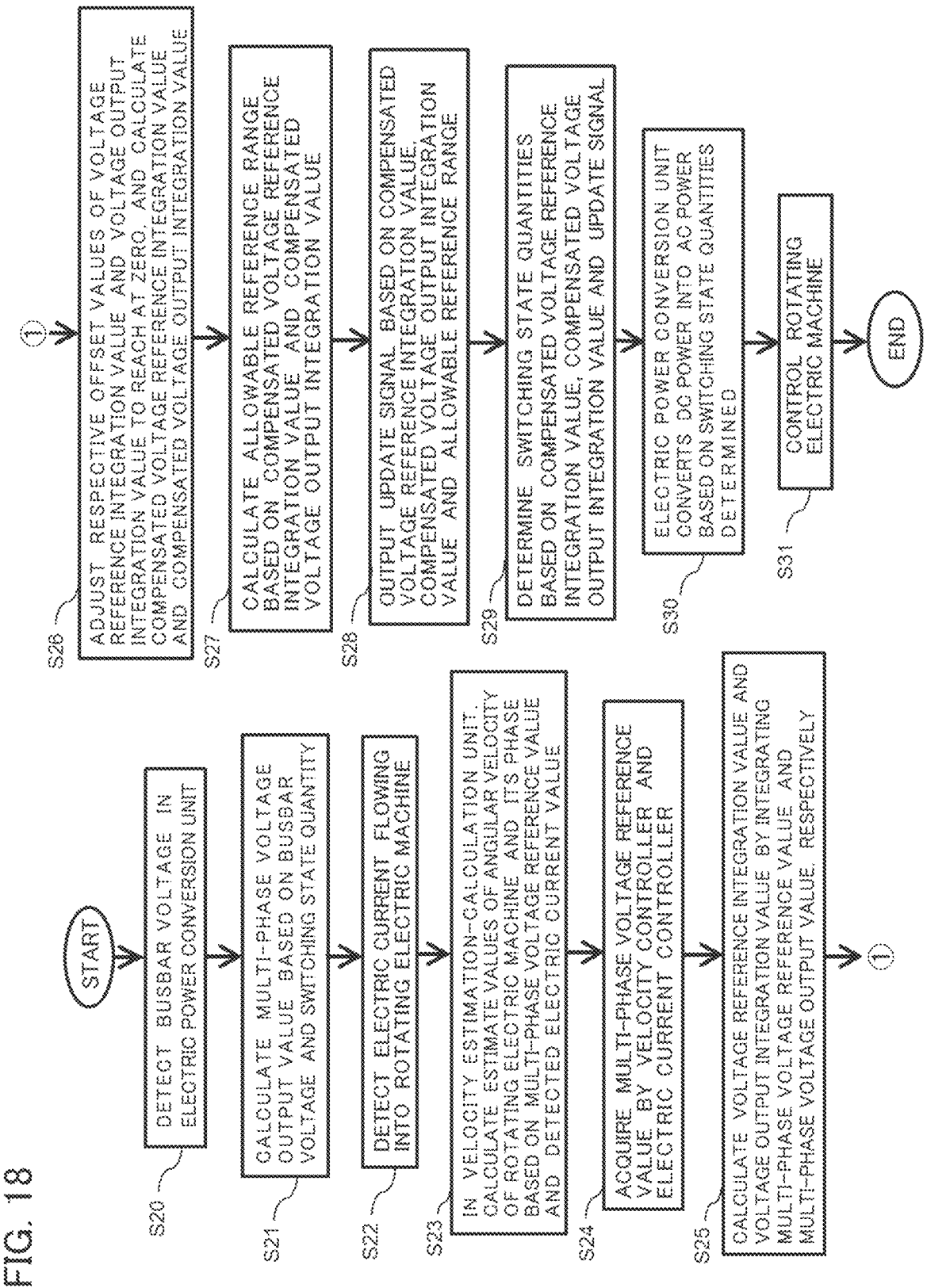
FIG. 18 is a flowchart diagram showing, by way of example, the operations of the power conversion device according to Embodiment 4.

Next, the explanation will be hereinafter made in detail referring to FIG. 18 for the control operations in the power conversion device 100C according to Embodiment 4. Here, FIG. 18 is a flowchart diagram for explaining the control operations in the power conversion device 100C (refer to FIG. 14).

First, in similar procedures to those of Embodiment 3, the voltage output calculation unit 11A calculates a multi-phase voltage output value Vout, on the basis of a busbar voltage Vdc detected by the busbar voltage detection unit 15 and on that of a switching state quantity SWS where the switching determination table 14B outputs (Step S20, Step S21).

Next, the electric current detection unit 17 detects an electric current flowing between the electric power conversion unit 1 and the rotating electric machine 4 (Step S22).

The velocity estimation-calculation unit 21 calculates an estimate value of an angular velocity ωrm of the rotating electric machine 4 and an estimate value of a phase θ thereof, on the basis of a multi-phase voltage reference value Vref and on that of a detected electric current value Iuvw having been detected by the electric current detection unit 17 (Step S23).

By means of the velocity controller 19 and the electric current controller 20, the multi-phase voltage reference value Vref is acquired through calculation, on the basis of an angular velocity reference value ωrmref, on that of an angular velocity estimate value hωrm calculated by the velocity estimation-calculation unit 21, on that of a phase estimate value hθ thereby and on that of the detected electric current value Iuvw (Step S24).

In similar procedures to those of Embodiment 3, the integration value calculation unit 12 and the offset adjustment unit 16 carry out the processing, and calculate a compensated voltage reference integration value Prefcomp and a compensated voltage output integration value Poutcomp (Step S25, Step S26).

The allowable reference range calculation unit 18 calculates an allowable reference range ΔPref, on the basis of the compensated voltage reference integration value Prefcomp and on that of the compensated voltage output integration value Poutcomp (Step S27).

The switching update-determination unit 13B outputs an update signal Snew, on the basis of the compensated voltage reference integration value Prefcomp, on that of the compensated voltage output integration value Poutcomp and on that of the allowable reference range ΔPref calculated by the allowable reference range calculation unit 18 (Step S28).

The switching determination table 14B determines a switching state quantity SWS in the electric power conversion unit 1, on the basis of the compensated voltage reference integration value Prefcomp, on that of the compensated voltage output integration value Poutcomp and on that of the update signal Snew, by following the changes of switching state quantities as shown in FIG. 17 (Step S29).

And then, the electric power conversion unit 1 converts DC power of the DC power source 2 into AC power on the basis of the switching state quantities SWS determined by the switching determination table 14B, and outputs the AC power into the rotating electric machine 4, so that a drive control is performed on the rotating electric machine 4 (Step S30, Step S31).

The power conversion device 100C of Embodiment 4 comprises: the electric power conversion unit 1 for converting DC power of the DC power source 2 into AC power, and for supplying it into the rotating electric machine 4; the busbar voltage detection unit 15 for detecting a busbar voltage Vdc in the electric power conversion unit 1; the voltage output calculation unit 11A for calculating a multi-phase voltage output value Vout, on the basis of the busbar voltage Vdc detected by the busbar voltage detection unit 15 and on that of a switching state quantity SWS outputted from the switching determination table 14B; the electric current detection unit 17 for detecting an electric current flowing between the electric power conversion unit 1 and the rotating electric machine 4; the velocity estimation-calculation unit 21 for carrying out estimation calculations on an angular velocity of the rotating electric machine 4 and a phase thereof, on the basis of a multi-phase voltage reference value Vref and on that of a detected electric current value Iuvw; the velocity controller 19 for calculating an electric current reference value Iref, on the basis of an angular velocity reference value ωrmref and on that of the angular velocity estimate value hωrm; the electric current controller 20 for calculating the multi-phase voltage reference value Vref, on the basis of the electric current reference value Iref, on that of the detected electric current value Iuvw and on that of a phase estimate value hθ; the integration value calculation unit 12 for calculating a voltage reference integration value Pref and a voltage output integration value Pout by integrating the multi-phase voltage reference value Vref calculated by the electric current controller 20 and the multi-phase voltage output value Vout calculated by the voltage output calculation unit 11A, respectively; the offset adjustment unit 16 for adjusting an offset value of the voltage reference integration value Pref and that of the voltage output integration value Pout to reach at "0" each, and for outputting respective integration values as a post-compensation or compensated voltage reference integration value Prefcomp and a post-compensation or compensated voltage output integration value Poutcomp; the allowable reference range calculation unit 18 for calculating an allowable reference range ΔPref, on the basis of a compensated voltage reference integration value Prefcomp and on that of a compensated voltage output integration value Poutcomp; the switching update-determination unit 13B for performing determination whether or not a switching state quantity SWS in the electric power conversion unit 1 is to be updated, on the basis of the compensated voltage reference integration value Prefcomp, on that of the compensated voltage output integration value Poutcomp and on that of the allowable reference range ΔPref calculated by the allowable reference range calculation unit 18; and the switching determination table 14B for determining a switching state quantity SWS in the electric power conversion unit 1, on the basis of the compensated voltage reference integration value Prefcomp, on that of the compensated voltage output integration value Poutcomp, on that of a proceeding direction of the vector of compensated voltage reference integration value Prefcomp calculated from the compensated voltage reference integration value Prefcomp and on that of an update signal Snew. In the power conversion device 100C, the allowable reference range calculation unit 18 calculates an allowable reference range ΔPref to make it smaller in its magnitude on the basis of a compensated voltage reference integration value Prefcomp and on that of a compensated voltage output integration value Poutcomp, when the proceeding direction of the vector of compensated three-phase voltage reference integration value $P_3$refcomp and the proceeding direction of a nonzero voltage vector become closer to each other; and the switching update-determination unit 13B performs determination whether or not a switching state quantity SWS is to be updated, on the basis of an allowable reference range ΔPref calculated by the allowable reference range calculation unit 18. And thus, the switching state quantity SWS is updated so that an error between a three-phase voltage reference integration value $P_3$ref and a three-phase voltage output integration value $P_3$out is made smaller.

For this reason, the power conversion device 100C of Embodiment 4 performs determination on the update of the switching state quantity SWS so that an error between a voltage reference integration value Pref and a voltage output integration value Pout is made smaller than those of Embodiments 1 through 3; and thus, a harmonic voltage Vthd and a harmonic current Ithd originating in the harmonic voltage Vthd can be further suppressed.

Embodiment 5

The explanation will be made hereinafter referring to FIG. 19 for an electrical power conversion device according to Embodiment 5. Here, FIG. 19 is a block diagram illustrating a configuration of the power conversion device 100D according to Embodiment 5.

Figure 19:
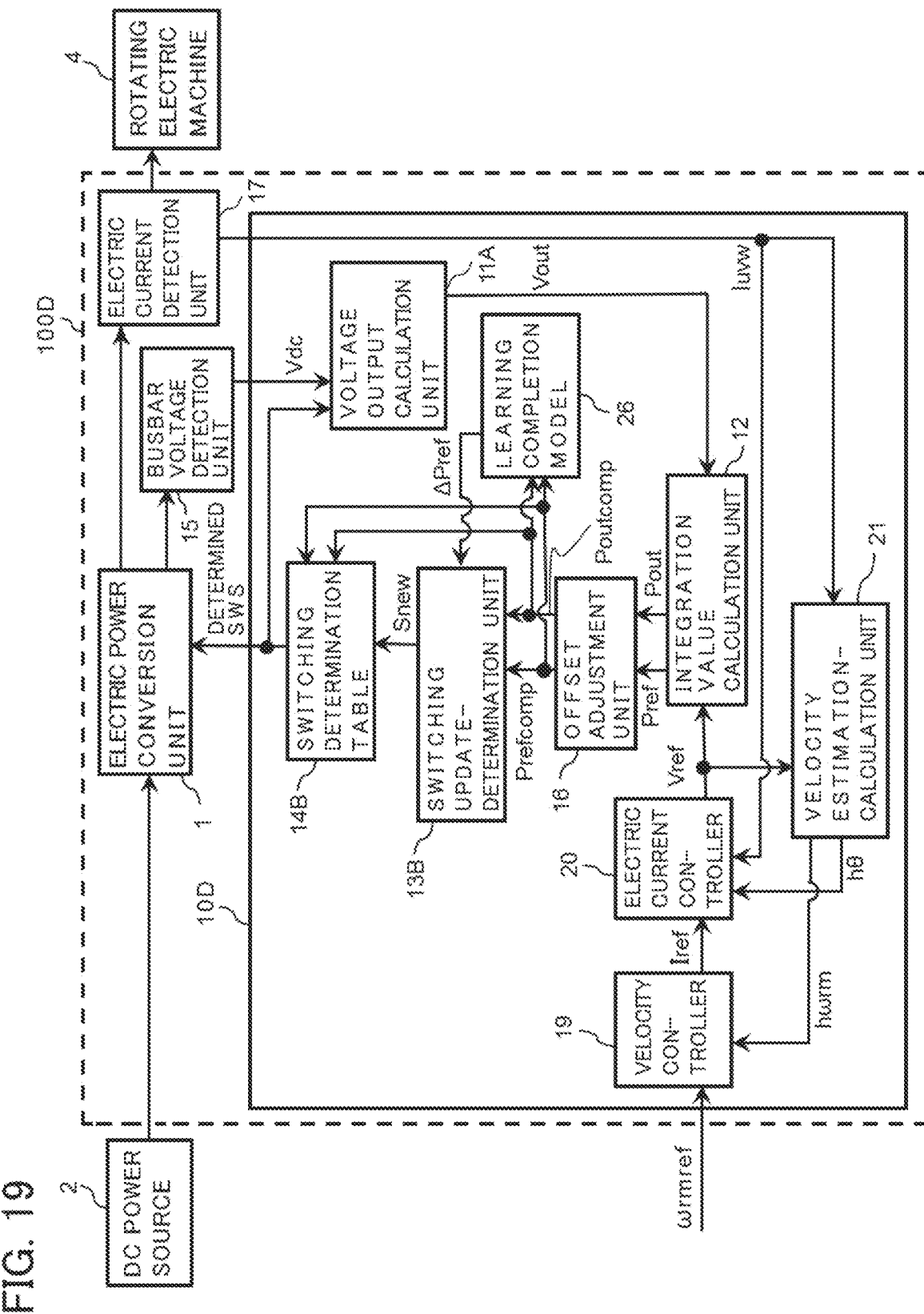
FIG. 19 is a block diagram illustrating a configuration of an electrical power conversion device according to Embodiment 5.

As illustrated in FIG. 19, the power conversion device 100D comprises a control device 10D including a learning finished or completion model 26 in place of the control device 10C including the allowable reference range calculation unit 18, and differs from the power conversion device 100C according to Embodiment 4 in a point in which, in calculating an allowable reference range ΔPref, the calculation is performed by using the learning completion model 26 (which outputs data having been acquired by carrying out machine learning). In what follows, the same reference numerals and symbols designate equivalent items or portions for a constituent element(s) having a similar function(s) to Embodiments 1 through 4, and thus their explanation is omitted. And then, the explanation will be made focusing on different points from those of Embodiments 1 through 4.

FIG. 19 is the block diagram illustrating the configuration of the power conversion device 100D according to Embodiment 5. As illustrated in FIG. 19, the power conversion device 100D according to Embodiment 5 comprises, in comparison with that according to Embodiment 4, the learning completion model 26 in place of the allowable reference range calculation unit 18. For dealing therewith, the explanation will be made hereinafter for the functions of the learning completion model 26 of Embodiment 5, which is the difference from that of Embodiment 4.

In accordance with information having been obtained through machine learning based on training data, the learning completion model 26 makes the reasoning or inference on the basis of a post-compensation or compensated voltage reference integration value Prefcomp, on that of a post-compensation or compensated voltage output integration value Poutcomp, on that of an angular velocity estimate value and on that of a phase estimate value, and calculates an allowable reference range ΔPref.

Figure 20:
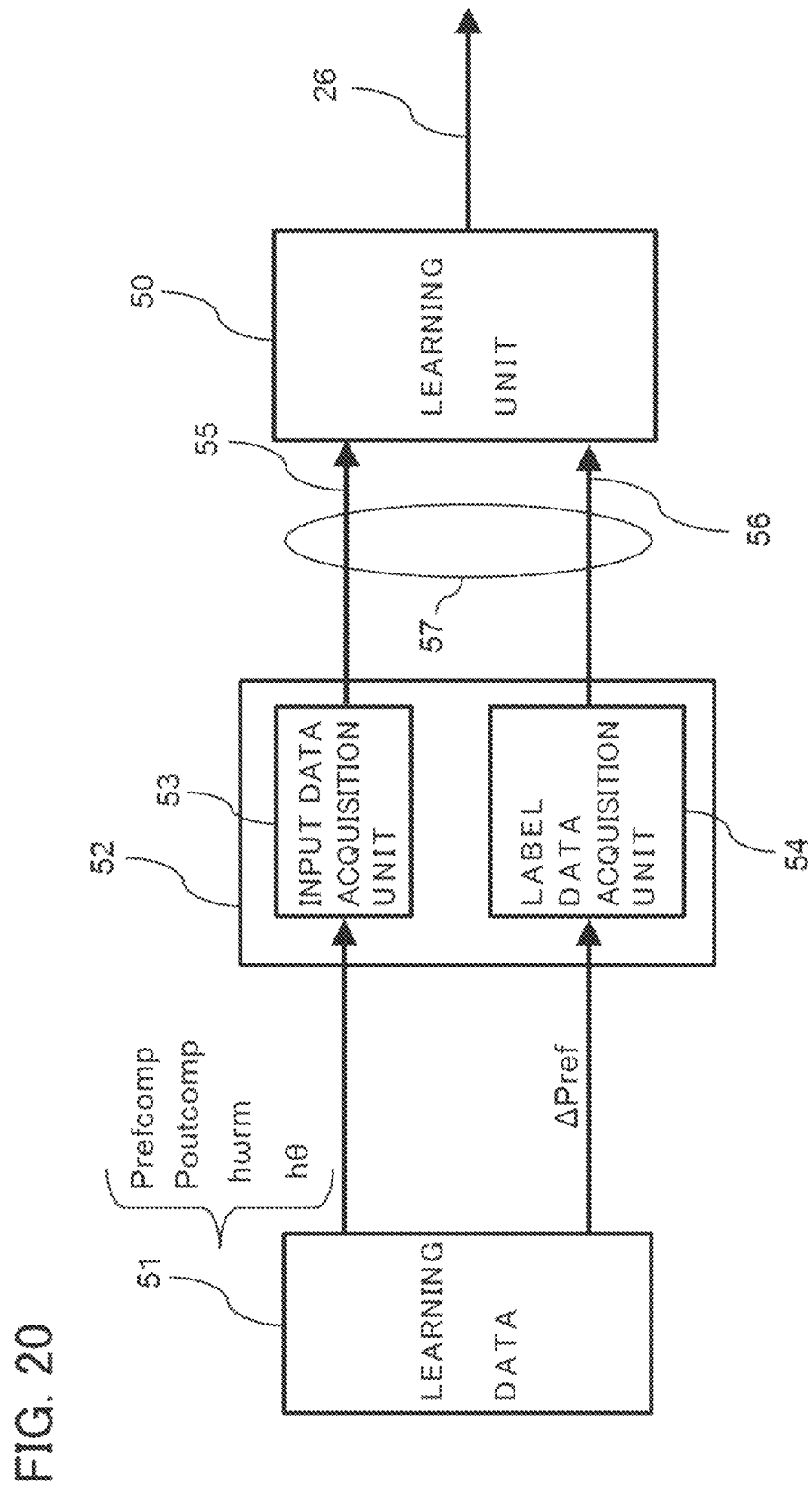
FIG. 20 is a block diagram for explaining a learning completion model and machine learning based on training data according to Embodiment 5.

FIG. 20 is a block diagram for explaining a method of producing a learning completion model, and machine learning based on training data.

As illustrated in FIG. 20, a learning unit 50 performs the machine learning based on the training data 57 obtained from learning data 51 having been prepared in advance, so that the learning completion model is produced.

In the learning data 51, included are a compensated voltage reference integration value Prefcomp, a compensated voltage output integration value Poutcomp, an angular velocity estimate value hωrm, a phase estimate value hθ and an allowable reference range ΔPref. The learning data 51 stores values calculated according to a scheme for driving the rotating electric machine 4; and so, the learning data 51 may be produced by using, for example, a control scheme using a model predictive control, or a control scheme using selective harmonic elimination, low-order harmonic elimination and/or an optimal pulse pattern, where each of which is a control scheme to achieve reducing a switching loss SWloss in the electric power conversion unit 1 in comparison with a PWM scheme.

As illustrated in FIG. 20, the learning data 51 is inputted into a training data acquisition unit 52. The training data acquisition unit 52 includes an input data acquisition unit 53 and a label data acquisition unit 54. The input data acquisition unit 53 acquires from the learning data 51 a compensated voltage reference integration value Prefcomp, a compensated voltage output integration value Poutcomp, an angular velocity estimate value hωrm and a phase estimate value hθ as training-use input data 55, and outputs it into the learning unit 50.

The label data acquisition unit 54 acquires from the learning data 51 an allowable reference range ΔPref as training-use label data 56, and outputs it into the learning unit 50.

The training data 57 is made of the training-use input data 55 and the training-use label data 56, and so, the learning unit 50 carries out the machine learning based on the training data 57 being the combination of the training-use input data 55 with the training-use label data 56.

Training-data implemented or supervised learning of the machine learning in Embodiment 5 is performed by means of a neural network configured by combining perceptrons. And then, the training data 57 according to these pieces of data is given to the neural network, and the learning is repeated in such a manner that, while the weighting for each perceptron is altered, an output of the neural network is to become the same as the training-use label data 56.

In a process of the learning, a weighting value is adjusted so that an error of an output of each perceptron is made smaller by repeatedly performing the processing by means of an error back propagation method. Namely, the training-data supervised learning is in a manner of the learning in which, while a weighting value is adjusted, it is so arranged that the error between the training-use label data 56 and output data of the neural network is to disappear.

In this manner described above, achieved is an accomplished learning completion model for deriving a result by learning the features of the training data 57 and by making inference on the basis of an input(s).

The learning completion model having been produced by means of the machine learning in this manner has the features of the training data 57. For example, when the learning data 51 which is to be transformed into the training data 57 is learning data utilizing a model predictive control, a voltage reference integration value Pref is controlled in the learning completion model at a value equivalent to that when the rotating electric machine 4 is controlled in accordance with the model predictive control; and thus, by using the allowable reference range ΔPref, a switching loss SWloss in the electric power conversion unit 1 can be reduced in comparison with a PWM scheme.

Note that, the neural network in which the learning unit 50 uses for the learning may be configured in three layers; however, the neural network may also be configured further in multiple layers, or may yet be a neural network which carries out machine learning by means of deep learning.

Figure 21:
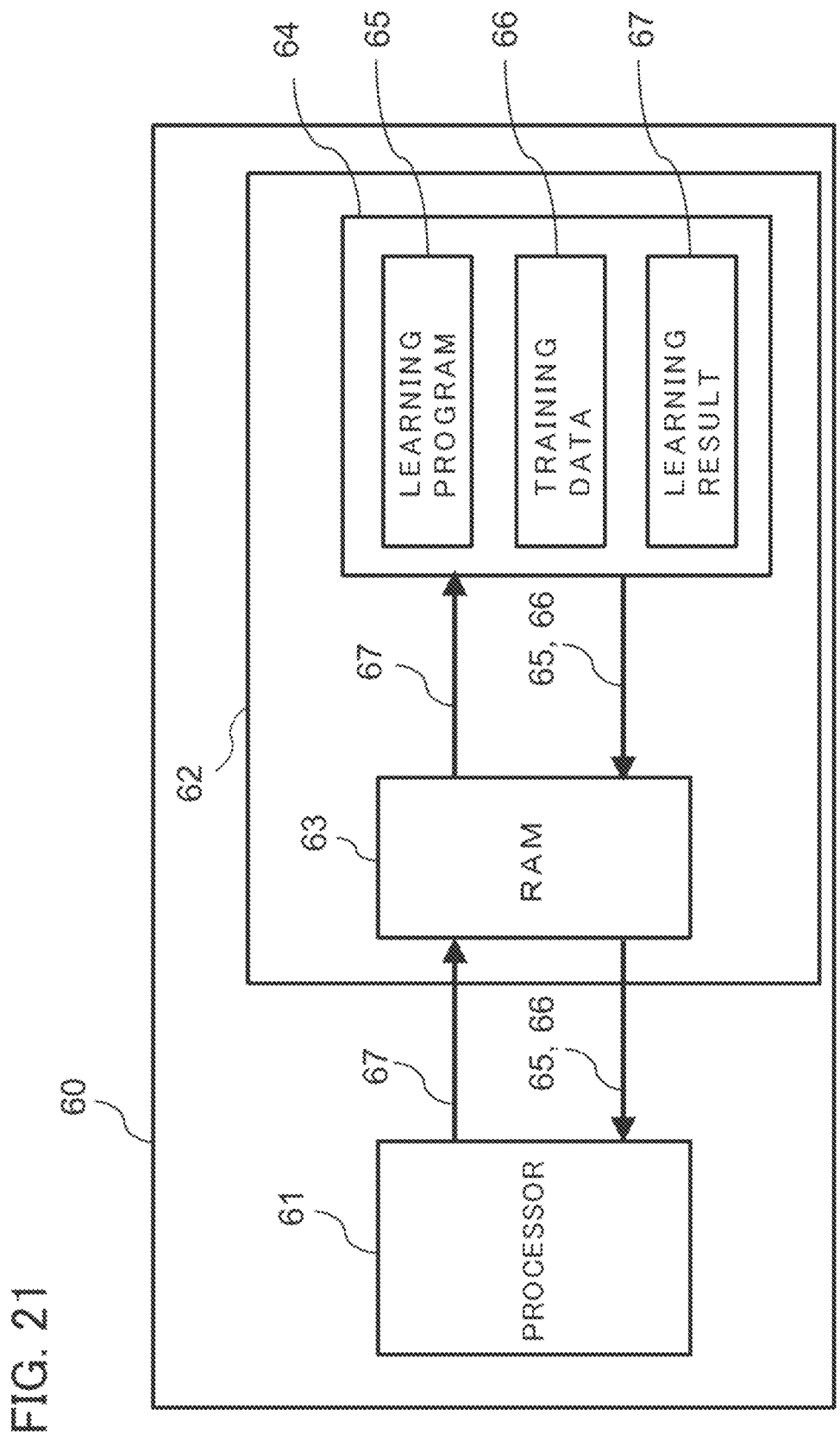
FIG. 21 is a diagram illustrating a hardware configuration for producing the learning completion model according to Embodiment 5.

FIG. 21 is a diagram illustrating a hardware configuration for producing the learning completion model. Machine learning for producing the learning completion model is carried out by a machine learning device 60 which functions as a neural network, and the machine learning device 60 is achieved by means of the hardware configuration illustrated in FIG. 21.

The machine learning device 60 is constituted of a processor 61 and a storage device 62.

The storage device 62 includes, for example, a RAM 63 being a volatile storage device, and, for example, an HDD 64 being a nonvolatile auxiliary storage device. Note that, as the nonvolatile auxiliary storage device, an SSD and/or a flash memory may be used in place of the HDD.

The HDD 64 holds a learning program 65 and training data 66, and also holds a learning result 67 being produced.

Into the processor 61, various kinds of such learning programs 65 are inputted from the HDD 64 by way of the RAM 63, and the processor executes the various kinds of learning programs 65 inputted thereinto. According to the learning programs 65, training-data supervised learning is executed by the processor 61. Namely, the training data 66 is also inputted into the processor 61 from the HDD 64 by way of the RAM 63, and is learned by following the learning programs 65.

In addition, the processor 61 outputs data of the learning result 67 into the RAM 63 of the storage device 62, and stores the data into the HDD 64 by way of the RAM 63 on an as-needed basis.

The learning programs 65 are programs each including instructions for executing the training-data supervised learning by the processor 61, and those for producing data of a result(s) of machine learning (learning result 67).

The machine learning device 60 as the one described above can be implemented by means of a PC (Personal Computer), a server device, or the like. However, because the amount of calculations is large, it may also be so arranged that, for example, GPUs (Graphics Processing Units) are mounted on the PC, and that, by means of a technology called as GPGPUs (General-Purpose computing on Graphics Processing Units), the GPUs are utilized for calculation processing of the training-data supervised learning, which can be processed at high speed.

Figure 22:
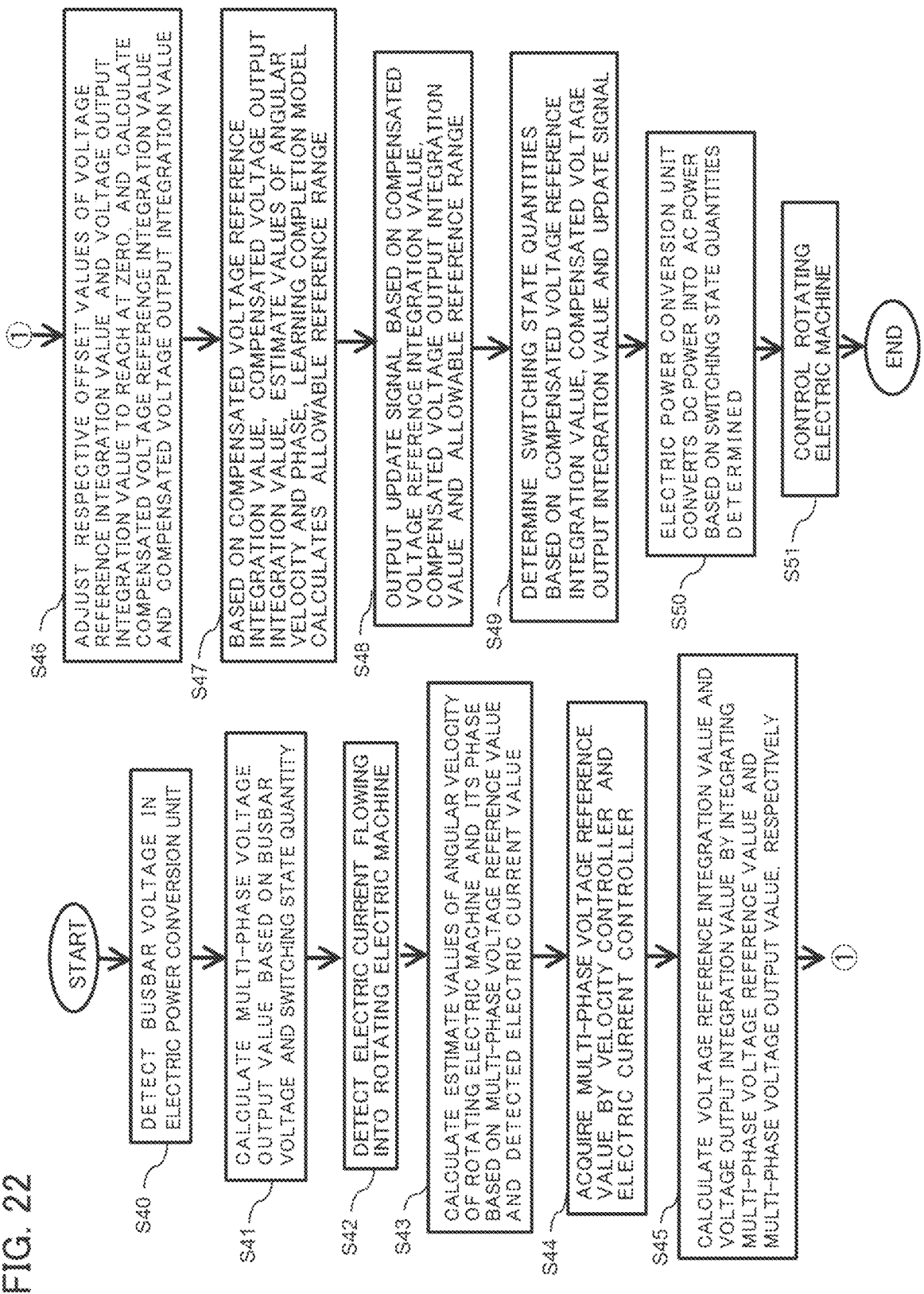
FIG. 22 is a flowchart diagram showing, by way of example, the operations of the power conversion device according to Embodiment 5.

Next, the explanation will be hereinafter made referring to FIG. 22 for the control operations in the power conversion device 100D according to Embodiment 5. Here, FIG. 22 is a flowchart diagram for explaining the control operations in the power conversion device 100D.

First, in similar procedures to those of Embodiment 4, the voltage output calculation unit 11A calculates a multi-phase voltage output value Vout, on the basis of a busbar voltage Vdc detected by the busbar voltage detection unit 15 and on that of a switching state quantity SWS where the switching determination table 14B outputs (Step S40, Step S41).

Next, in similar procedures to those of Embodiment 4, the velocity estimation-calculation unit 21 calculates an estimate value of an angular velocity ωrm of the rotating electric machine 4 and that of a phase θ thereof, on the basis of a multi-phase voltage reference value Vref and on that of a detected electric current value Iuvw having been detected by the electric current detection unit 17 (Step S42, Step S43).

In addition, in similar procedures to those of Embodiment 4, the velocity controller 19 and the electric current controller 20 calculate a multi-phase voltage reference value Vref, on the basis of an angular velocity reference value ωrmref, on that of an angular velocity estimate value hωrm calculated by the velocity estimation-calculation unit 21, on that of a phase estimate value hθ calculated thereby and on that of the detected electric current value Iuvw (Step S44).

In similar procedures to those of Embodiment 4, the integration value calculation unit 12 and the offset adjustment unit 16 carry out the processing, and calculate a compensated voltage reference integration value Prefcomp and a compensated voltage output integration value Poutcomp (Step S45, Step S46).

The learning completion model 26 calculates an allowable reference range ΔPref, on the basis of the compensated voltage reference integration value Prefcomp, on that of the compensated voltage output integration value Poutcomp, on that of an angular velocity estimate value hωrm and on that of a phase estimate value hθ (Step S47).

In similar procedures to those of Embodiment 4, the switching update-determination unit 13B outputs an update signal Snew, on the basis of the compensated voltage reference integration value Prefcomp, on that of the compensated voltage output integration value Poutcomp and on that of the allowable reference range ΔPref calculated by the learning completion model 26; and the switching determination table 14B determines a switching state quantity SWS in the electric power conversion unit 1, on the basis of the compensated voltage reference integration value Prefcomp, on that of the compensated voltage output integration value Poutcomp and on that of the update signal Snew, according to the method shown in FIG. 17 (Step S48, Step S49).

And then, the electric power conversion unit 1 converts DC power of the DC power source 2 into AC power on the basis of a switching state quantity SWS determined by the switching determination table 14B, and outputs the AC power into the rotating electric machine 4, so that a drive control is performed on the rotating electric machine 4 (Step S50 and Step S51).

The power conversion device 100D of Embodiment 5 comprises: the electric power conversion unit 1 for converting DC power of the DC power source 2 into AC power, and for supplying it into the rotating electric machine 4; the busbar voltage detection unit 15 for detecting a busbar voltage Vdc in the electric power conversion unit 1; the voltage output calculation unit 11A for calculating a multi-phase voltage output value Vout, on the basis of the busbar voltage Vdc detected by the busbar voltage detection unit 15 and on that of a switching state quantity SWS outputted from the switching determination table 14B; the electric current detection unit 17 for detecting an electric current flowing between the electric power conversion unit 1 and the rotating electric machine 4; the velocity estimation-calculation unit 21 for carrying out estimation calculations on an angular velocity ωrm of the rotating electric machine 4 and a phase θ thereof, on the basis of a multi-phase voltage reference value Vref and on that of a detected electric current value Iuvw; the velocity controller 19 for calculating an electric current reference value Iref, on the basis of an angular velocity reference value ωrmref and on that of the angular velocity estimate value hωrm; the electric current controller 20 for calculating the multi-phase voltage reference value Vref, on the basis of the electric current reference value Iref, on that of the detected electric current value Iuvw and on that of the phase estimate value hθ; the integration value calculation unit 12 for calculating a voltage reference integration value Pref and a voltage output integration value Pout by integrating the multi-phase voltage reference value Vref calculated by the electric current controller 20 and the multi-phase voltage output value Vout calculated by the voltage output calculation unit 11A, respectively; the offset adjustment unit 16 for adjusting an offset value of the voltage reference integration value Pref and that of the voltage output integration value Pout to reach at "0" each, and for outputting respective integration values as a post-compensation or compensated voltage reference integration value Prefcomp and a post-compensation or compensated voltage output integration value Poutcomp; the learning completion model 26 for making the reasoning or inference on the basis of the compensated voltage reference integration value Prefcomp, on that of the compensated voltage output integration value Poutcomp, on that of the angular velocity estimate value hωrm and on that of the phase estimate value hθ, and for calculating an allowable reference range ΔPref; the switching update-determination unit 13B for performing determination whether or not a switching state quantity SWS in the electric power conversion unit 1 is to be updated, on the basis of the compensated voltage reference integration value Prefcomp, on that of the compensated voltage output integration value Poutcomp and on that of the allowable reference range ΔPref calculated by the learning completion model 26; and the switching determination table 14B for determining the switching state quantity SWS in the electric power conversion unit 1, on the basis of the compensated voltage reference integration value Prefcomp, on that of the compensated voltage output integration value Poutcomp, on that of a proceeding direction of a vector of compensated voltage reference integration value Prefcomp calculated from the compensated voltage reference integration value Prefcomp and on that of an update signal Snew.

According to this arrangement, the power conversion device 100D of Embodiment 5 calculates a compensated voltage reference integration value Prefcomp in which an allowable reference range ΔPref is compensated, a compensated voltage output integration value Poutcomp, an angular velocity estimate value and a phase estimate value, based on the learning completion model 26; and thus, in comparison with Embodiment 4, the power conversion device 100D can modify the allowable reference range ΔPref so that the performance can be achieved as the learning data used for producing the learning completion model 26 which is exactly intended for. Therefore, the power conversion device 100D can achieve the performance as a scheme for controlling the rotating electric machine 4 used for producing the learning data which is exactly intended for.

Embodiment 6

The explanation will be made hereinafter referring to FIG. 23 for an electrical power conversion device according to Embodiment 6. Here, FIG. 23 is a block diagram illustrating a configuration of the power conversion device 100E according to Embodiment 6.

Figure 23:
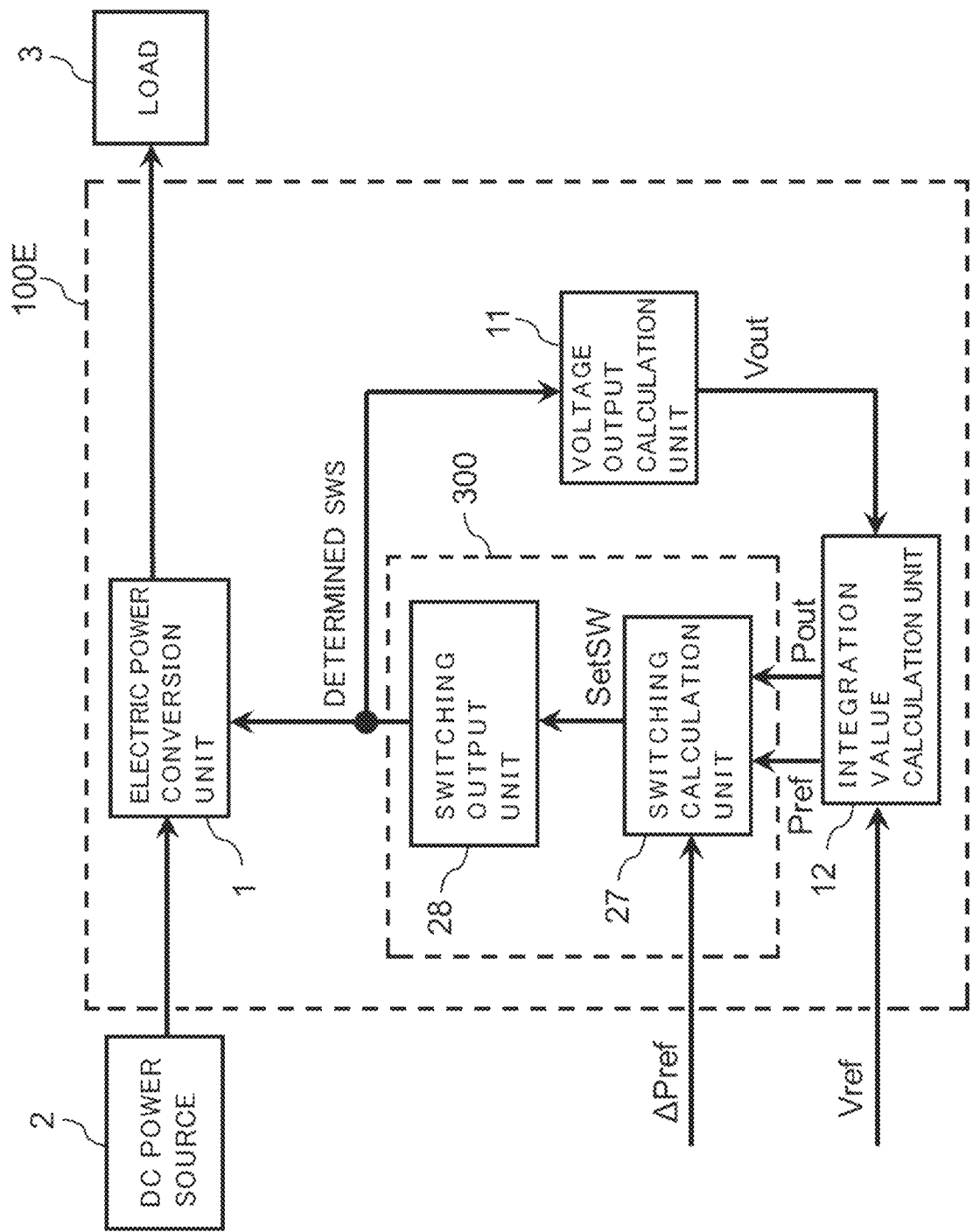
FIG. 23 is a block diagram illustrating a configuration of an electrical power conversion device according to Embodiment 6.

As illustrated in FIG. 23, the power conversion device 100E comprises the switching determination unit 300 for determining a switching state quantity SWS in the electric power conversion unit 1 on the basis of a voltage reference integration value Pref, on that of a voltage output integration value Pout and on that of an allowable reference range ΔPref, and the switching determination unit 300 is constituted of a switching calculation unit 27 and a switching output unit 28; and the switching calculation unit 27 calculates a switching state quantity SWS in the electric power conversion unit 1 and a continuation or duration time Tsw of the switching state quantity SWS as a specification or setting signal SetSW on the basis of the voltage reference integration value Pref, on that of the voltage output integration value Pout and on that of the allowable reference range ΔPref, and the switching output unit 28 outputs a switching state quantity SWS in the electric power conversion unit 1 on the basis of the setting signal SetSW calculated by the switching calculation unit 27.

The power conversion device according to Embodiment 6 differs in a point in which, in comparison with the configuration of the power conversion device according to Embodiments 1 through 5 each, a duration time Tsw of a switching state quantity SWS is calculated. In what follows, the same reference numerals and symbols designate equivalent items or portions for a constituent element(s) having a similar function(s) to Embodiments 1 through 5, and thus their explanation is omitted. And then, the explanation will be made focusing on different points from those of Embodiments 1 through 5.

First, the explanation will be made hereinafter for the functions of the switching calculation unit 27 and the switching output unit 28, which are the differences from those of Embodiments 1 through 5.

The switching calculation unit 27 calculates a switching state quantity SWS in the electric power conversion unit 1 and a duration time Tsw of switching state quantity SWS as a setting signal SetSW, on the basis of a voltage reference integration value Pref, on that of a voltage output integration value Pout and on that of an allowable reference range ΔPref. The explanation will be made later in detail for a calculation method of the switching state quantity SWS and for that of the duration time Tsw of the switching state quantity SWS.

The switching output unit 28 determines a switching state quantity SWS in the electric power conversion unit 1 on the basis of the setting signal SetSW calculated by the switching calculation unit 27.

Figure 24:
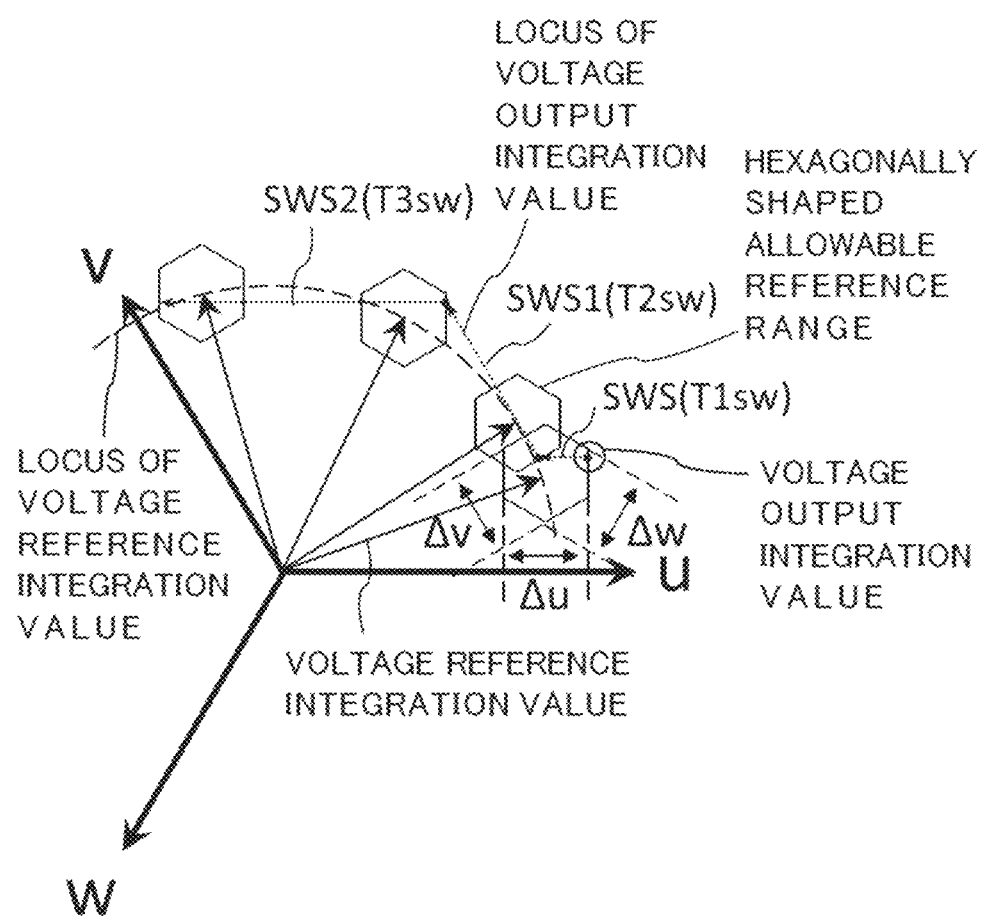
FIG. 24 is a diagram for explaining a calculation method of a switching state quantity and that of a duration time of the switching state quantity in the power conversion device according to Embodiment 6.

FIG. 24 is a diagram for explaining a method of calculating a switching state quantity SWS and a duration time Tsw of the switching state quantity SWS in the switching calculation unit 27. In FIG. 24, shown is a case in which a switching state quantity SWS in the electric power conversion unit 1 and a duration time Tsw of the switching state quantity SWS are calculated with respect to a voltage reference integration value Pref and to a voltage output integration value Pout in the uvw coordinate system being a three-phase static coordinate system. Note that the determination of the switching state quantity SWS is made according to a method similar to that of Embodiment 2.

In FIG. 24, a time-point at which a three-phase voltage output integration value $P_3$out intersects onto an upper limit value of phase-u of a hexagonally shaped allowable reference range $\Delta_6$Pref each other is defined as an initial or start time-point. First, because the three-phase voltage output integration value $P_3$out intersects onto the hexagonally shaped allowable reference range $\Delta_6$Pref, and also because the three-phase voltage output integration value $P_3$out reaches at the upper limit value of phase-u of a line segment which is not one of three line segments including a line segment of hexagonally shaped allowable reference range $\Delta_6$Pref on which a proceeding direction of a vector of three-phase voltage reference integration value $P_3$ref intersects, and including those adjacent line segments, a nonzero voltage vector is outputted as a switching state quantity SWS1. As for the nonzero voltage vector, a nonzero voltage vector is outputted which changes in a direction oriented toward either one of two line segments including a line segment intersecting to the proceeding direction of the vector of three-phase voltage reference integration value $P_3$ref each other, and including a nearer line segment to the line segment intersecting thereto, and so, a switching state quantity SWS corresponding to a switching state index SW4 is selected as a switching state quantity SWS1 which changes in a direction toward a lower limit value of phase-u of the hexagonally shaped allowable reference range.

Next, calculated is a duration time T1$sw$ until the three-phase voltage output integration value $P_3$out at its time when the switching state index SW4 is outputted, and an upper limit of the hexagonally shaped allowable reference range $\Delta_6$Pref or a lower limit thereof intersect to each other. Here, among line segments of the hexagonally shaped allowable reference range $\Delta_6$Pref, the time until a lower limit value of phase-v is reached becomes the duration time T1sw.

Also from this time onward, a switching state quantity SWS is calculated in similar procedures to those of Embodiment 2. Moreover, in FIG. 24, a duration time Tsw in each of switching state quantities SWS is also calculated, and switching state quantities SWS having been calculated and their duration times Tsw are outputted as a setting signal SetSW.

Therefore, in comparison with the switching determination method of Embodiment 2, a duration time Tsw in each of switching state quantities SWS is also calculated in Embodiment 6, so that, in comparison with Embodiment 2, it is not necessary to consecutively perform determination whether or not a switching state quantity SWS is required to be updated, and a calculation period can be set longer; and so, the embodiment is easily mountable on an inexpensive microcomputer.

Figure 25:
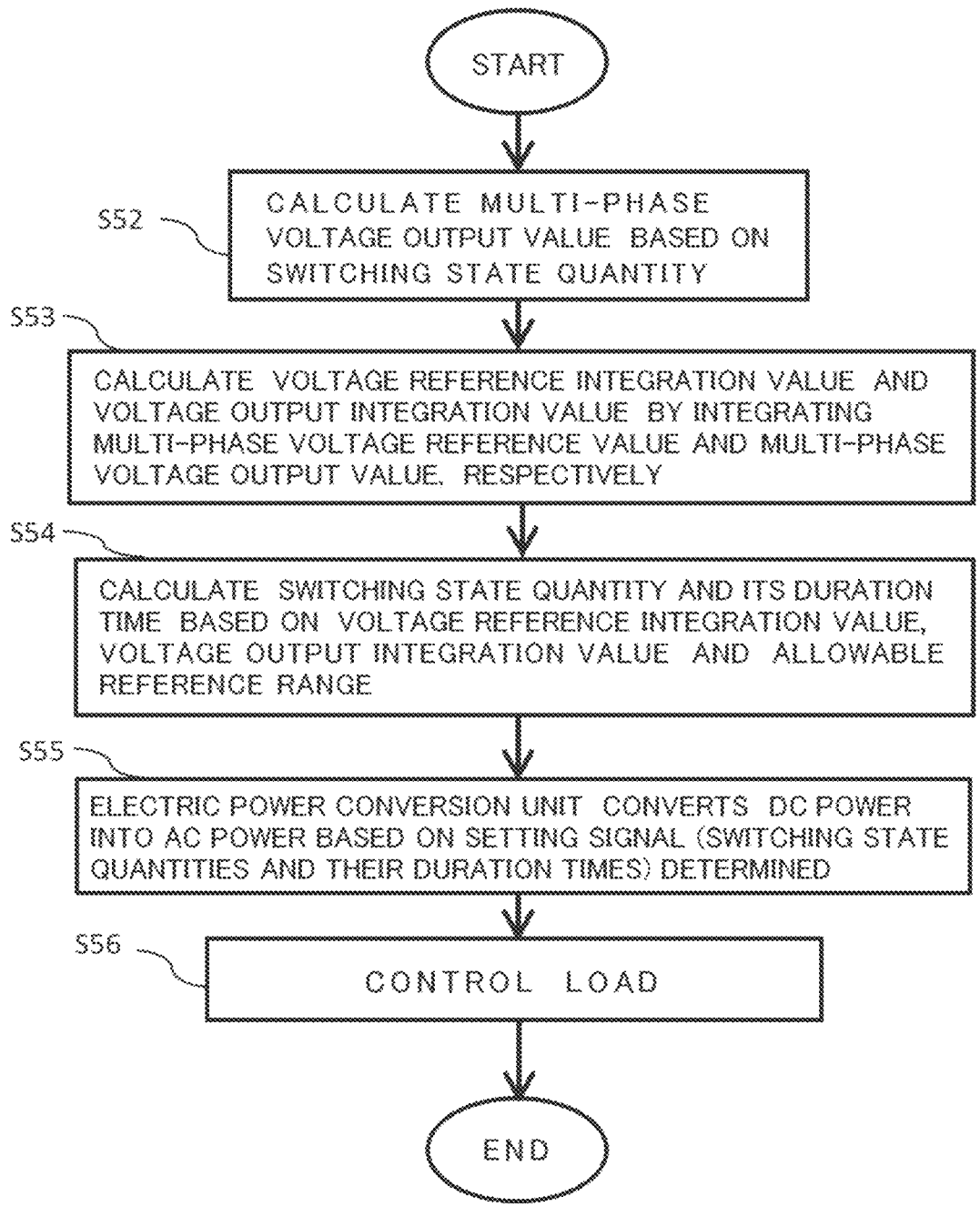
FIG. 25 is a flowchart diagram showing, by way of example, the operations of the power conversion device according to Embodiment 6.

Next, the explanation will be hereinafter made in detail referring to FIG. 25 for the control operations in the power conversion device 100E according to Embodiment 6. FIG. 25 is a flowchart for explaining the control operations in the power conversion device 100E.

First, the processing is carried out in similar procedures to those of Embodiment 2, so that the voltage output calculation unit 11 calculates a multi-phase voltage output value Vout, and the integration value calculation unit 12 calculates a voltage reference integration value Pref and a voltage output integration value Pout by integrating a multi-phase voltage reference value Vref and a multi-phase voltage output value Vout, respectively (Step S52 and Step S53).

Next, the switching calculation unit 27 calculates, on the basis of the voltage reference integration value Pref, on that of the voltage output integration value Pout and on that of an allowable reference range ΔPref, a switching state quantity SWS and a duration time Tsw of the switching state quantity SWS as shown in FIG. 24 (Step S54).

And then, the switching output unit 28 outputs switching state quantities SWS in the order from SWS1 until SWS3, on the basis of the switching state quantities SWS having been calculated by the switching calculation unit 27 and on that of the duration times Tsw calculated thereby (Step S55).

The electric power conversion unit 1 converts DC power of the DC power source 2 into AC power on the basis of the switching state quantities SWS having been determined by the switching output unit 28, and outputs the AC power into the load 3, so that a drive control is performed on the load 3 (Step S56).

The power conversion device 100E of Embodiment 6 comprises: the electric power conversion unit 1 for converting DC power of the DC power source 2 into AC power, and for supplying it into the load 3; the voltage output calculation unit 11 for calculating a multi-phase voltage output value Vout on the basis of a switching state quantity SWS where the switching output unit 28 outputs; the integration value calculation unit 12 for calculating a voltage reference integration value Pref and a voltage output integration value Pout by integrating a multi-phase voltage reference value Vref and the multi-phase voltage output value Vout, respectively; the switching calculation unit 27 for calculating a switching state quantity SWS in the electric power conversion unit 1 and a duration time Tsw of the switching state quantity SWS as a setting signal SetSW on the basis of the voltage reference integration value Pref, on that of the voltage output integration value Pout and on that of an allowable reference range ΔPref to be set on the voltage reference integration value Pref; and the switching output unit 28 for outputting a switching state quantity SWS in the electric power conversion unit 1 on the basis of the setting signal SetSW calculated by the switching calculation unit 27.

According to this arrangement, it is not necessary for the power conversion device 100E of Embodiment 6 to consecutively perform determination whether or not a switching state quantity SWS is required to be updated in comparison with Embodiments 2 through 5, and a calculation period can be set longer; and thus, the power conversion device 100E in the embodiment is easily mountable on an inexpensive microcomputer.

Embodiment 7

The explanation will be made hereinafter referring to FIG. 26 for an electrical power conversion device according to Embodiment 7. Here, FIG. 26 is a block diagram illustrating a configuration of the electrical power conversion device 100F according to Embodiment 7.

Figure 26:
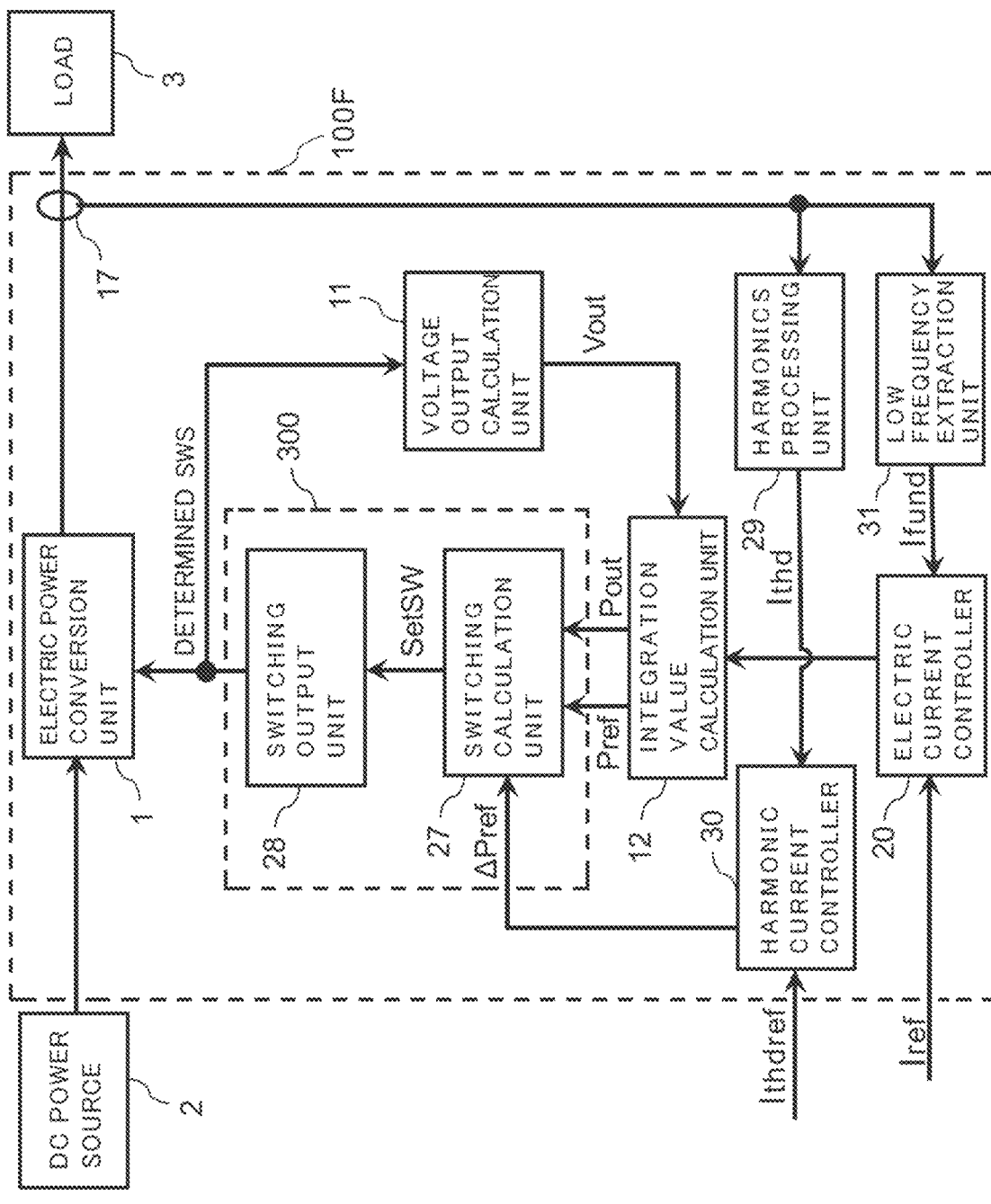
FIG. 26 is a block diagram illustrating a configuration of an electrical power conversion device according to Embodiment 7.

As illustrated in FIG. 26, the power conversion device 100F according to Embodiment 7 differs, in comparison with that in Embodiment 6, in a point in which the power conversion device 100F comprises the electric current detection unit 17 between the electric power conversion unit 1 and the load 3, and in a point in which the power conversion device 100F further comprises: a harmonics processing unit 29 for calculating a harmonic current Ithd, on the basis of a detected electric current value Iuvw being detected by the electric current detection unit 17; a harmonic current controller 30 for calculating an allowable reference range ΔPref, on the basis of a harmonic current instruction or reference value Ithdref and on that of the harmonic current Ithd; a low frequency extraction unit 31 for calculating an electric-current low frequency value Ifund, on the basis of the detected electric current value Iuvw; and the electric current controller 20 for calculating a multi-phase voltage reference value Vref, on the basis of an electric current reference value Iref and on that of the electric-current low frequency value Ifund.

Next, the explanation will be made hereinafter for the functions of the electric current detection unit 17 of Embodiment 7, the harmonics processing unit 29 thereof, the harmonic current controller 30 thereof, the low frequency extraction unit 31 thereof and the electric current controller 20 thereof, which are the differences from those of Embodiment 6.

The electric current detection unit 17 detects an electric current flowing through between the electric power conversion unit 1 and the load 3.

The harmonics processing unit 29 calculates a harmonic current Ithd on the basis of two or more of detected electric current values Iuvw. Here, as for the harmonic current Ithd, for example, calculated are data being expressed by a numerical value(s) in which a harmonic component(s) is included in an electric current, and/or electric-current's spectrum data being expressed on the frequency axis. The harmonic current controller 30 calculates an allowable reference range ΔPref, on the basis of a harmonic current reference value Ithdref and on that of the harmonic current Ithd. The explanation will be made later in detail for a calculation method of the harmonic current Ithd and for that of the allowable reference range ΔPref.

The low frequency extraction unit 31 calculates an electric-current low frequency value Ifund on the basis of a detected electric current value Iuvw at two or more points thereof. Here, the electric-current low frequency value Ifund designates a fundamental wave of the electric current. The electric current controller 20 calculates a multi-phase voltage reference value Vref, on the basis of an electric current reference value Iref and on that of the electric-current low frequency value Ifund. The explanation will be made later in detail for a calculation method of the electric-current low frequency value Ifund.

Figure 27:
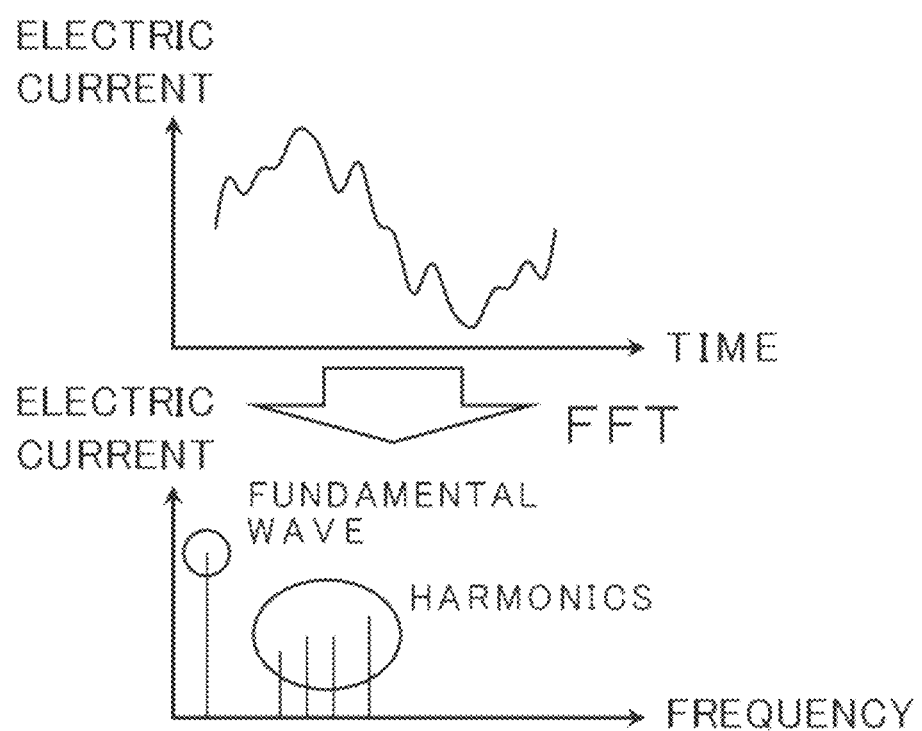
FIG. 27 is a diagram for explaining a method of calculating electric-current harmonics data from electric current values being detected according to Embodiment 7.

FIG. 27 shows a case in which a harmonic current Ithd is calculated by the harmonics processing unit 29 on the basis of the amount of one electric-current's period on an electric current waveform which is drawn from a detected electric current value Iuvw at its two or more points. When fast Fourier transform (FFT: Fast Fourier Transform) is used with respect to the electric current waveform on the time axis in FIG. 27, electric-current's spectrums on the frequency axis are calculated. The electric-current's spectrums on the frequency axis are calculated from a fundamental wave of the electric current waveform and its harmonics. The harmonic current Ithd corresponds to the harmonics of FIG. 27.

Depending on a harmonic current reference value Ithdref, altered is the way to determine whether the harmonics of FIG. 27 are defined by a component in each order thereof, whether the harmonics are defined by a sum total value of harmonics in each order of them, or whether the harmonics are expressed by a ratio between the harmonics each and the fundamental wave. For example, when a harmonic current reference value Ithdref is given as a ratio between harmonics each and a fundamental wave, a harmonic current Ithd is also calculated from the ratio between harmonics of electric-current's spectrums each on the frequency axis and a fundamental wave thereon.

In addition, the fundamental wave on the frequency axis obtained by FIG. 27 may also be defined as the electric-current low frequency value Ifund. The aforementioned allowable reference range ΔPref is adjusted so that the difference between the harmonic current reference value Ithdref and the harmonic current Ithd disappears.

Figure 28:
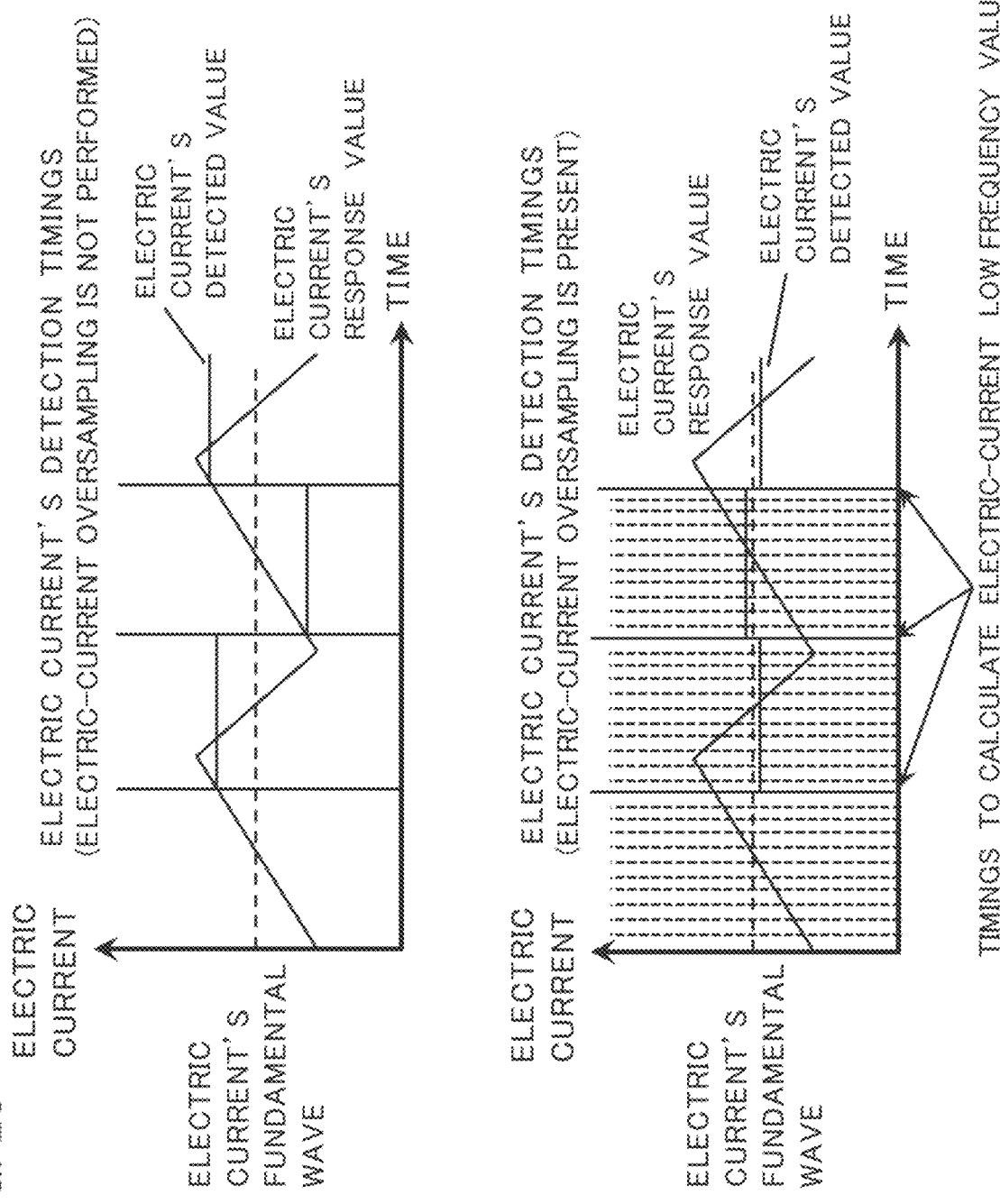
FIG. 28 is a diagram for explaining a method of calculating electric-current low frequency data from electric current values being detected according to Embodiment 7.

FIG. 28 shows a case in which, by making use of electric-current oversampling, an electric-current low frequency value Ifund is calculated by the low frequency extraction unit 31 on the basis of a detected electric current value Iuvw at two or more points thereof. Here, it can be said that the electric-current oversampling is to perform the detection of an electric current in a shorter period than a usual calculation period.

As it can be understood from FIG. 28 that there exist difficulties in a case in which electric-current oversampling is not performed, and then an electric current's fundamental wave is calculated from a detected electric current value Iuvw as an electric-current low frequency value Ifund. On the other hand, in a case in which the electric-current oversampling of FIG. 28 is present as it is performed, an electric current is detected in a shorter period, and an electric-current low frequency value Ifund is calculated by a mean value process in every constant time-period, whereby a value proximal to an electric current's fundamental wave is obtained from the detected electric current value Iuvw as an electric-current low frequency wave.

Figure 29:
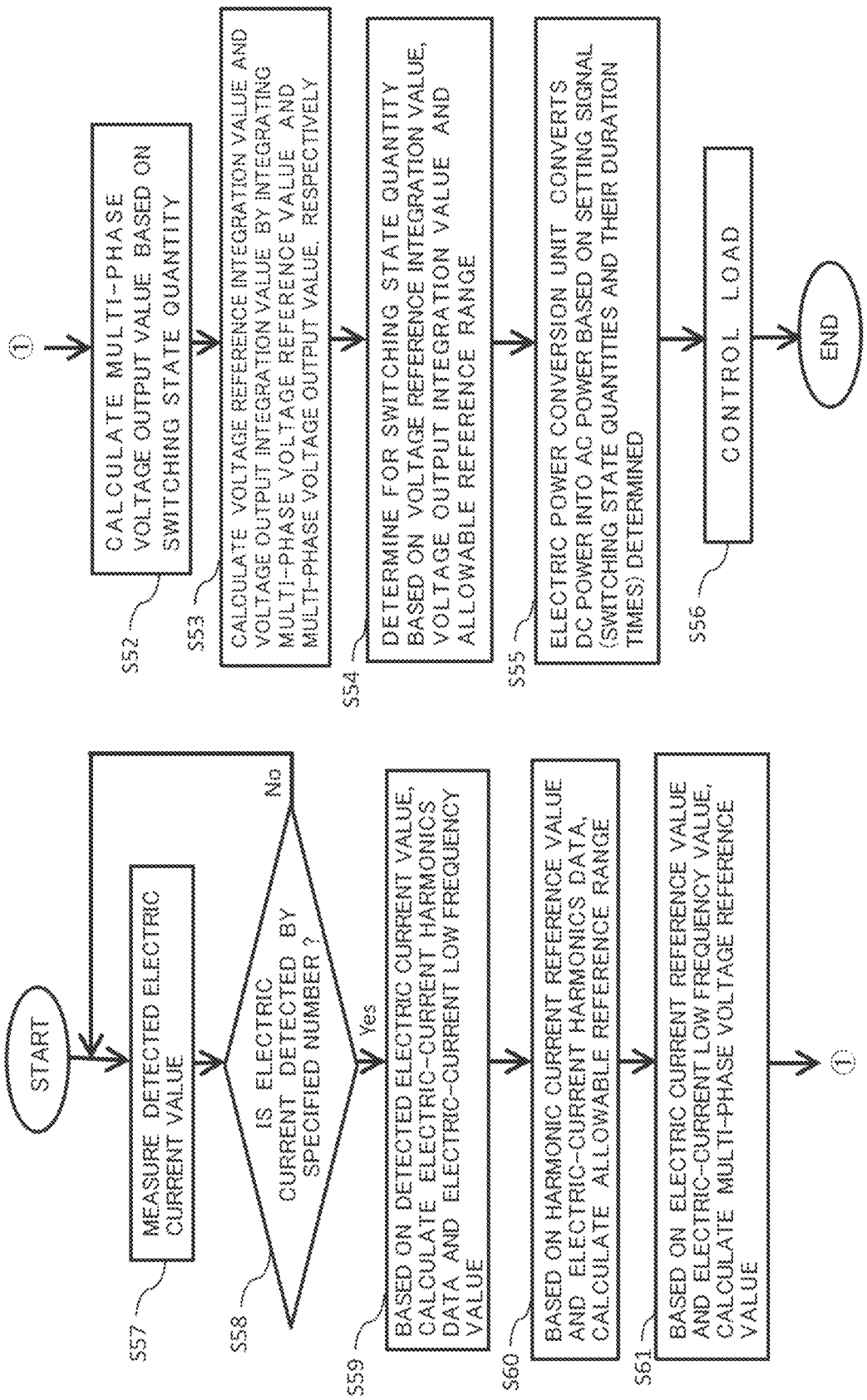
FIG. 29 is a flowchart diagram showing, by way of example, the operations of the power conversion device according to Embodiment 7.

Next, the explanation will be hereinafter made in detail referring to FIG. 29 for the control operations in the power conversion device 100F according to Embodiment 7. FIG. 29 is a flowchart for explaining the control operations in the power conversion device 100F.

First, an electric current flowing into the load 3 is detected by the electric current detection unit 17, and is measured as a detected electric current value Iuvw (Step S57). At this time, the detected electric current value Iuvw is measured by the number being specified (Step S58).

Next, on the basis of the detected electric current value Iuvw at two or more points thereof, the harmonics processing unit 29 and the low frequency extraction unit 31 calculate a harmonic current Ithd and an electric-current low frequency value Ifund, respectively (Step S59; refer to FIG. 27 and FIG. 28).

And then, on the basis of a harmonic current reference value Ithdref and on that of the harmonic current Ithd, an allowable reference range ΔPref is calculated (Step S60), and, on the basis of an electric current reference value Iref and on that of the electric-current low frequency value Ifund, a multi-phase voltage reference value Vref is calculated (Step S61).

From this time onward, the processing is carried out in similar procedures to those of Embodiment 6; and then, the electric power conversion unit 1 converts DC power of the DC power source 2 into AC power on the basis of a switching state quantity SWS determined by the switching output unit 28, and outputs the AC power into the load 3, so that a drive control is performed on the load 3 (from Step S52 through Step S56).

The power conversion device 100F of Embodiment 7 comprises: the electric power conversion unit 1 for converting DC power of the DC power source 2 into AC power, and for supplying it into the load 3; and the electric current detection unit 17 provided between the electric power conversion unit 1 and the load 3. The power conversion device 100F further comprises: the harmonics processing unit 29 for calculating a harmonic current Ithd, on the basis of a detected electric current value Iuvw being detected by the electric current detection unit 17; the harmonic current controller 30 for calculating an allowable reference range ΔPref, on the basis of a harmonic current reference value Ithdref and on that of the harmonic current Ithd; the low frequency extraction unit 31 for calculating an electric-current low frequency value Ifund, on the basis of the detected electric current value Iuvw; the electric current controller 20 for calculating a multi-phase voltage reference value Vref, on the basis of an electric current reference value Iref and on that of the electric-current low frequency value Ifund; the voltage output calculation unit 11 for calculating a multi-phase voltage output value Vout on the basis of a switching state quantity SWS where the switching output unit 28 outputs; the integration value calculation unit 12 for calculating a voltage reference integration value Pref and a voltage output integration value Pout by integrating a multi-phase voltage reference value Vref (hereinafter, also referred to as a "voltage reference value" Vref, for brevity) and the multi-phase voltage output value Vout, respectively; the switching calculation unit 27 for calculating a switching state quantity SWS in the electric power conversion unit 1 and a duration time Tsw of the switching state quantity SWS as a setting signal SetSW on the basis of the voltage reference integration value Pref, on that of the voltage output integration value Pout and on that of an allowable reference range ΔPref to be set on the voltage reference integration value Pref; and the switching output unit 28 for outputting a switching state quantity SWS in the electric power conversion unit 1 on the basis of the setting signal SetSW calculated by the switching calculation unit 27.

The power conversion device 100F of Embodiment 7 can control a harmonic current Ithd of the load 3 in accordance with a reference value(s) as it is exactly intended for, in comparison with Embodiments 1 through 6; and thus, it is

Embodiment 8

The explanation will be made hereinafter referring to the drawings for an electrical power conversion device 100G according to Embodiment 8.

Figure 30:
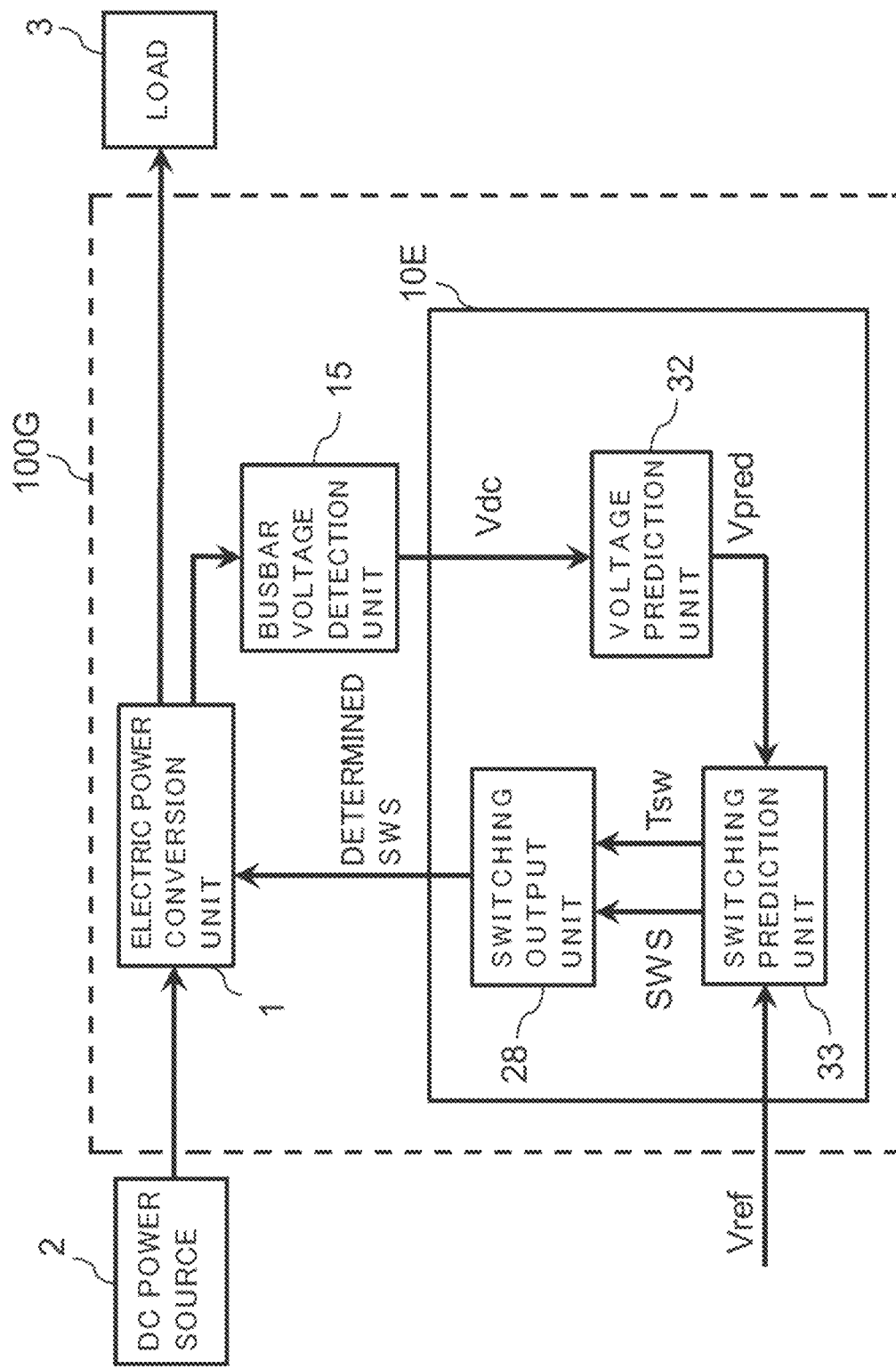
FIG. 30 is a block diagram illustrating a configuration of an electrical power conversion device according to Embodiment 8.

FIG. 30 is a block diagram illustrating a configuration of the power conversion device 100G according to Embodiment 8. As illustrated in FIG. 30, the power conversion device 100G comprises the electric power conversion unit 1 being main circuitry of the power conversion device 100G, the busbar voltage detection unit 15 for detecting a busbar voltage Vdc in the electric power conversion unit 1, and a control device 10E for controlling an output(s) of the electric power conversion unit 1; and the power conversion device 100G is connected between the DC power source 2 and the load 3.

The electric power conversion unit 1 converts DC power from the DC power source 2 into AC power which is supplied into the load 3, and drives the load 3. The load 3 is driven by means of the AC power supplied from the electric power conversion unit 1. Note that, as for the load 3, a transformer, an electromagnetic reactor, or such an electric motor of various kinds as an induction motor, a synchronous motor and/or the like can be used, for example.

The control device 10E comprises: a voltage prediction unit 32 for calculating a voltage prediction value Vpred, on the basis of a busbar voltage Vdc detected by the busbar voltage detection unit 15 and on that of all-entity or all-candidate switching state quantities SWSall in the electric power conversion unit 1; a switching prediction unit 33 for predicting a switching state quantity SWS of a plurality of switching devices in the electric power conversion unit 1 and a continuation or duration time Tsw of the switching state quantity therein to continue the switching state quantity (hereinafter, referred to as a "duration time Tsw" for the sake of simplicity), on the basis of a voltage reference value Vref and on that of the all-candidate voltage prediction values Vpredall calculated by the voltage prediction unit 32; and the switching output unit 28 for outputting a "determined SWS" being a signal for determining a switching state quantity of the plurality of switching devices in the electric power conversion unit 1, on the basis of a switching state quantity SWS calculated by the switching prediction unit 33 and on that of a duration time Tsw calculated thereby. Because the switching state quantity SWS in the electric power conversion unit 1 is determined by means of the switching prediction unit 33 and the switching output unit 28, both of which correspond to the switching determination unit 300 described above.

The voltage prediction unit 32 calculates, as a voltage prediction value Vpred, a multi-phase voltage output value Vout in which the plurality of switching devices in the electric power conversion unit 1 is capable of taking on in accordance with all-candidate switching state quantities SWSall. The explanation will be made later in detail for the all-candidate switching state quantities SWSall in the electric power conversion unit 1.

The switching prediction unit 33 integrates a voltage reference value Vref and the voltage prediction value Vpred calculated by voltage prediction unit 32, and extends a voltage reference integration value Pref and a voltage-prediction-value's integration value Ppred, each of which is an integrated value, until a desired interval or section, respectively. At this time of occasion, as for an initial value C of the voltage-prediction-value's integration value Ppred, a multi-phase voltage output value Vout is calculated from a switching state quantity SWS calculated by the switching prediction unit 33 and a duration time Tsw calculated thereby, and from a busbar voltage Vdc detected by the busbar voltage detection unit 15; and a voltage output integration value Pout is defined by integrating the multi-phase voltage output value Vout. An evaluation value J is calculated from the prediction values having been extended until the desired interval or section, and a switching state quantity SWS of the plurality of switching devices in the electric power conversion unit 1 and its duration time Tsw therein are calculated from the evaluation value J having been calculated. The explanation will be made later in detail for the extension method of a prediction value, and for the evaluation value.

Figure 31:
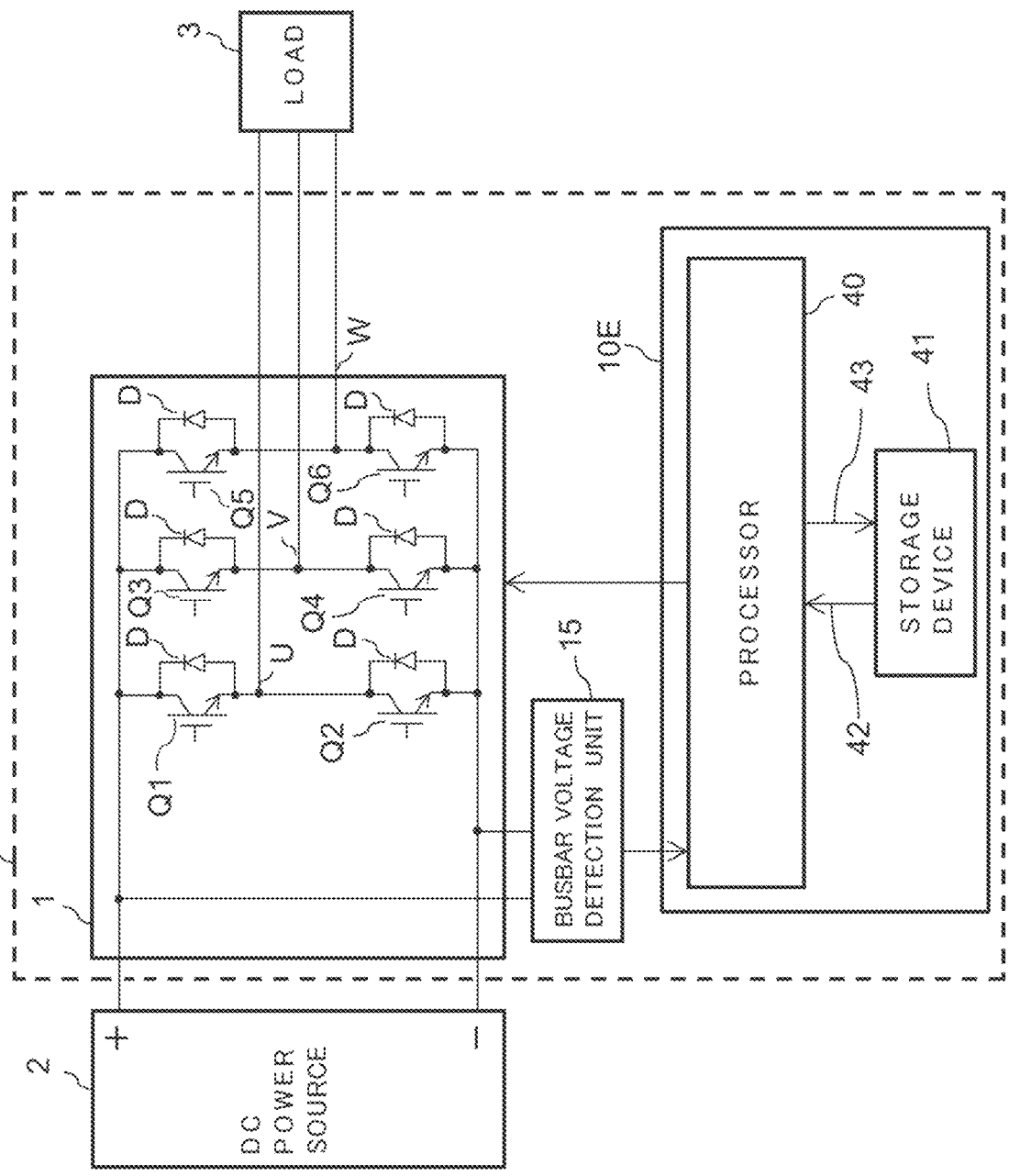
FIG. 31 is a diagram illustrating a hardware configuration of the power conversion device according to Embodiment 8.

FIG. 31 is a diagram illustrating a hardware configuration for implementing the power conversion device 100G.

The electric power conversion unit 1 is made of three-phase inverter circuitry for converting DC power of the DC power source 2 into three-phase AC power, and drives thereby the load 3. The electric power conversion unit 1 includes the plurality of switching devices Q1 through Q6 to each of which a diode D is connected in antiparallel with each other. And then, from the connection points between the upper arm of each phase and the lower arm thereof, their points are connected to the load 3 through its input terminals of the phases each by way of its busbars. In this case, the phase-u is provided with the switching devices Q1 and Q2; the phase-v, provided with the switching devices Q3 and Q4; and the phase-w, provided with the switching devices Q5 and Q6.

The busbar voltage detection unit 15 is a mechanism for detecting a busbar voltage Vdc by measuring a voltage difference across the positive side (+) of the DC power source 2 and the negative side (−) thereof.

The control device 10E includes hardware which is constituted of the processor 40 and the storage device 41.

The storage device 41 includes a volatile storage device (omitted to show in the figure) such as a RAM (Random Access Memory) and the like, and a nonvolatile auxiliary storage device (omitted to show in the figure) such as an HDD (Hard Disk Drive), an SSD (Solid State Drive) and the like. Note that, as for the nonvolatile auxiliary storage device, a flash memory may also be used in place of the HDD.

The processor 40 executes a control program(s) inputted from the storage device 41.

The storage device 41 includes the auxiliary storage device and the volatile storage device. Into the processor 40, the control program(s) 42 is inputted from the auxiliary storage device by way of the volatile storage device.

The processor 40 outputs the processing data 43 such as a calculation result(s) and the like into the volatile storage device of the storage device 41, and stores these pieces of processing data 43 into the auxiliary storage device by way of the volatile storage device on an as-needed basis.

As described above, the control device 10E outputs a switching state quantity SWS of the plurality of switching devices Q1 through Q6 in the electric power conversion unit 1, and controls the electric power conversion unit 1.

Figures 32, 33:
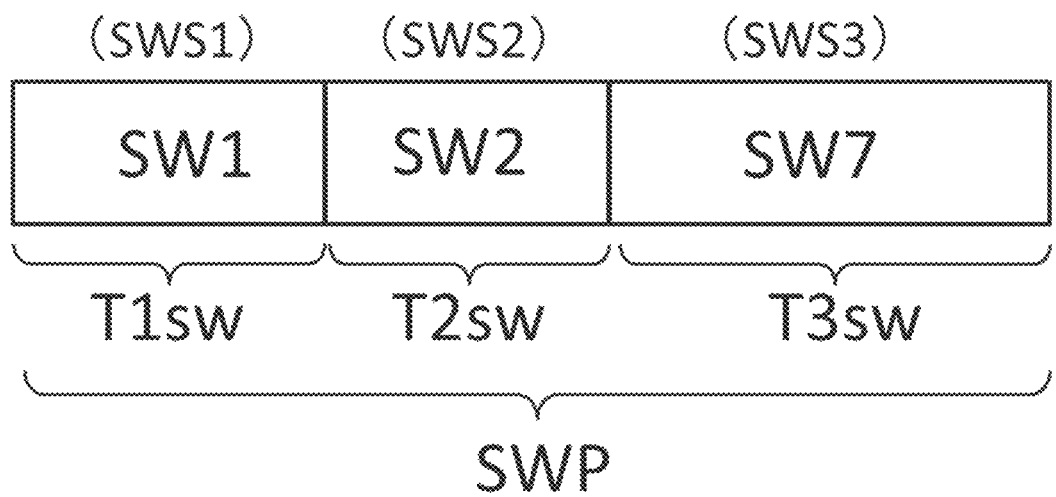
FIG. 32 is a diagram showing all-candidate switching state quantities in an electric power conversion unit according to Embodiment 8.
FIG. 33 is a diagram for explaining a switching pattern according to Embodiment 8.

FIG. 32 is a diagram showing an example of a case in which two levels in the electric power conversion unit 1 become a subject matter under consideration as all-candidate switching state quantities SWSall therein. A switching state quantity SWS is defined by a combination of the signals of turn-on (: 1) and turn-off (: 0) in each of the switching devices Q1 through Q6. There exist nine ways of switching state indexes consisting of eight ways of switching state indexes SWn ("n" is an integer of 0 to 7) where, among the switching devices Q1 through Q6 of the upper arms and lower arms, one arm turns on and the other turns off, and of a switching state index (switching state index SW8) where all of the switching devices (switching devices Q1 through Q6 in all) are turned off at the time of an operation stoppage of the electric power conversion unit 1.

FIG. 33 is a diagram for explaining a switching pattern SWP of the electric power conversion unit 1. In FIG. 33, the diagram shows that, as an example of the switching pattern SWP, data groups of switching state quantities SWS in the electric power conversion unit 1 and respective duration times Tsw therein are combined in the groups of three.

In the disclosure of the present application, groups are defined as the switching pattern SWP in which more than two of data groups of switching state quantities SWS in the electric power conversion unit 1 and their duration times Tsw therein are combined one another. In the case of FIG. 33, the switching pattern SWP consists of the combinations which are set in such a manner that: the first switching state quantity SWS1 (corresponding to the switching state index SW1 of FIG. 32, herein) is continued by a duration time T1*sw*; the second switching state quantity SWS2 (corresponding to the switching state index SW2 of FIG. 32, herein), continued by a duration time T2*sw*; and the third switching state quantity SWS3 (corresponding to the switching state index SW7 of FIG. 32, herein), continued by a duration time T3*sw*.

Figure 34:
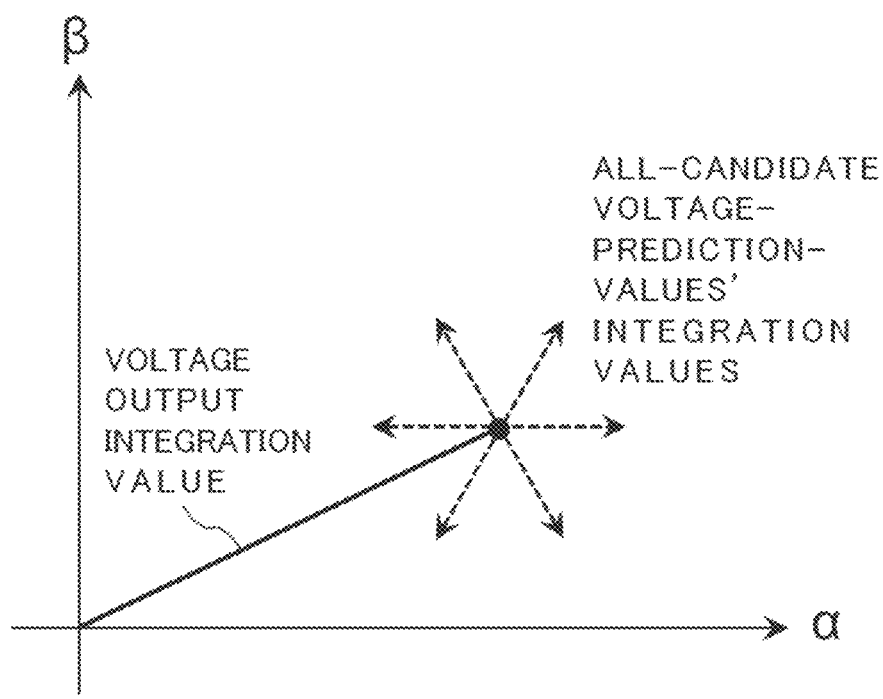
FIG. 34 is a diagram for explaining all-candidate voltage-prediction-values' integration values by defining a voltage output integration value as an initial value according to Embodiment 8.

FIG. 34 is a diagram for explaining all-candidate voltage prediction values Vpredall from a voltage output integration value Pout in the switching prediction unit 33. The voltage output integration value Pout calculated by the switching prediction unit 33 is defined as an initial value C, and, from the time-point onward, integration values of all-candidate voltage prediction values Vpredall, Ppredall (hereinafter, referred to as "all-candidate voltage-prediction-values' integration values Ppredall" for the sake of simplicity), are drawn on the basis of a switching state index SWn ("n" is an integer of 0 to 8) of FIG. 32.

In FIG. 34, as for a switching state quantity SWS corresponding to switching state indexes SW0, SW7 and SW8 each, a multi-phase voltage output value Vout (hereinafter, also referred to as a "voltage output value" Vout, for brevity) takes on zero, so that a voltage-prediction-value's integration value Ppred is coincident with a voltage output integration value Pout each other. For this reason, a sum total of six voltage-prediction-value's integration values Ppred indicated by the broken lines (corresponding from the switching state index of SW1 to that of SW6) are drawn.

Figure 35:
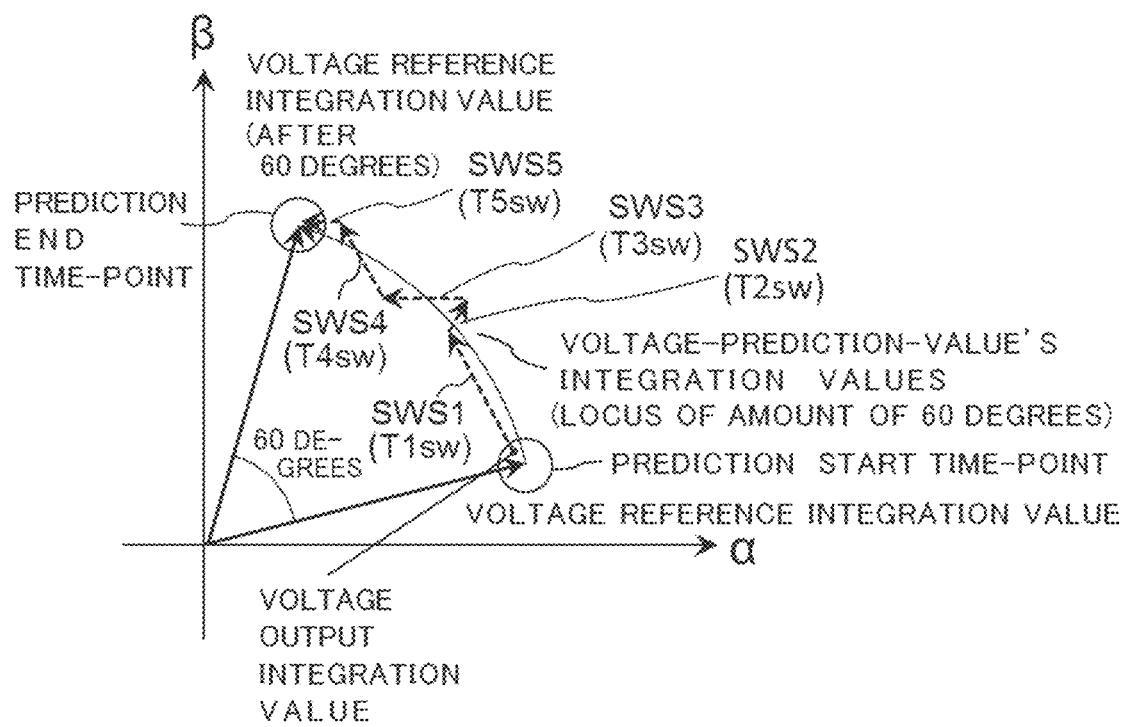
FIG. 35 is a diagram for explaining a locus of a voltage instruction or reference integration value, and that of voltage-prediction-value's integration values both of which are covering 60 degrees of phase in a voltage instruction or reference value(s) according to Embodiment 8.

FIG. 35 is a diagram for explaining a method of extending a prediction interval or section of a voltage reference integration value Pref in the switching prediction unit 33 and that of a voltage-prediction-value's integration value Ppred therein. In FIG. 35, the diagram shows a case as an example in which, in the α-β coordinates being a two-phase static coordinate system, the extensions are made for the voltage reference integration values Pref each and for the voltage-prediction-value's integration values Ppred each from a prediction start time-point until the amount of 60 degrees of phase in a voltage reference value Vref. Here, in FIG. 35, the voltage reference integration values Pref each are indicated by the solid-line arrows, and the voltage-prediction-value's integration values Ppred each are indicated by the five broken-line arrows (switching state quantities SWS1 through SWS5).

When it is presumed that a voltage reference value Vref is in a steady state on the static coordinates, the voltage reference value Vref changes in accordance with its frequency; and thus, for example, when the frequency is positive, the voltage reference value Vref circularly moves counterclockwise.

For this reason, the voltage reference integration value Pref also circularly moves counterclockwise. That is to say, in FIG. 35, the voltage reference integration value moves from the prediction start time-point toward a prediction end time-point by the amount of 60 degrees in the phase angle.

For dealing therewith, because a voltage prediction value Vpred takes on a voltage output value Vout in accordance with a switching state quantity SWS in the electric power conversion unit 1, the voltage prediction value Vpred only takes on two values being the states where a respective switching device is turned on or off. However, in a case of employing a voltage-prediction-value's integration value Ppred, its locus until the voltage-prediction-value's integration value Ppred reaches at a voltage prediction value Vpred can be expressed; and thus, the voltage-prediction-value's integration value Ppred can be calculated for its locus of the amount of 60 degrees of phase in a voltage reference value as shown in FIG. 35.

In a case of FIG. 35, the prediction calculation is performed on the locus of the voltage reference value Vref for the amount of 60 degrees in the order of switching state quantities SWS from the switching state quantity SWS1 up to the switching state quantity SWS5. Namely, at the time of the prediction calculation, the length of locus changes only by modifying the time for integrating a voltage prediction value Vpred in accordance with each of switching state quantities SWS. For example, in a case in which stator's magnetic flux $\phi$ is intended to be calculated by means of a model predictive control being a conventional scheme, it is required for the locus to calculate an equation(s) of states of the load 3 in a consecutive manner. That is to say, according to the scheme in the disclosure of the present application, the amount of calculations is reduced to a large extent in comparison with the conventional scheme.

By calculating a sum total value Perrsum of integration deviations Perr being the differences between a voltage reference integration value Pref and voltage-prediction-value's integration values Ppred each over the amount of 60 degrees of phase in the voltage reference value calculated as the manner of FIG. 35 (hereinafter, referred to as a "sum total value of integration deviations, Perrsum," for the sake of simplicity), an evaluation value J is defined as the sum total value of integration deviations, Perrsum, which may be used for determining a switching state quantity SWS in the electric power conversion unit 1; and also, on the basis of a sum total value of integration deviations, Perrsum, and on that of a sum total value SWcountsum of the number of switching changeovers SWcount on a turn-on in a switching state quantity SWS and on a turn-off therein in the changeovers of respective switching state quantities SWS (hereinafter, referred to as a "sum total of number of switching changeovers, SWcountsum," for the sake of simplicity), an evaluation value J is calculated by means of multiplication "SWcountsum×Perrsum," which may be used for determining a switching state quantity SWS in the electric power conversion unit 1. Note that, in FIG. 35, the aforementioned sum total value of integration deviations, Perrsum, is not clearly shown.

Next, the explanation will be hereinafter made referring to the drawings for the control operations in the power conversion device 100G according to Embodiment 8.

Figure 36:
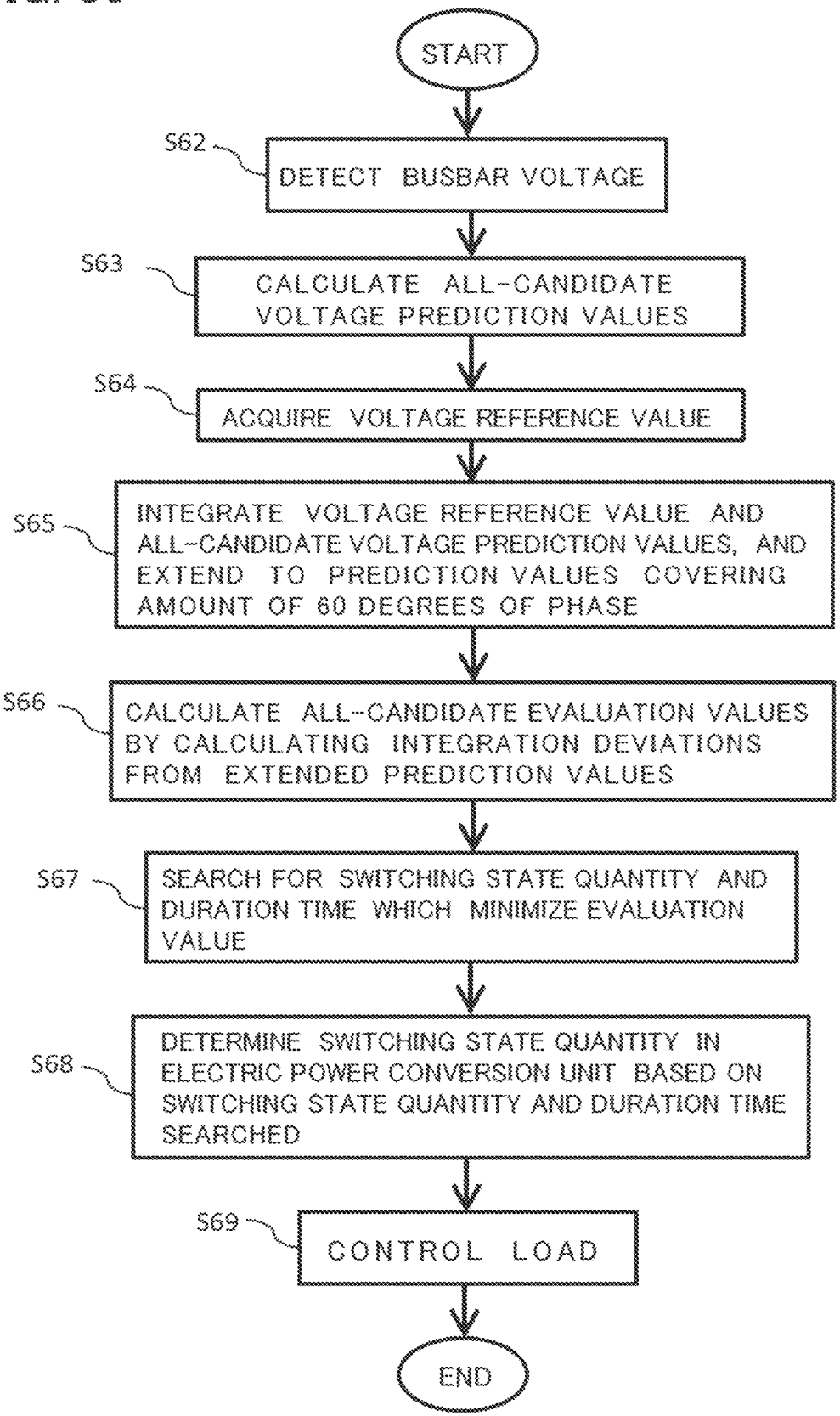
FIG. 36 is a flowchart diagram showing, by way of example, the operations of the power conversion device according to Embodiment 8.

FIG. 36 is a flowchart for explaining the control operations in the power conversion device 100G.

First, the busbar voltage detection unit 15 detects a busbar voltage Vdc of the DC power source 2 (Step S62).

Next, the voltage prediction unit 32 calculates all-candidate voltage prediction values Vpredall, on the basis of the busbar voltage Vdc having been acquired at Step S62 and on that of all-candidate switching state quantities SWSall in the electric power conversion unit 1 (Step S63).

Next, the switching prediction unit 33 acquires a voltage reference value Vref (Step S64).

And then, on the basis of all-candidate voltage-prediction-values' integration values Ppredall and on that of a voltage reference integration value Pref in each of which the all-candidate voltage prediction values Vpredall having been acquired at Step S63 and the voltage reference value Vref having been acquired at Step S64 are integrated, the switching prediction unit 33 extends to a prediction value(s) covering the amount of 60 degrees of phase in the voltage reference value as illustrated in FIG. 35 (Step S65).

Next, on the basis of the prediction value(s) having been extended at Step S65, the switching prediction unit 33 calculates a respective evaluation value J on all-candidate switching state quantities SWSall (Step S66). Here, the evaluation value J is, for example, a sum total value of integration deviations, Perrsum, between a voltage reference integration value Pref and voltage-prediction-value's integration values Ppred each being extended to 60 degrees of phase in a voltage reference value.

Next, on the basis of the evaluation value J on the all-candidate switching state quantities SWSall having been calculated at Step S66, the switching prediction unit 33 retrieves or searches for a switching state quantity SWS which minimizes the evaluation value J (Step S67). For example, in a case in which an evaluation value J is a sum total value of integration deviations, Perrsum, a switching state quantity SWS is selected by which the sum total value of integration deviations, Perrsum, becomes the smallest.

Subsequently, on the basis of the switching state quantity SWS having been searched and selected at Step S67 and on that of a duration time Tsw of the switching state quantity, the switching output unit 28 determines a switching state quantity SWS of a plurality of switching devices in the electric power conversion unit 1 (Step S68).

Lastly, the electric power conversion unit 1 controls its switching state quantity SWS in accordance with the switching state quantity SWS having been determined at Step S68 and with the duration time Tsw of the switching state quantity, so that the load 3 is controlled (Step S69).

The power conversion device 100G of Embodiment 8 comprises: the electric power conversion unit 1 for converting DC power of the DC power source 2 into AC power, and for supplying it into the load 3; the busbar voltage detection unit 15 for detecting a busbar voltage Vdc of the DC power source 2; the voltage prediction unit 32 for calculating a voltage prediction value Vpred, on the basis of the busbar voltage Vdc and on that of all-candidate switching state quantities SWSall in the electric power conversion unit 1; the switching prediction unit 33 for calculating a switching state quantity SWS of a plurality of switching devices in the electric power conversion unit 1 and a duration time Tsw of the switching state quantity therein to continue it, on the basis of a voltage reference value Vref and on that of all-candidate voltage prediction values Vpredall calculated by the voltage prediction unit 32; and the switching output unit 28 for determining a switching state quantity SWS of the plurality of switching devices in the electric power conversion unit 1, on the basis of a switching state quantity SWS calculated by the switching prediction unit 33 and on that of a duration time Tsw of the switching state quantity. In the power conversion device 100G, the switching prediction unit 33 outputs a switching state quantity SWS and a duration time Tsw of the switching state quantity which minimizes a sum total value of integration deviations, Perrsum, on the basis of the sum total value of integration deviations, Perrsum, calculated from a voltage reference integration value Pref covering 60 degrees of phase in a voltage reference value and from all-candidate voltage-prediction-values' integration values Ppredall, so that, in accordance with these outputs, the switching output unit 28 determines a switching state quantity SWS of the plurality of switching devices in the electric power conversion unit 1.

For this reason, in comparison with Embodiment 7, the power conversion device 100G of Embodiment 8 minimizes a sum total value of integration deviations, Perrsum, covering 60 degrees of phase in a voltage reference value while by making a voltage output integration value Pout in the electric power conversion unit 1 following with a voltage reference integration value Pref; and thus, the load 3 can be driven so that a harmonic voltage Vthd and a harmonic current Ithd are reduced.

Here, the explanation has been made for an evaluation value J as a sum total value of integration deviations, Perrsum; however, as for the evaluation value J, the evaluation value J is defined as multiplication "SWcountsum× Perrsum" covering 60 degrees of phase in a voltage reference value by also taking into consideration of a sum total value of number of switching changeovers, SWcountsum, on a turn-on in a switching state quantity SWS and on a turn-off therein, whereby the number of switching changeovers in the electric power conversion unit 1 can be reduced. That is to say, the load 3 can be driven so that a switching loss SWloss in the electric power conversion unit 1 is reduced. In addition, the 60 degrees of phase are given herein; however, even when it is changed to a further extent to give a shorter section or a longer section instead of the 60 degrees of phase, the switching state quantity SWS in the electric power conversion unit 1 and the duration time Tsw therein can be calculated in similar procedures.

Embodiment 9

The explanation will be made hereinafter referring to the drawings for an electrical power conversion device 100H according to Embodiment 9.

Figure 37:
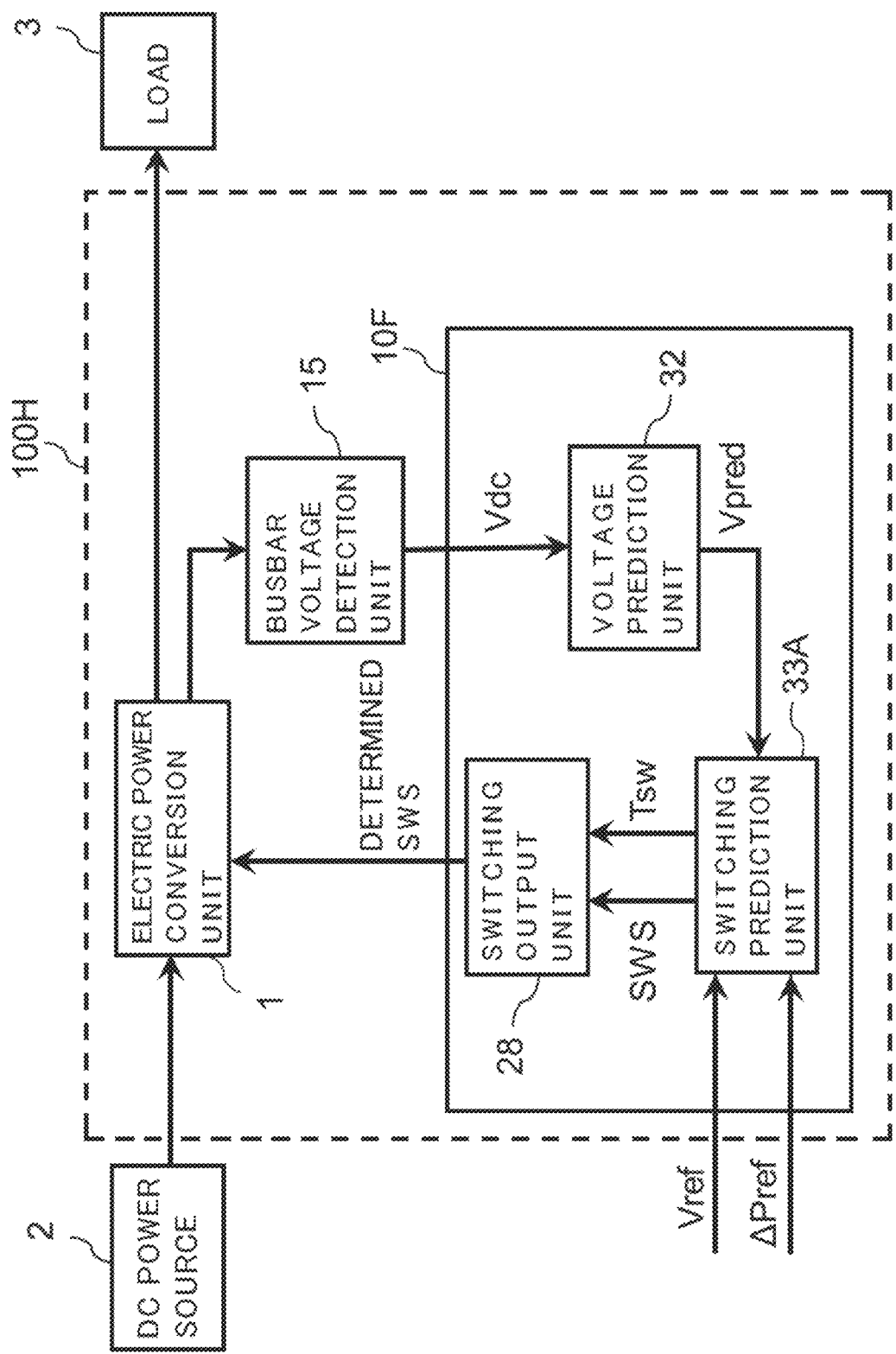
FIG. 37 is a block diagram illustrating a configuration of an electrical power conversion device according to Embodiment 9.

FIG. 37 is a block diagram illustrating a configuration of the power conversion device 100H according to Embodiment 9. As illustrated in FIG. 37, in the power conversion device 100H according to Embodiment 9, a control device 10F of the power conversion device 100H comprises a switching prediction unit 33A, in place of the switching prediction unit 33 where the control device 10E according to Embodiment 8 includes. Because a switching state quantity SWS in the electric power conversion unit 1 is determined by means of the switching prediction unit 33A and the switching output unit 28, both of which correspond to the switching determination unit 300 described above.

The switching prediction unit 33A of the power conversion device 100H according to Embodiment 9 differs from the switching prediction unit 33 of the power conversion device 100G according to Embodiment 8 in a point in which a switching state quantity SWS in the electric power conversion unit 1 and a duration time Tsw therein are calculated by using an allowable reference range ΔPref with respect to a voltage reference integration value Pref. In what follows, the same reference numerals and symbols designate equivalent items or portions for a constituent element(s) having a similar function(s) to Embodiments 1 through 8, and thus their explanation is omitted. And then, the explanation will be made focusing on different points from those of Embodiments 1 through 8.

The switching prediction unit 33A calculates a switching state quantity SWS of a plurality of switching devices in the electric power conversion unit 1 and a duration time Tsw of the switching state quantity SWS therein to continue it, on the basis of a voltage allowance value Pdelta in which an allowable reference range ΔPref is set on a voltage reference integration value Pref where a voltage reference value Vref is integrated, and on that of a voltage-prediction-value's integration value Ppred where a voltage prediction value Vpred calculated by the voltage prediction unit 32 is integrated. At this time of occasion, as for an initial value C of the voltage-prediction-value's integration value Ppred, a voltage output value Vout is calculated similarly to Embodiment 8 from a switching state quantity SWS having been calculated by the switching prediction unit 33A and a duration time Tsw calculated thereby and from a busbar voltage Vdc having been detected by the busbar voltage detection unit 15, so that the voltage output integration value Pout is defined as the initial value C. The explanation will be made later in detail for an extension method of the Pdelta and that of the Ppred, and for the evaluation value.

An allowable reference range ΔPref to be set on a voltage reference integration value Pref where a voltage reference value Vref in the switching prediction unit 33A is integrated indicates a range in which a voltage output integration value Pout is allowed with respect to the voltage reference integration value Pref. For this reason, as for the magnitude of an allowable reference range ΔPref, when the value is set at a larger one, a harmonic voltage Vthd becomes larger, but the number of switching changeovers SWcount of a plurality of switching devices in the electric power conversion unit 1 becomes decreased; whereas, on the contrary, when the allowable reference range ΔPref is set at a smaller one, the harmonic voltage Vthd becomes smaller, but the number of switching changeovers SWcount of the plurality of switching devices in the electric power conversion unit 1 becomes increased. And so, the magnitude of the allowable reference range ΔPref is defined to take on a value to be determined on the trade-off between the harmonic voltage Vthd and the number of switching changeovers SWcount.

Figure 38:
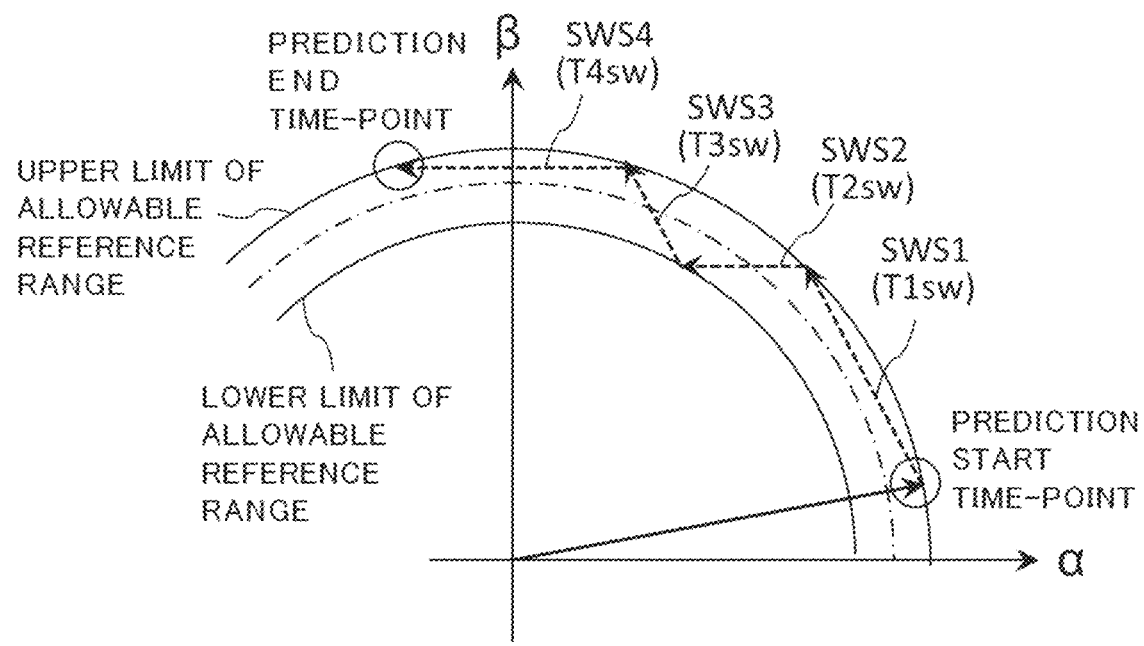
FIG. 38 is a diagram for explaining values in which allowance values are set on a voltage reference integration value, and a locus of voltage-prediction-value's integration values both of which are covering 60 degrees of phase or more in a voltage reference value(s) in the power conversion device according to Embodiment 9.

FIG. 38 is a diagram for explaining an example of a method of extending a voltage allowance value Pdelta in which an allowable reference range ΔPref is set on a voltage reference integration value Pref where a voltage reference value Vref is integrated in the switching prediction unit 33A, and a voltage-prediction-value's integration value Ppred therein.

In FIG. 38, the diagram shows a case as an example in which, in the α-β coordinates being a two-phase static coordinate system, the extensions are made for the voltage reference integration value Pref and the voltage-prediction-value's integration values Ppred each from a prediction start time-point toward the 60 degrees of phase or more in a voltage reference value. Here, in FIG. 38, the voltage reference integration value Pref is indicated by the solid-line arrow, and the voltage-prediction-value's integration values Ppred each are indicated by the four broken-line arrows (switching state quantities SWS1 through SWS4).

When it is presumed that a voltage reference value Vref is in a steady state on the static coordinates, the voltage reference value Vref changes in accordance with its frequency; and thus, for example, when the frequency is positive, the voltage reference value Vref circularly moves counterclockwise. For this reason, the voltage reference integration value Pref also circularly moves counterclockwise.

A voltage prediction value Vpred takes on a voltage output value Vout in accordance with a switching state quantity SWS in the electric power conversion unit 1 with respect to the voltage reference value Vref; and thus, a locus of Ppred is drawn in accordance with the switching state quantity SWS as shown in FIG. 34.

Switching devices of each phase are capable of taking on switching state indexes SW0 through SW8 defined by switching parameters (numerical values standing for levels of switching states) which correspond to the aforementioned two levels of the switching devices Q1 to Q6 each shown in FIG. 32 as indicated by "1" or "0" corresponding to a turn-on or turn-off, so that the nine ways of voltage output values Vout are taken on in a sum total. However, as for the switching state indexes SW0, SW7 and SW8, a composite or resultant vector in accordance with their switching state quantities SWS at upper arms of the phases each takes on zero, so that nonzero voltage output values Vout result in six ways, and zero voltage output values Vout, in three ways. Here, voltage-prediction-value's integration values Ppred are calculated where the aforementioned nine ways of voltage output values Vout in the sum total are each integrated.

In FIG. 38, a voltage allowance value Pdelta in which an allowable reference range ΔPref is set on a voltage reference integration value Pref is drawn on the α-β coordinates. Namely, as for the Pdelta, an allowable reference range ΔPref is set thereon with respect to a voltage reference integration value Pref indicated on the α-β coordinates, so that an upper limit value of voltage allowance value, Pupper, and a lower limit value of voltage allowance value, Plower, are drawn. And then, the upper limit value of voltage allowance value, Pupper, and the lower limit value of voltage allowance value, Plower, circularly move in timed relationship in a steady state, similarly to a voltage reference integration value Pref.

A voltage-prediction-value's integration value Ppred linearly changes in accordance with a switching state quantity SWS in timed relationship as shown in FIG. 34. For this reason, a voltage allowance value Pdelta in which an allowable reference range ΔPref is set on a voltage reference integration value Pref and a voltage-prediction-value's integration value Ppred are each expressed by time dependent or time-based functions, and an intersection arrival or reach time Tcross until an upper limit value of voltage allowance value, Pupper, or a lower limit value of voltage allowance value, Plower, and a voltage-prediction-value's integration value Ppred intersect to each other is calculated.

In FIG. 38, a switching state quantity SWS1 (corresponding to a switching state index SW3) intersects by a duration time T1*sw* onto an upper limit value Pupper of a voltage allowance value for a voltage-prediction-value's integration value Ppred; a switching state quantity SWS2 (corresponding to a switching state index SW4) intersects by a duration time T2*sw* onto a lower limit value Plower of the voltage allowance value for a voltage-prediction-value's integration value Ppred; the switching state quantity SWS3 (corresponding to the switching state index SW3) intersects by a duration time T3*sw* onto an upper limit value Pupper of the voltage allowance value for a voltage-prediction-value's integration value Ppred; and a switching state quantity SWS4 (corresponding to the switching state index SW4) intersects by a duration time T4sw onto an upper limit Pupper value of the voltage allowance value for a voltage-prediction-value's integration value Ppred.

In comparison with the extension method of a prediction value in which an allowable reference range ΔPref of Embodiment 8 is not used, it is only necessary to solve time dependent or time-based functions in Embodiment 9, at a time when the prediction value is extended by using an allowable reference range ΔPref; and thus, the amount of calculations is further reduced in comparison with the extension method of Embodiment 8. Namely, because it is possible to utilize that a voltage-prediction-value's integration value Ppred changes linearly in timed relationship with respect to the changes of switching state quantities SWS as described above, the amount of calculations is further reduced.

Here, by calculating a sum total value of crossing or intersection reach times Tcross, Tcrosssum, from a prediction value calculated as the manner of FIG. 38 until the Pdelta and a voltage-prediction-value's integration value Ppred intersect to each other, an evaluation value J is defined as the reciprocal "1/Tcrosssum" of the sum total value of the times, Tcrosssum, until making the intersection, so that the reciprocal may be used for determining a switching state quantity SWS in the electric power conversion unit 1; and also, on the basis of a sum total value of the times, Tcrosssum, until making the intersection and on that of a sum total value of number of switching changeovers, SWcountsum, the evaluation value J is calculated from division "SWcountsum/Tcrosssum," which may be used for determining a switching state quantity SWS in the electric power conversion unit 1.

Next, the explanation will be hereinafter made referring to the drawings for the control operations in the power conversion device 100H according to Embodiment 9.

Figure 39:
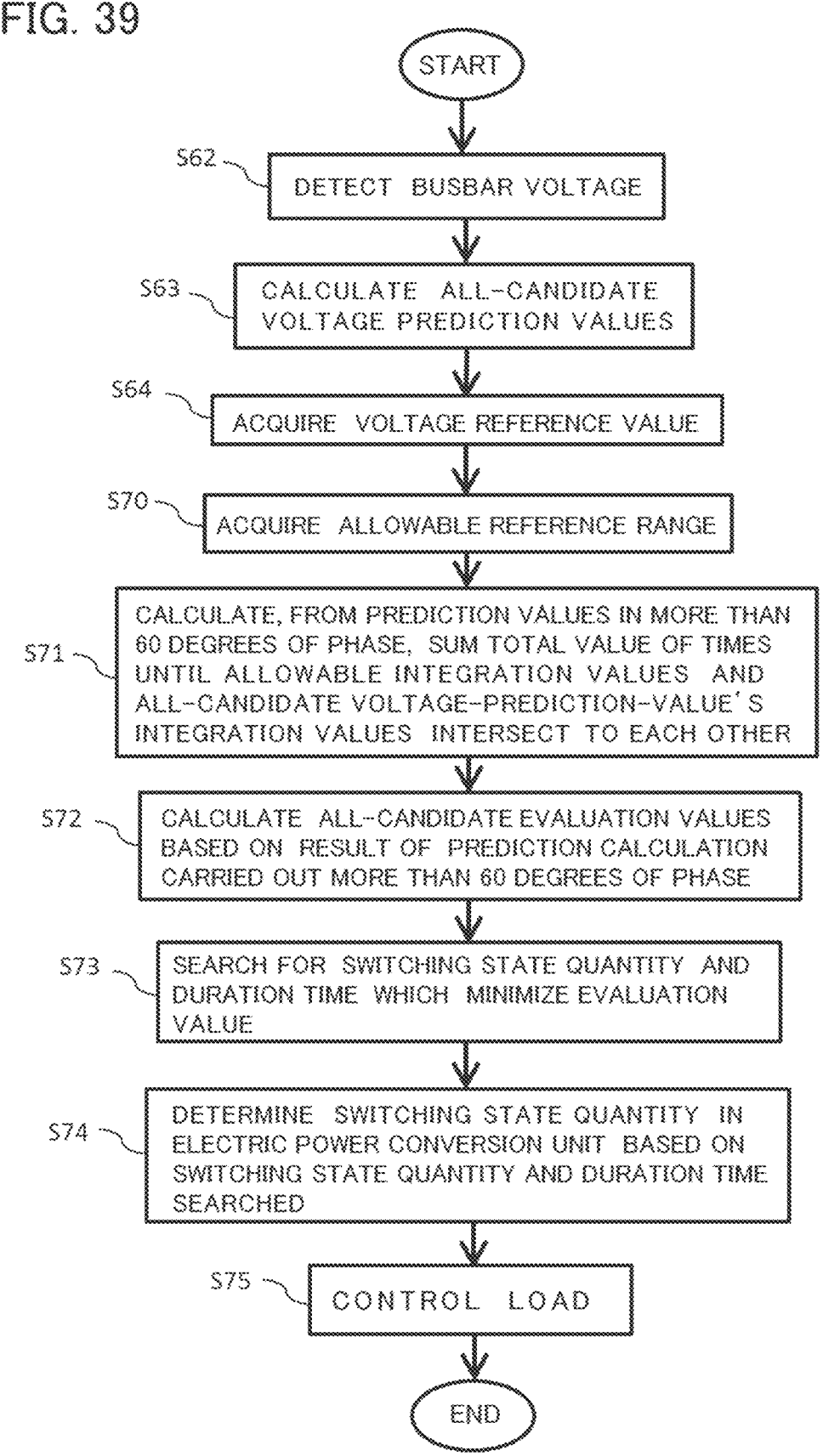
FIG. 39 is a flowchart diagram showing, by way of example, the operations of the power conversion device according to Embodiment 9.

FIG. 39 is a flowchart for explaining the control operations in the power conversion device 100H.

First, the switching prediction unit 33A acquires a voltage reference value Vref, and all-candidate voltage prediction values Vpredall having been calculated by the voltage prediction unit 32 (from Step S62 through Step S64).

Next, the switching prediction unit 33A acquires an allowable reference range ΔPref for setting it on a voltage reference integration value Pref (Step S70).

And then, on the basis of a voltage allowance value Pdelta in which the allowable reference range ΔPref is set on the voltage reference integration value Pref and on that of all-candidate voltage-prediction-values' integration values, the switching prediction unit 33A calculates, from a prediction value which is extended to 60 degrees of phase or more in a voltage reference value, a sum total value of the times, Tcrosssum, until the voltage allowance value Pdelta for which the allowable reference range ΔPref is set and the voltage-prediction-value's integration value Ppred intersect to each other (Step S71).

The switching prediction unit 33A calculates respective evaluation values J in all-candidate switching state quantities, each on the basis of the reciprocal 1/Tcrosssum of the sum total value of the times, Tcrosssum, having been calculated at Step S71 until making the intersections (Step S72).

The switching prediction unit 33A searches, in similar procedures to those of Embodiment 8 on the basis of the evaluation value J having been calculated at Step S72, a switching state quantity SWS of the electric power conversion unit 1 and a duration time Tsw of the switching state quantity to continue it, and then, on the basis of the switching state quantity SWS having been searched and on that of its duration time Tsw, the electric power conversion unit 1 controls its switching state quantity SWS, so that the load 3 is controlled (from Step S73 through Step S75).

The power conversion device 100H of Embodiment 9 comprises: the electric power conversion unit 1 for converting DC power of the DC power source 2 into AC power, and for supplying it into the load 3; the busbar voltage detection unit 15 for detecting a busbar voltage Vdc of the DC power source 2; the voltage prediction unit 32 for calculating a voltage prediction value Vpred, on the basis of the busbar voltage Vdc and on that of all-candidate switching state quantities SWSall in the electric power conversion unit 1; the switching prediction unit 33A for calculating a switching state quantity SWS of a plurality of switching devices in the electric power conversion unit 1 and a duration time Tsw of the switching state quantity SWS therein to continue it, on the basis of a voltage allowance value Pdelta in which an allowable reference range ΔPref is set on a voltage reference integration value Pref and on that of all-candidate voltage-prediction-values' integration values Ppredall calculated by the voltage prediction unit 32; and the switching output unit 28 for determining a switching state quantity SWS of the plurality of switching devices in the electric power conversion unit 1, on the basis of a switching state quantity SWS calculated by the switching prediction unit 33A and on that of a duration time Tsw of the switching state quantity. In the power conversion device 100H, the switching prediction unit 33A calculates a sum total value of the times, Tcrosssum, covering 60 degrees of phase or more in a voltage reference value until a voltage allowance value Pdelta in which an allowable reference range ΔPref is set on a voltage reference integration value Pref and all-candidate voltage-prediction-values' integration values Ppredall intersect to each other, and outputs a switching state quantity SWS and a duration time Tsw of the switching state quantity by which the reciprocal 1/Tcrosssum of the sum total value of the times, Tcrosssum, until making the intersection takes on the smallest, so that, in accordance with these outputs, the switching output unit 28 determines a switching state quantity SWS of the plurality of switching devices in the electric power conversion unit 1.

For this reason, the power conversion device 100H of Embodiment 9 expresses a voltage allowance value Pdelta in which an allowable reference range ΔPref is set on a voltage reference integration value Pref, and a voltage-prediction-value's integration value Ppred each by time dependent or time-based functions, and extends a prediction interval or section to 60 degrees of phase or more in a voltage reference value; and thus, the power conversion device 100H can further reduce the amount of calculations for performing the prediction calculation in comparison with that of Embodiment 8, and the load 3 can be driven by also limiting an integration deviation Perr between a voltage reference value Vref and a voltage output value Vout to be constant in accordance with an allowable reference range ΔPref. Therefore, it is easier for the power conversion device 100H of Embodiment 9 to set the prediction interval or section to a longer span than that of Embodiment 8, so that it becomes possible to enhance a suppression effect on voltage harmonics.

Here, the explanation has been made for an evaluation value J as the reciprocal 1/Tcrosssum of a sum total value of the times, Tcrosssum, until making the intersection; however, as for the evaluation value J, the evaluation value J is defined as division "SWcountsum/Tcrosssum" covering 60 degrees of phase or more in a voltage reference value by also taking into consideration of a sum total value of number of switching changeovers, SWcountsum, on a turn-on in a switching state quantity SWS and on a turn-off therein, whereby the load 3 can be driven so that a switching loss SWloss in the electric power conversion unit 1 is also reduced. In addition, the 60 degrees of phase are given herein; however, even when it is changed to a further extent to give a shorter section or a longer section instead of the 60 degrees of phase, the switching state quantity SWS in the electric power conversion unit 1 and the duration time Tsw therein can be calculated in similar procedures.

Embodiment 10

The explanation will be made hereinafter referring to the drawings for an electrical power conversion device 100I according to Embodiment 10.

Figure 40:
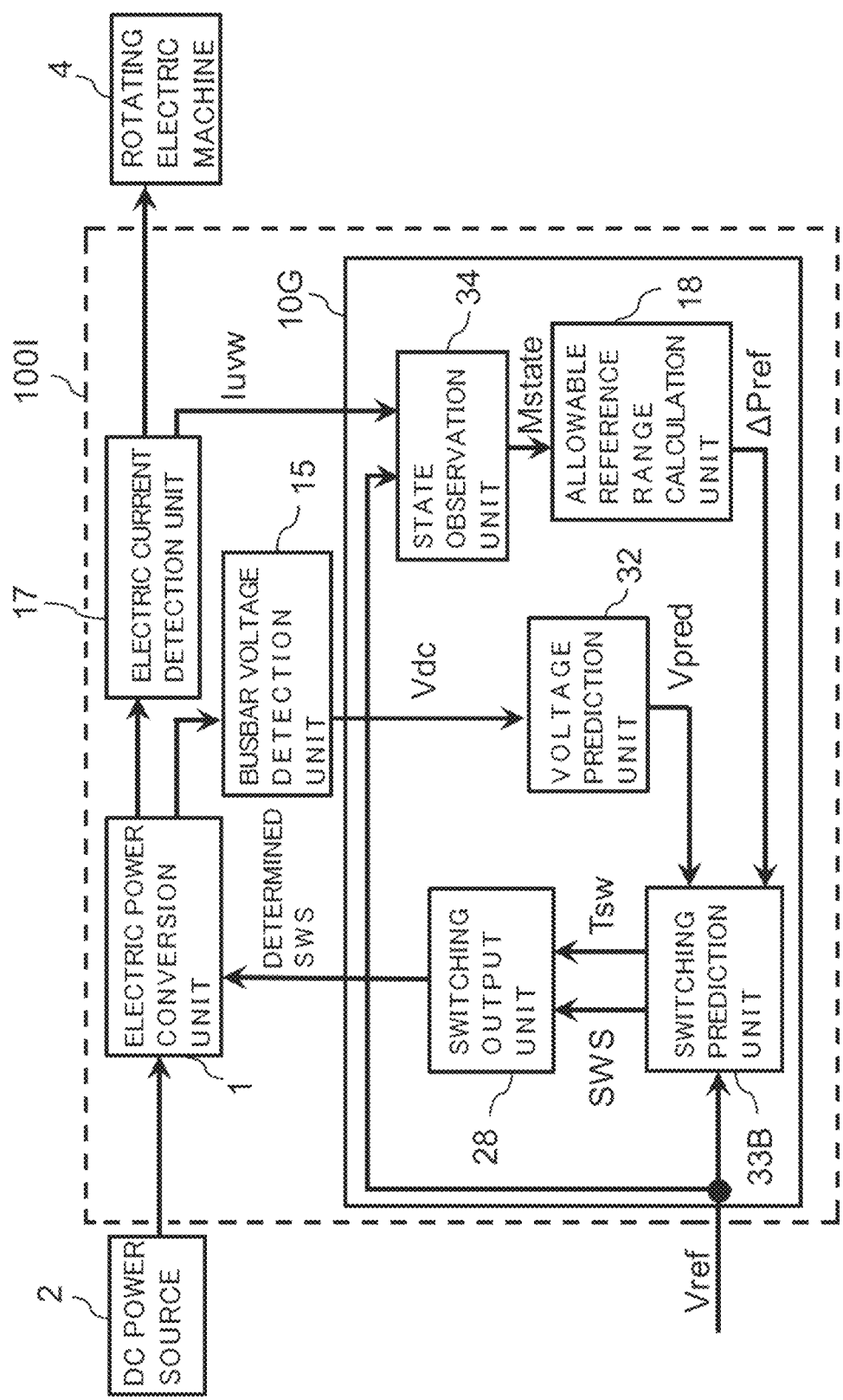
FIG. 40 is a block diagram illustrating a configuration of an electrical power conversion device according to Embodiment 10.

FIG. 40 is a block diagram illustrating a configuration of the power conversion device 100I according to Embodiment 10. As illustrated in FIG. 40, the power conversion device 100I according to Embodiment 10 differs: in comparison with that according to Embodiment 9, in a point in which the load 3 is replaced by the rotating electric machine 4; in a point in which the power conversion device 100I comprises the electric current detection unit 17 between the electric power conversion unit 1 and the rotating electric machine 4; and in a point in which a control device 10G of the power conversion device 100I includes a switching prediction unit 33B, in place of the switching prediction unit 33A where the control device 10F includes. And then, the control device 10G includes a state observation unit 34 for calculating a drive state quantity Mstate indicating a drive status of the rotating electric machine 4, on the basis of a detected electric current value Iuvw having been detected from the electric current detection unit 17 described above; and the control device 10G also includes an allowable reference range calculation unit 18 for calculating an allowable reference range ΔPref with respect to a voltage reference integration value Pref, on the basis of the drive state quantity Mstate calculated by the state observation unit 34. Because a switching state quantity SWS in the electric power conversion unit 1 is determined by means of the switching prediction unit 33B and the switching output unit 28, both of which correspond to the switching determination unit 300 described above.

The switching prediction unit 33B of the power conversion device 100I described above differs from the switching prediction unit 33A of the power conversion device 100H according to Embodiment 9 in a point in which the allowable reference range ΔPref with respect to a voltage reference integration value Pref is changed in conformance with a drive status of the rotating electric machine 4. In what follows, the same reference numerals and symbols designate equivalent items or portions for a constituent element(s) having a similar function(s) to Embodiments 1 through 9, and thus their explanation is omitted. And then, the explanation will be made focusing on different points from those of Embodiments 1 through 9.

As described above, the power conversion device 100I differs, in comparison with that according to Embodiments 8 and 9 each, in a point in which the power conversion device 100I comprises the electric current detection unit 17.

The power conversion device 100I comprises, as illustrated in FIG. 40, the electric power conversion unit 1, the busbar voltage detection unit 15 and the electric current detection unit 17, and the voltage prediction unit 32, the switching prediction unit 33B, the switching output unit 28, the state observation unit 34 and the allowable reference range calculation unit 18, which are constituent elements of the control device 10G. Hereinafter, the explanation will be made for the functions of the electric current detection unit 17, the state observation unit 34 and the allowable reference range calculation unit 18, which are different constituent elements from Embodiment 9.

The electric current detection unit 17 detects an electric current flowing between the electric power conversion unit 1 and the rotating electric machine 4, which is outputted into the state observation unit 34.

The state observation unit 34 calculates a drive state quantity Mstate indicating a drive status of the rotating electric machine 4, on the basis of a voltage reference value Vref and on that of the detected electric current value Iuvw having been detected by the electric current detection unit 17, and outputs the drive state quantity Mstate having been calculated. Here, the drive state quantity Mstate includes at least any one of: two-phase magnetic flux $\phi\alpha\beta$ which is calculated by transforming a voltage reference value Vref and a detected electric current value Iuvw detected by the electric current detection unit 17 on the α-β coordinates being the two-phase static coordinates and by taking them on the basis of the voltage reference value Vref and on that of a two-phase electric current Iαβ; magnetic flux $\phi$ of the rotating electric machine 4 calculated on the basis of the two-phase magnetic flux $\phi\alpha\beta$; and/or torque τ calculated on the basis of a first-order angular frequency $\omega_1$, an angular velocity $\omega_{rm}$, two-phase magnetic flux $\phi\alpha\beta$ and a two-phase electric current Iαβ; and a loss Mloss of the rotating electric machine 4 calculated from the detected electric current value Iuvw, for example.

The allowable reference range calculation unit 18 calculates an allowable reference range ΔPref to be set on a voltage reference integration value Pref on the basis of the drive state quantity Mstate of the rotating electric machine 4 having been calculated by the state observation unit 34, and outputs the allowable reference range ΔPref into the switching prediction unit 33B. The magnitude of the allowable reference range ΔPref is defined to take on a value to be determined on a trade-off between a harmonic voltage Vthd and the number of switching changeovers SWcount as described above. For this reason, for example, when a torque ripple of the rotating electric machine 4 is to be reduced, an allowable reference range ΔPref is set smaller so that a harmonic voltage Vthd becomes smaller. In addition, the allowable reference range ΔPref may be calculated as a mathematical function which depends on any value related to the rotating electric machine 4.

Figure 41:
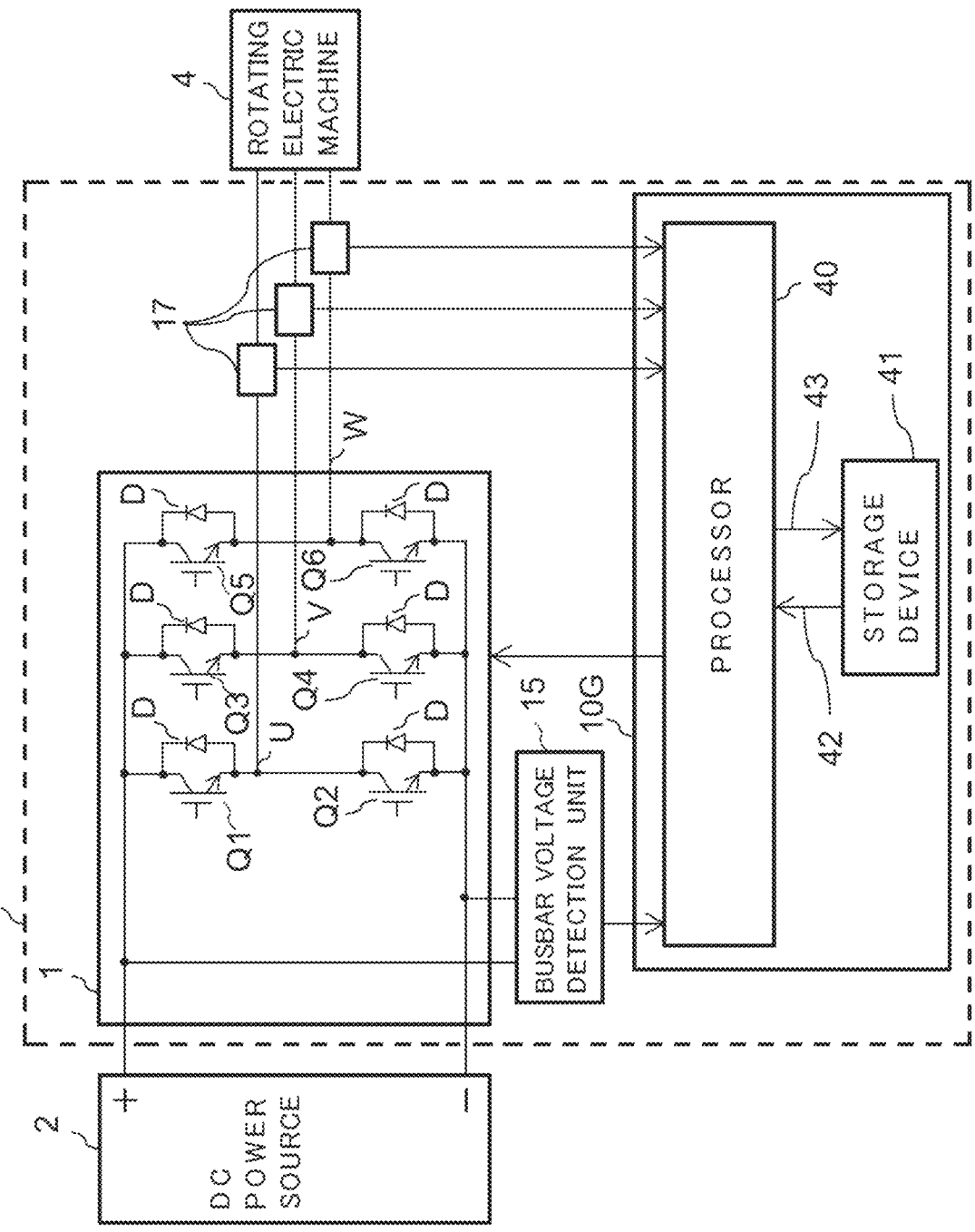
FIG. 41 is a diagram illustrating a hardware configuration of the power conversion device according to Embodiment 10.

FIG. 41 is a diagram illustrating a hardware configuration for implementing the power conversion device 100I.

The hardware configuration diagram of the power conversion device 100I illustrated in FIG. 41 differs, in comparison with that of the power conversion device 100G according to Embodiment 8, in a point in which the electric current detection unit 17 is newly added to between the electric power conversion unit 1 and the rotating electric machine 4.

The electric current detection unit 17 detects electric current values of three phase quantities where the electric power conversion unit 1 outputs an electric current into the rotating electric machine 4. Here, as for the electric current detection unit 17, any one of electric current detectors among a CT (Current Transformer) detector(s), a shunt resistor(s) and the like may be used. A detector may be used in which, among electric currents of three phases, electric currents of two phases are detected and the remaining electric current of one phase is calculated. Moreover, a single shunt electric current detection scheme where three-phase AC current values are restored by one electric current detector may be used.

Figure 42:
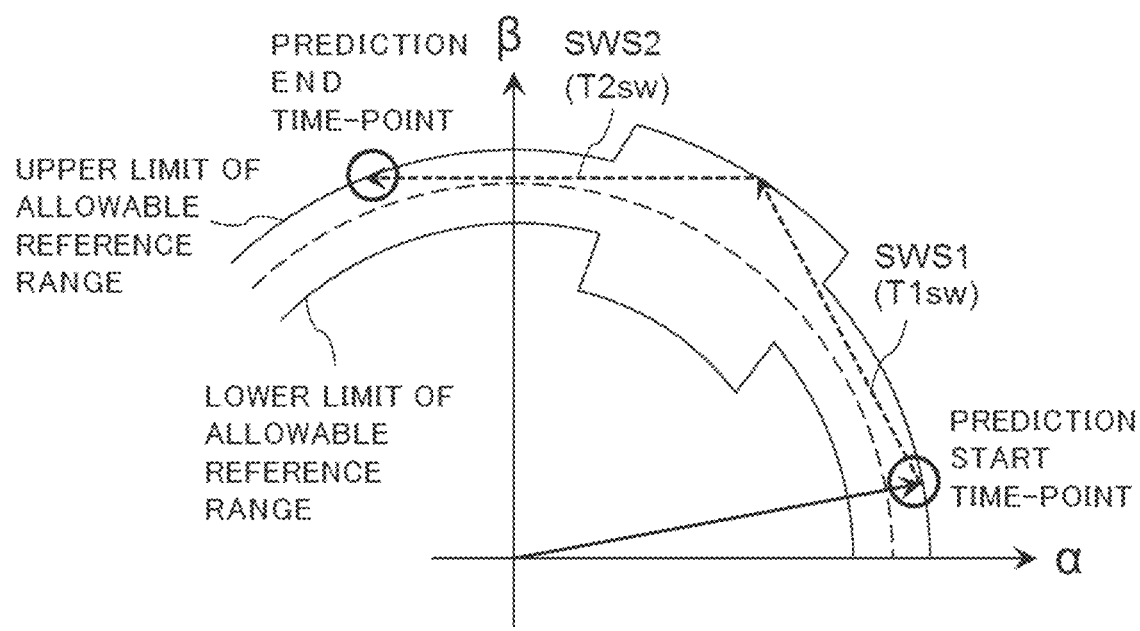
FIG. 42 is a diagram for explaining values in which allowance values are set on a voltage reference integration value, and a locus of voltage-prediction-value's integration values both of which are covering 60 degrees of phase or more in a voltage reference value(s) according to Embodiment 10.

FIG. 42 is a diagram for explaining a method of extending a voltage allowance value Pdelta in which an allowable reference range ΔPref is set on a voltage reference integration value Pref where a voltage reference value Vref is integrated in the switching prediction unit 33B according to Embodiment 10, and a voltage-prediction-value's integration value Ppred therein.

In FIG. 42, the diagram shows a case as an example in which, in the α-β coordinates being a two-phase static coordinate system, the extensions are made for the voltage reference integration value Pref and the voltage-prediction-value's integration values Ppred each from a prediction start time-point toward the 60 degrees of phase or more in a voltage reference value. Here, in FIG. 42, the voltage reference integration value Pref is indicated by the solid-line arrow, and the voltage-prediction-value's integration values Ppred each are indicated by the two broken-line arrows (switching state quantities SWS1 and SWS2).

For dealing therewith, next, by similarly performing as Embodiment 9, a voltage allowance value Pdelta in which an allowable reference range ΔPref is set on a voltage reference integration value Pref, and a voltage-prediction-value's integration value Ppred are each expressed by time dependent or time-based functions, and a crossing or intersection reach time Tcross until an upper limit value of voltage allowance value, Pupper, or a lower limit value of voltage allowance value, Plower, and a voltage-prediction-value's integration value Ppred intersect to each other is calculated.

In FIG. 42, on the basis of an allowable reference range ΔPref calculated by the allowable reference range calculation unit 18, the magnitude of the allowable reference range ΔPref changes at some midpoint of the prediction calculation. This is a case in which, for example, when the allowable reference range ΔPref is calculated as a mathematical function which depends on a voltage output integration value Pout, the case is presumed so that the magnitude of the allowable reference range ΔPref changes depending on the voltage output integration value Pout.

In addition, as shown in FIG. 42, a switching state quantity SWS1 (corresponding to a switching state index SW3) intersects by a duration time T1sw onto an upper limit value Pupper of a voltage allowance value on which an allowable reference range ΔPref is set for a voltage-prediction-value's integration value Ppred, and subsequently, a switching state quantity SWS2 (corresponding to a switching state index SW4) intersects by a duration time T2sw onto an upper limit value Pupper of a voltage allowance value on which an allowable reference range ΔPref is set for a voltage-prediction-value's integration value Ppred.

In comparison with a scheme in which an allowable reference range ΔPref of Embodiment 9 takes on a constant value, an allowable reference range ΔPref is changed in conformance with a drive status of the rotating electric machine 4 in Embodiment 10; and thus, it is possible to determine a switching state quantity SWS in the electric power conversion unit 1 not only by taking into consideration of a harmonic voltage Vthd and the number of switching changeovers SWcount in the electric power conversion unit 1, but also while taking into consideration of the performance of torque τ of the rotating electric machine 4 and/or the performance of magnetic flux φ thereof, a first-order angular frequency $ω_1$ thereof and a loss Mloss thereof.

Next, the explanation will be hereinafter made referring to the drawings for the control operations in the power conversion device 100I according to Embodiment 10.

Figure 43:
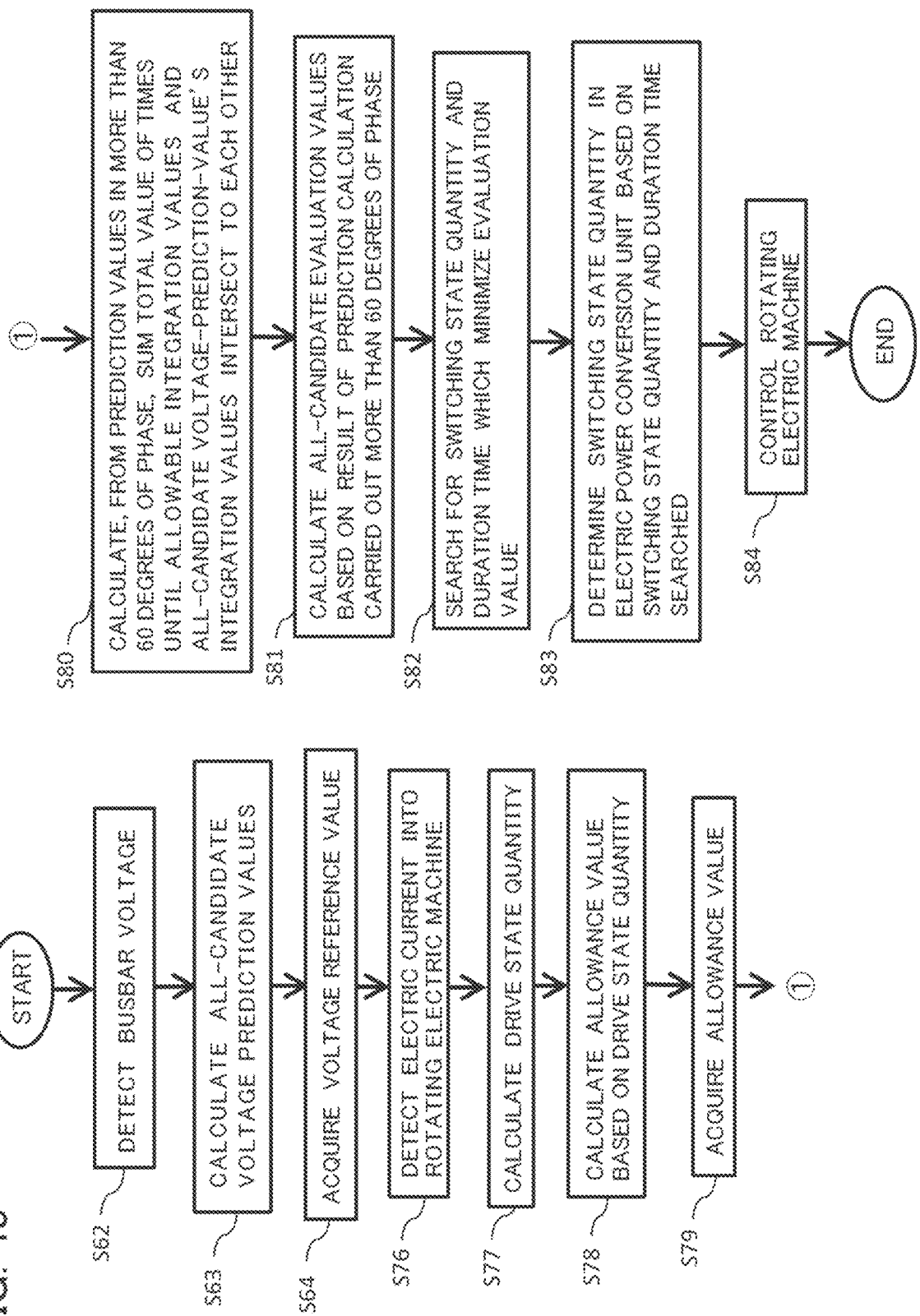
FIG. 43 is a flowchart diagram showing, by way of example, the operations of the power conversion device according to Embodiment 10.

FIG. 43 is a flowchart for explaining the control operations in the power conversion device 100I.

First, the switching prediction unit 33B acquires a voltage reference value Vref, and all-candidate voltage prediction values Vpredall having been calculated by the voltage prediction unit 32 (from Step S62 through Step S64).

Next, the electric current detection unit 17 detects an electric current flowing into the rotating electric machine 4 (Step S76).

Subsequently, the state observation unit 34 calculates a drive state quantity Mstate of the rotating electric machine 4, on the basis of the detected electric current value Iuvw having been detected at Step S76 and on that of the voltage reference value Vref (Step S77).

The allowable reference range calculation unit 18 calculates an allowable reference range ΔPref to be set on a voltage reference integration value Pref, on the basis of the drive state quantity Mstate having been calculated at Step S77 (Step S78).

And then, the switching prediction unit 33B carries out the processing in similar procedures to those of Embodiment 9 on the basis of a voltage allowance value Pdelta in which an allowable reference range ΔPref is set on the voltage reference integration value Pref and on that of all-candidate voltage-prediction-values' integration values Ppredall, and calculates, on the basis of the Pdelta and the Ppredall which are extended to 60 degrees of phase or more in a voltage reference value, a sum total value of the times, Tcrosssum, until the voltage allowance value Pdelta for which the allowable reference range ΔPref is set and a voltage-prediction-value's integration value Ppred intersect to each other, so that the reciprocal 1/Tcrosssum of the sum total value of the times, Tcrosssum, having been calculated until making the intersection is defined as an evaluation value J (from Step S79 through Step S81).

The switching prediction unit 33B searches, in similar procedures to those of Embodiment 8 and to those of Embodiment 9 on the basis of the evaluation value J having been calculated at Step S81, a switching state quantity SWS in the electric power conversion unit 1 and a duration time Tsw of the switching state quantity therein to continue it, and determines a switching state quantity SWS in the electric power conversion unit 1, on the basis of the switching state quantity SWS having been searched for and its duration time Tsw (Step S82, Step S83).

The electric power conversion unit 1 converts DC power into AC power through the switching state quantity SWS in the electric power conversion unit 1 having been determined at Step S83, and controls the rotating electric machine 4 (Step S84).

The power conversion device 100I of Embodiment 10 comprises: the electric power conversion unit 1 for converting DC power of the DC power source 2 into AC power, and for supplying it into the rotating electric machine 4; the busbar voltage detection unit 15 for detecting a busbar voltage Vdc of the DC power source 2; the voltage prediction unit 32 for calculating a voltage prediction value Vpred, on the basis of the busbar voltage Vdc and on that of all-candidate switching state quantities SWSall in the electric power conversion unit 1; the electric current detection unit 17 for detecting as a detected electric current value Iuvw an electric current flowing between the electric power conversion unit 1 and the rotating electric machine 4; the state observation unit 34 for calculating a drive state quantity Mstate indicating a drive status of the rotating electric machine 4, on the basis of a voltage reference value Vref and on that of the detected electric current value Iuvw; the allowable reference range calculation unit 18 for calculating an allowable reference range ΔPref to be set on a voltage reference integration value Pref, on the basis of a drive state quantity Mstate calculated by the state observation unit 34; the switching prediction unit 33B for calculating a switching state quantity SWS of a plurality of switching devices in the electric power conversion unit 1 and a duration time Tsw of the switching state quantity therein to continue it, on the basis of a voltage allowance value Pdelta in which an allowable reference range ΔPref is set on a voltage reference integration value Pref and on that of all-candidate voltage-prediction-values' integration values Ppredall calculated by the voltage prediction unit 32; and the switching output unit 28 for determining a switching state quantity SWS of the plurality of switching devices in the electric power conversion unit 1, on the basis of a switching state quantity SWS calculated by the switching prediction unit 33B and on that of a duration time Tsw of the switching state quantity calculated thereby. In the power conversion device 100I, the switching prediction unit 33B calculates a sum total value of the times, Tcrosssum, covering 60 degrees of phase or more in a voltage reference value until a voltage allowance value Pdelta in which an allowable reference range ΔPref is set on a voltage reference integration value Pref and all-candidate voltage-prediction-values' integration values Ppredall intersect to each other, and outputs a switching state quantity SWS and its duration time Tsw by which the reciprocal 1/Tcrosssum of the sum total value of the times, Tcrosssum, until making the intersection takes on the smallest, so that, in accordance with these outputs, the switching output unit 28 determines a switching state quantity SWS of the plurality of switching devices in the electric power conversion unit 1.

For this reason, the power conversion device 100I of Embodiment 10 changes the allowable reference range ΔPref in conformance with a drive status of the rotating electric machine 4; and thus, the power conversion device 100I can perform the control on the switching state quantity SWS in the electric power conversion unit 1 by giving consideration to a torque ripple of the rotating electric machine 4 and/or a magnetic-flux ripple thereof, and to a loss Mloss thereof in comparison with those of Embodiment 9.

Here, the explanation has been made for an evaluation value J as the reciprocal 1/Tcrosssum of a sum total value of the times, Tcrosssum, until making the intersection; however, as for the evaluation value J, the evaluation value J is defined as division "SWcountsum/Tcrosssum" covering 60 degrees of phase or more in a voltage reference value by also taking into consideration of a sum total value of number of switching changeovers, SWcountsum, on a turn-on in a switching state quantity SWS and on a turn-off therein, whereby the rotating electric machine 4 can be driven so that a switching loss SWloss in the electric power conversion unit 1 is also reduced. In addition, the 60 degrees of phase are given herein; however, even when it is changed to a further extent to give a shorter section or a longer section instead of the 60 degrees of phase, the switching state quantity SWS in the electric power conversion unit 1 and the duration time Tsw therein can be calculated in similar procedures.

Embodiment 11

The explanation will be made hereinafter referring to the drawings for an electrical power conversion device 100J according to Embodiment 11.

Figure 44:
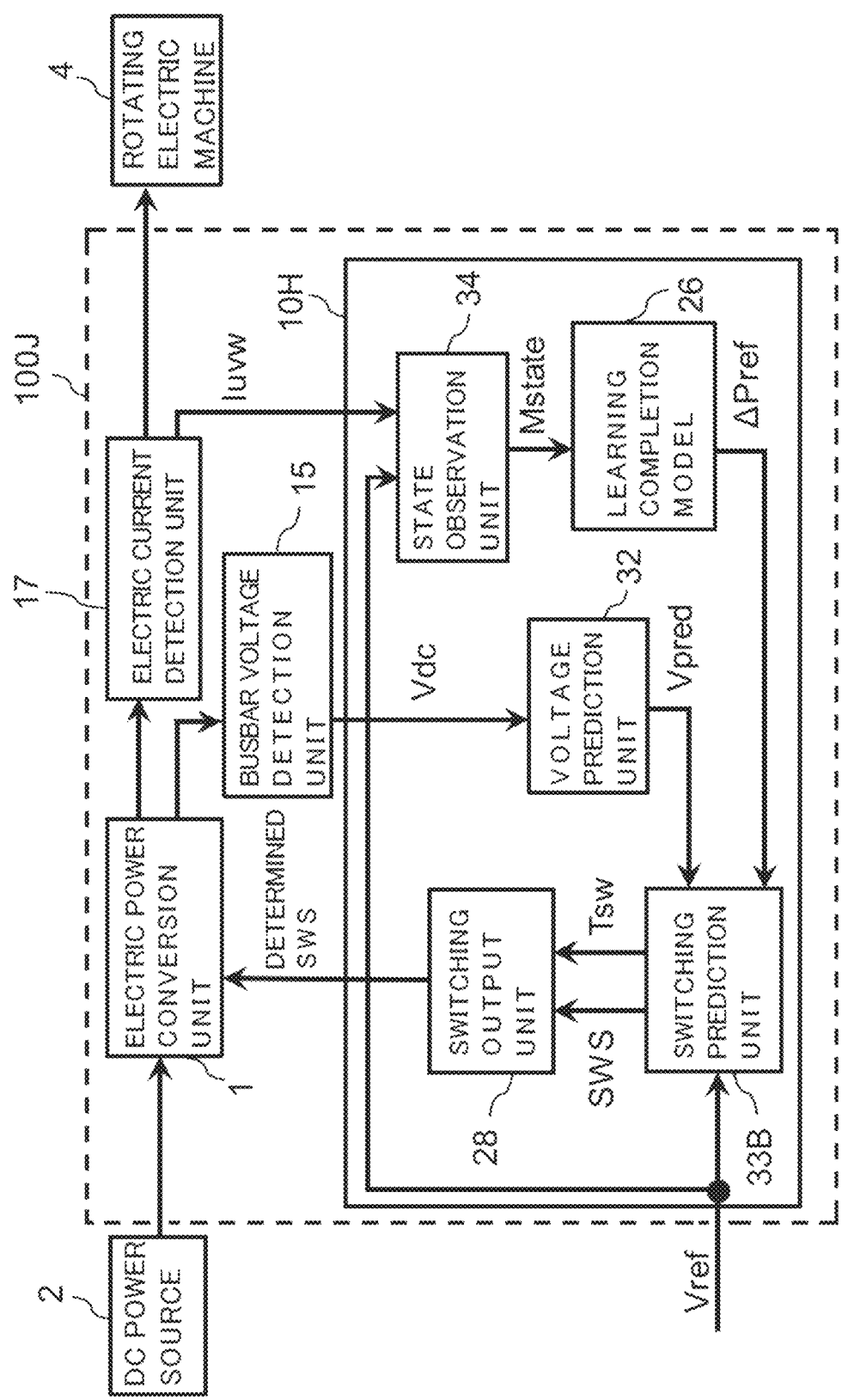
FIG. 44 is a block diagram illustrating a configuration of an electrical power conversion device according to Embodiment 11.

FIG. 44 is a block diagram illustrating a configuration of the power conversion device 100J according to Embodiment 11. As illustrated in FIG. 44, the power conversion device 100J according to Embodiment 11 comprises, in comparison with that according to Embodiment 10, a control device 10H in place of the control device 10G, and also, the control device 10H includes a learning finished or completion model 26 in place of the allowable reference range calculation unit 18 where the control device 10G includes. In accordance with information having been obtained through the machine learning based on training data, the learning completion model 26 makes the reasoning or inference on the basis of a drive state quantity Mstate inputted from the state observation unit 34, and calculates an allowable reference range ΔPref to be set on a voltage reference integration value Pref.

Here, in the calculation of an allowable reference range ΔPref of the power conversion device 100J according to Embodiment 11, the allowable reference range ΔPref is calculated by using the learning completion model 26 which has been acquired by carrying out machine learning, which differs in a point from the allowable reference range calculation unit 18 of the power conversion device 100I according to Embodiment 10. In what follows, the same reference numerals and symbols designate equivalent items or portions for a constituent element(s) having a similar function(s) to Embodiments 1 through 10, and thus their explanation is omitted. And then, the explanation will be made focusing on different points from those of Embodiments 1 through 10.

Figure 45:
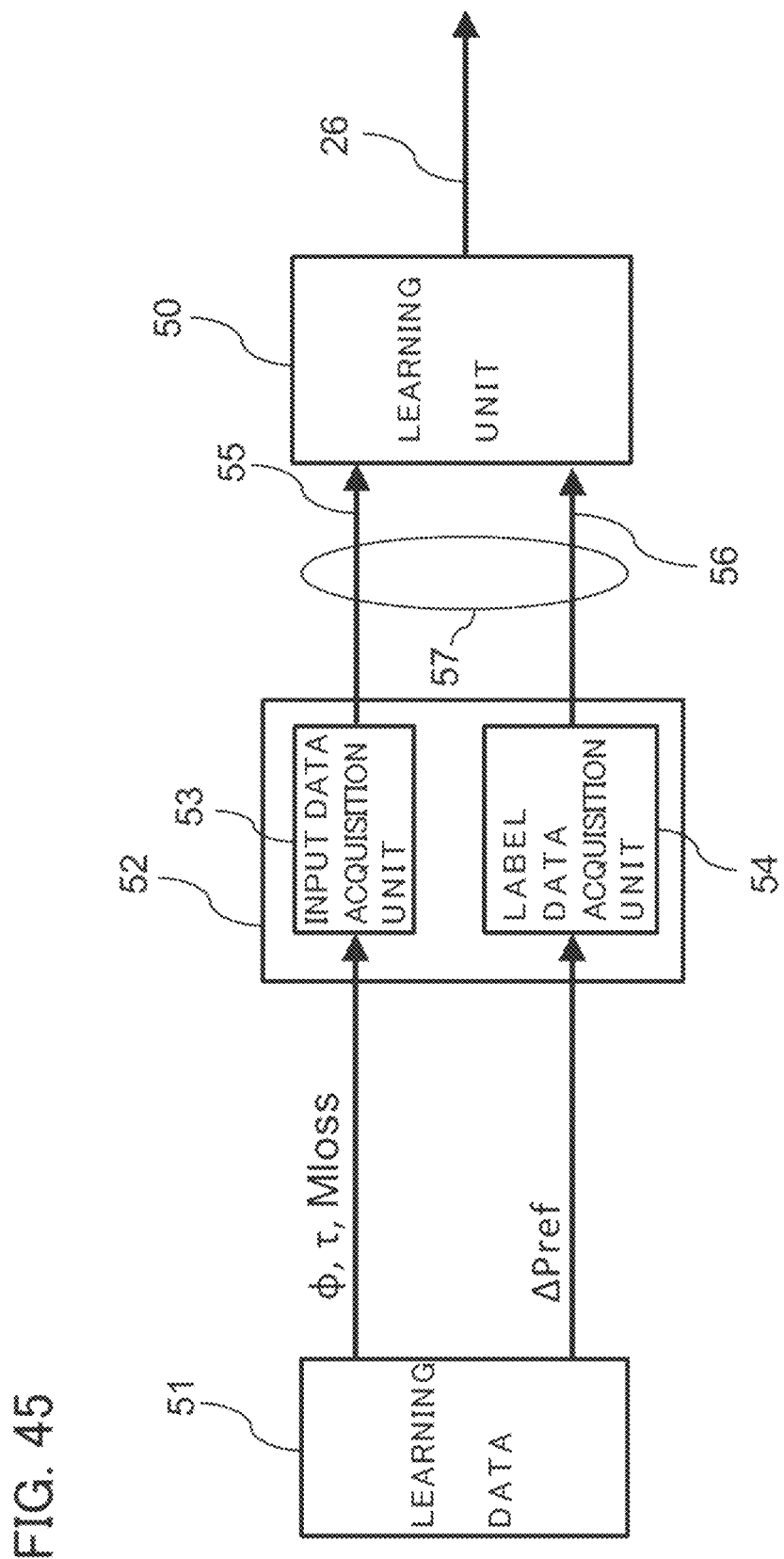
FIG. 45 is a block diagram for explaining a learning completion model and machine learning based on training data in use for the power conversion device according to Embodiment 11.

FIG. 45 is a block diagram for explaining a method of producing a learning completion model, and machine learning based on training data.

As illustrated in FIG. 45, the learning unit 50 performs machine learning based on the training data 57 obtained from the learning data 51 having been prepared in advance, so that the learning completion model is produced.

In the learning data 51, included are magnetic flux φ of the rotating electric machine 4, torque τ thereof, a loss Mloss thereof and an allowable reference range ΔPref to be set on a voltage reference integration value Pref. The learning data 51 stores values calculated according to a scheme for driving the rotating electric machine 4; and so, the learning data 51 may be produced by using, for example, a control scheme using a model predictive control, or a control scheme using selective harmonic elimination, low-order harmonic elimination and/or an optimal pulse pattern, where each of which is a control scheme to achieve reducing a switching loss SWloss in the electric power conversion unit 1 in comparison with a PWM scheme.

The learning data 51 is inputted into the training data acquisition unit 52. The training data acquisition unit 52 includes the input data acquisition unit 53 and the label data acquisition unit 54.

The input data acquisition unit 53 acquires from the learning data 51 magnetic flux φ of the rotating electric machine 4, torque τ thereof and a loss Mloss thereof as the training-use input data 55, and outputs it into the learning unit 50.

The label data acquisition unit 54 acquires from the learning data 51 an allowable reference range ΔPref to be set on a voltage reference integration value Pref as the training-use label data 56, and outputs it into the learning unit 50.

The training data 57 is made of the training-use input data 55 and the training-use label data 56, and so, the learning unit 50 carries out the machine learning based on the training data 57 being the combination of the training-use input data 55 with the training-use label data 56.

Training-data implemented or supervised learning of the machine learning in Embodiment 11 is performed by means of a neural network configured by combining perceptrons. To be specific, magnetic flux φ of the rotating electric machine 4, torque τ thereof and a loss Mloss thereof are defined as the training-use input data 55, and an allowable reference range ΔPref to be set on a voltage reference integration value Pref is defined as the training-use label data 56. And then, the training data 57 according to these pieces of data is given to the neural network, and the learning is repeated in such a manner that, while the weighting for each perceptron is altered, an output of the neural network is to become the same as the training-use label data 56.

In a process of the learning, a weighting value is adjusted so that an error of an output of each perceptron is made smaller by repeatedly performing the processing by means of an error back propagation method. Namely, the training-data supervised learning is in a manner of the learning in which, while a weighting value is adjusted, it is so arranged that the error between the training-use label data 56 and output data of the neural network is to disappear.

In this manner described above, achieved is an accomplished learning completion model for deriving a result by learning the features of the training data 57 and by making inference on the basis of an input(s).

The learning completion model having been produced by means of the machine learning in this manner has the features of the training data 57. For example, when the learning data 51 which is to be transformed into the training data 57 is learning data utilizing a model predictive control, a voltage reference integration value Pref is controlled in the learning completion model at a value equivalent to that when the rotating electric machine 4 is controlled in accordance with the model predictive control; and thus, a switching loss SWloss in the electric power conversion unit 1 can be reduced in comparison with a PWM scheme.

Note that, the neural network in which the learning unit 50 uses for the learning may be configured in three layers; however, the neural network may also be configured further in multiple layers, or may yet be a neural network which carries out machine learning by means of deep learning.

Figure 46:
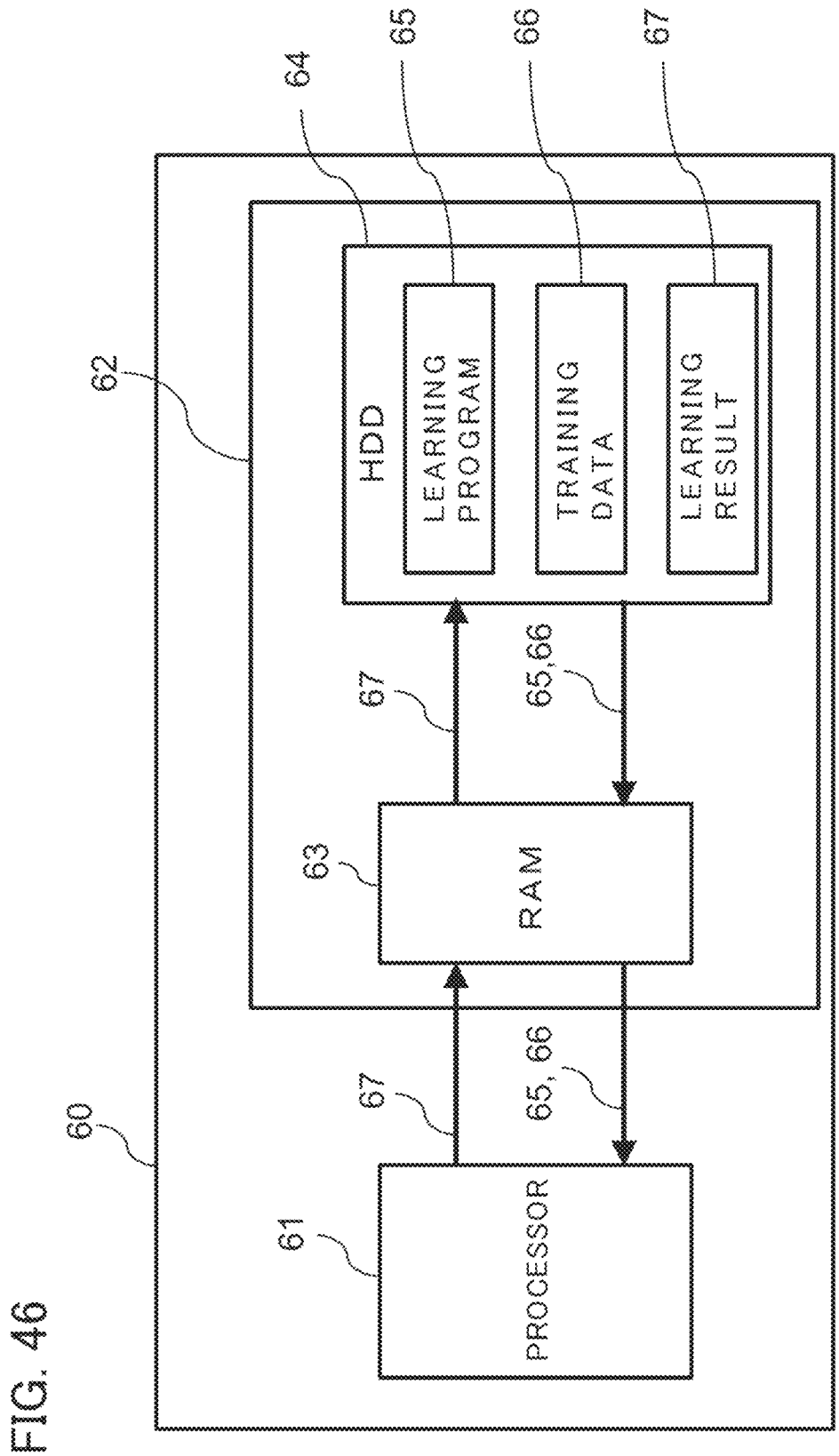
FIG. 46 is a diagram illustrating a hardware configuration for producing the learning completion model in use for the power conversion device according to Embodiment 11.

FIG. 46 is a diagram illustrating a hardware configuration for producing the learning completion model. Machine learning for producing the learning completion model is carried out by the machine learning device 60 which functions as a neural network, and the machine learning device 60 is achieved by means of the hardware configuration illustrated in FIG. 46.

The machine learning device 60 is constituted of the processor 61 and the storage device 62.

The storage device 62 includes, for example, the RAM 63 being a volatile storage device, and, for example, the HDD 64 being a nonvolatile auxiliary storage device. Note that, as the nonvolatile auxiliary storage device, an SSD and/or a flash memory may be used in place of the HDD.

The HDD 64 holds the learning program 65 and the training data 66, and also stores the learning result 67 being produced.

Into the processor 61, various kinds of such learning programs 65 are inputted from the HDD 64 by way of the RAM 63, and the processor executes the various kinds of learning programs 65 inputted thereinto. According to the learning programs 65, training-data supervised learning is executed by the processor 61. Namely, the training data 66 is also inputted into the processor 61 from the HDD 64 by way of the RAM 63, and is learned by following the learning programs 65.

In addition, the processor 61 outputs data of the learning result 67 into the RAM 63 of the storage device 62, and stores the data into the HDD 64 by way of the RAM 63 on an as-needed basis.

The learning programs 65 are programs each including instructions for executing the training-data supervised learning by the processor 61, and those for producing data of a result(s) of machine learning (learning result 67).

The machine learning device 60 as the one described above can be implemented by means of a PC (Personal Computer), a server device, or the like. However, because the amount of calculations is large, it may also be so arranged that, for example, GPUs (Graphics Processing Units) are mounted on the PC, and that, by means of a technology called as GPGPUs (General-Purpose computing on Graphics Processing Units), the GPUs are utilized for calculation processing of the training-data supervised learning, which can be processed at high speed.

Next, the explanation will be hereinafter made for the control operations in the power conversion device 100J according to Embodiment 11.

Figure 47:
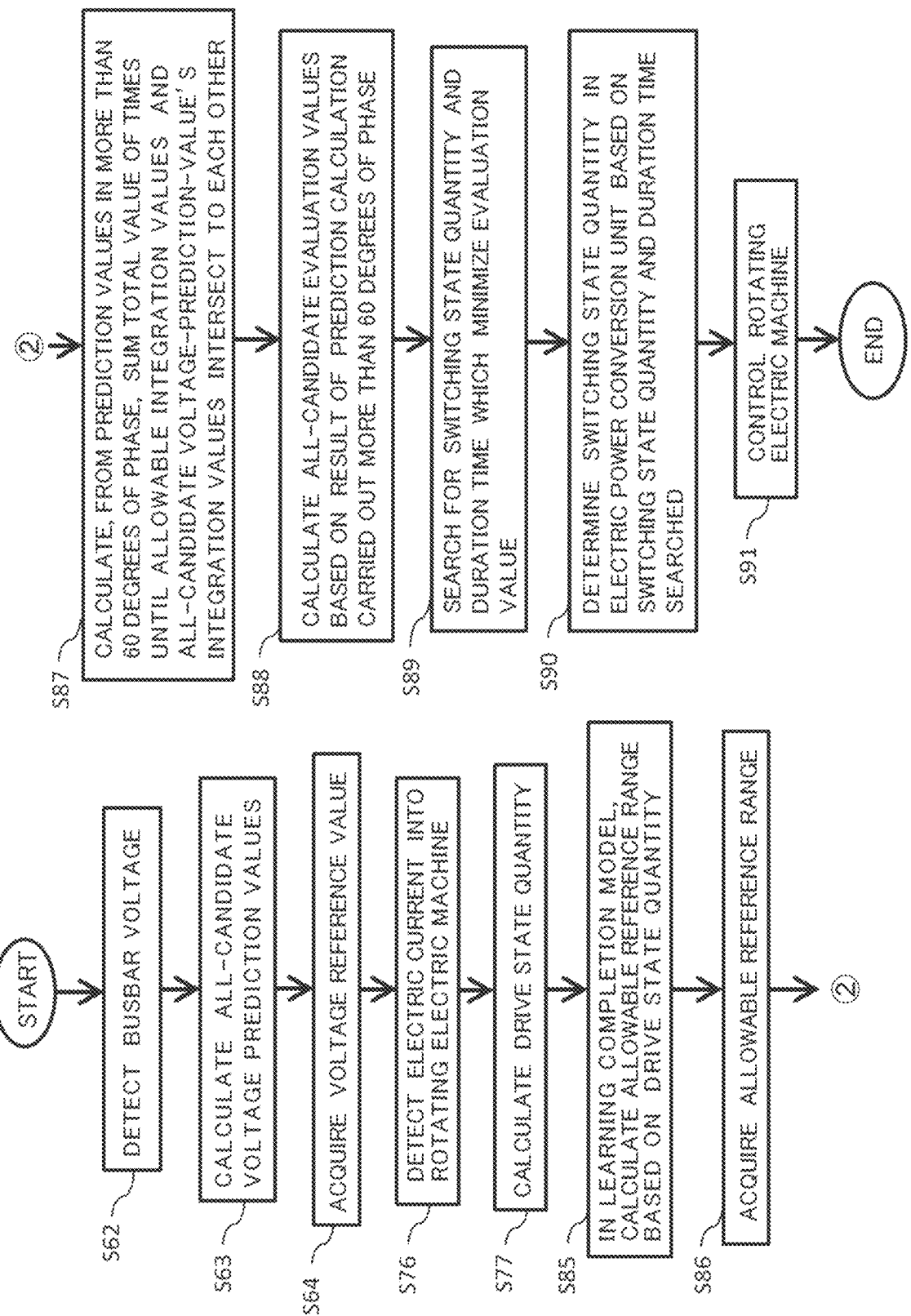
FIG. 47 is a flowchart diagram showing, by way of example, the operations of the power conversion device according to Embodiment 11.

FIG. 47 is a flowchart for explaining the control operations in the power conversion device 100J.

First, the processing is carried out in similar procedures to those of Embodiment 10, the switching prediction unit 33B acquires a voltage reference value Vref, and all-candidate voltage prediction values Vpredall having been calculated by the voltage prediction unit 32 (from Step S62 through Step S64).

Next, the state observation unit 34 calculates, similarly to Embodiment 10 on the basis of the voltage reference value Vref and on that of a detected electric current value Iuvw, magnetic flux φ of the rotating electric machine 4, torque τ thereof and a loss Mloss thereof as a drive state quantity Mstate (Step S76, Step S77).

Subsequently, the learning completion model 26 calculates an allowable reference range ΔPref to be set on a voltage reference integration value Pref, on the basis of the drive state quantity Mstate having been calculated at Step S77 (Step S85).

And then, the switching prediction unit 33B carries out the processing in similar procedures to those of Embodiment 10 on the basis of a voltage allowance value Pdelta in which an allowable reference range ΔPref is set on a voltage reference integration value Pref and on that of all-candidate voltage-prediction-values' integration values Ppredall, and calculates, on the basis of the Pdelta and the Ppredall which are extended to 60 degrees of phase or more in a voltage reference value, a sum total value of the times, Tcrosssum, until the voltage allowance value Pdelta for which the allowable reference range ΔPref is set and a voltage-prediction-value's integration value Ppred intersect to each other, so that the reciprocal 1/Tcrosssum of the sum total value of the times, Tcrosssum, having been calculated until making the intersection is defined as an evaluation value J (from Step S86 through Step S88).

The switching prediction unit 33B searches, in similar procedures to those of Embodiment 8 on the basis of the evaluation value J having been calculated at Step S88, a switching state quantity SWS in the electric power conversion unit 1 and a duration time Tsw of the switching state quantity, and determines a switching state quantity SWS in the electric power conversion unit 1, on the basis of the switching state quantity SWS having been searched for and on that of its duration time Tsw (Step S89, Step S90).

The electric power conversion unit 1 converts, similarly to Embodiment 10, DC power into AC power through the switching state quantity SWS in the electric power conversion unit 1 having been determined at Step S90, and controls the rotating electric machine 4 (Step S91).

The power conversion device 100J of Embodiment 11 comprises: the electric power conversion unit 1 for converting DC power of the DC power source 2 into AC power, and for supplying it into the rotating electric machine 4; the busbar voltage detection unit 15 for detecting a busbar voltage Vdc of the DC power source 2; the voltage prediction unit 32 for calculating a voltage prediction value Vpred, on the basis of the busbar voltage Vdc and on that of all-candidate switching state quantities SWSall in the electric power conversion unit 1; the electric current detection unit 17 for detecting as a detected electric current value Iuvw an electric current flowing between the electric power conversion unit 1 and the rotating electric machine 4; the state observation unit 34 for calculating a drive state quantity Mstate indicating a drive status of the rotating electric machine 4, on the basis of a voltage reference value Vref and on that of the detected electric current value Iuvw; the learning completion model 26 for making, in accordance with information having been obtained through machine learning based on training data, the reasoning or inference on the basis of a drive state quantity Mstate inputted from the state observation unit 34, and for calculating an allowable reference range ΔPref to be set on a voltage reference integration value Pref; the switching prediction unit 33B for calculating a switching state quantity SWS of a plurality of switching devices in the electric power conversion unit 1 and a duration time Tsw of the switching state quantity therein to continue it, on the basis of a voltage allowance value Pdelta in which an allowable reference range ΔPref is set on a voltage reference integration value Pref and on that of all-candidate voltage-prediction-values' integration values Ppredall calculated by the voltage prediction unit 32; and the switching output unit 28 for determining a switching state quantity SWS of the plurality of switching devices in the electric power conversion unit 1, on the basis of a switching state quantity SWS calculated by the switching prediction unit 33B and on that of a duration time Tsw of the switching state quantity calculated thereby. In the power conversion device 100J, the switching prediction unit 33B calculates a sum total value of the times, Tcrosssum, covering 60 degrees of phase or more in a voltage reference value until a voltage allowance value Pdelta in which an allowable reference range ΔPref is set on a voltage reference integration value Pref and all-candidate voltage-prediction-values' integration values Ppredall intersect to each other, and outputs a switching state quantity SWS and a duration time Tsw of the switching state quantity by which the reciprocal 1/Tcrosssum of the sum total value of the times, Tcrosssum, until making the intersection takes on the smallest, so that, in accordance with these outputs, the switching output unit 28 determines a switching state quantity SWS of the plurality of switching devices in the electric power conversion unit 1.

For this reason, the power conversion device 100J of Embodiment 11 produces an allowable reference range ΔPref to be set on a voltage reference integration value Pref, on the basis of a drive state quantity Mstate of the rotating electric machine 4 and based on the learning completion model 26; and thus, in comparison with Embodiment 10, the power conversion device 100J can modify the allowable reference range ΔPref so that the performance can be achieved as the learning data used for producing the learning completion model 26 which is exactly intended for. Therefore, the power conversion device 100J can achieve the performance as a control scheme for controlling the rotating electric machine 4 utilized for producing the learning data which is exactly intended for.

Here, the explanation has been made for an evaluation value J as the reciprocal 1/Tcrosssum of a sum total value of the times, Tcrosssum, until making the intersection; however, as for the evaluation value J, the evaluation value J is defined as division "SWcountsum/Tcrosssum" covering 60 degrees of phase or more in a voltage reference value by also taking into consideration of a sum total value of number of switching changeovers, SWcountsum, on a turn-on in a switching state quantity SWS and on a turn-off therein, whereby the rotating electric machine 4 can be driven so that a switching loss SWloss in the electric power conversion unit 1 is also reduced. In addition, the 60 degrees of phase are given herein; however, even when it is changed to a further extent to give a shorter section or a longer section instead of the 60 degrees of phase, the switching state quantity SWS in the electric power conversion unit 1 and the duration time Tsw therein can be calculated in similar procedures.

Embodiment 12

The explanation will be made hereinafter referring to the drawings for an electrical power conversion device 100K according to Embodiment 12.

Figure 48:
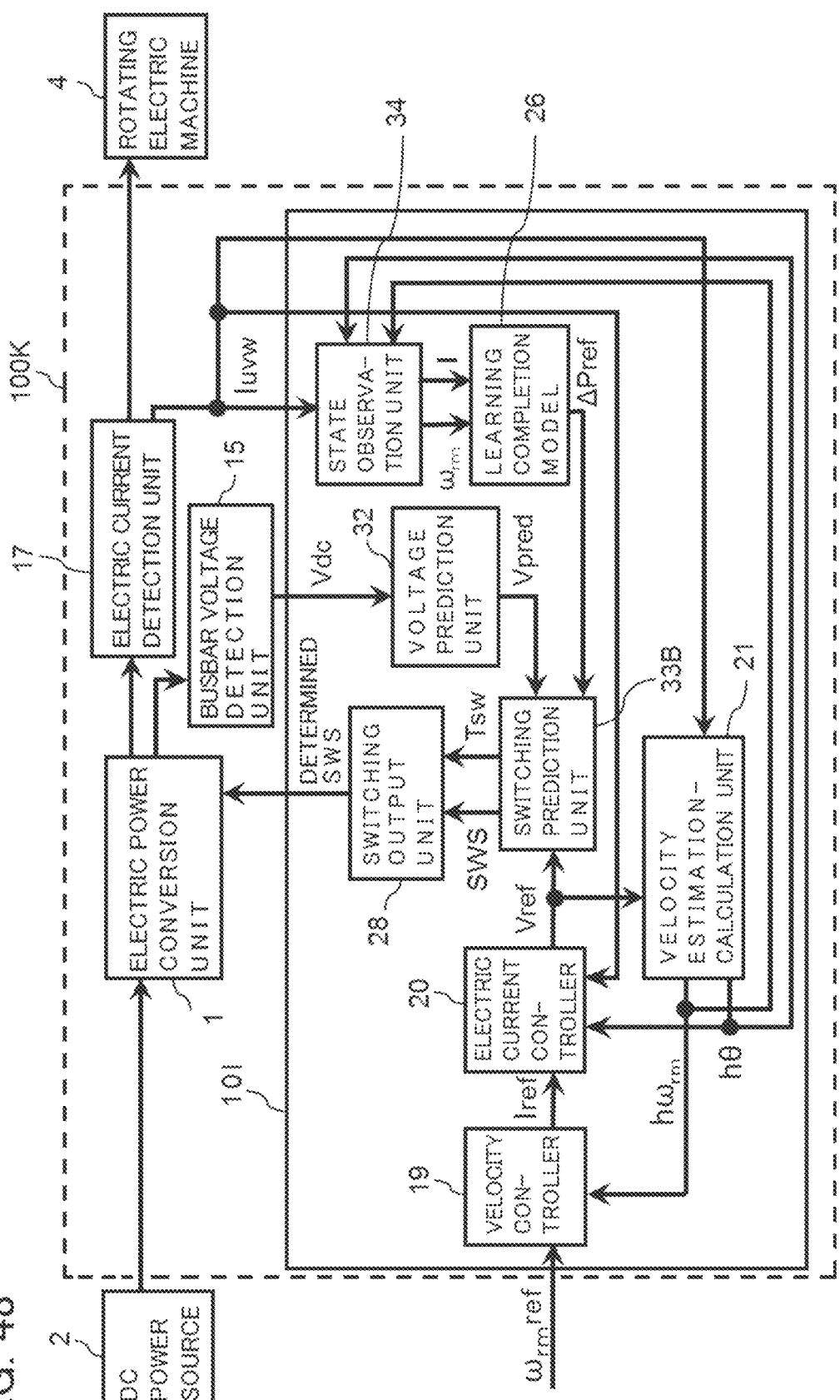
FIG. 48 is a block diagram illustrating a configuration of an electrical power conversion device according to Embodiment 12.

FIG. 48 is a block diagram illustrating a configuration of the power conversion device 100K according to Embodiment 12. As illustrated in FIG. 48, in the power conversion device 100K according to Embodiment 12, a control device 10I of the power conversion device 100K newly includes, in comparison with that of Embodiment 10 and that of Embodiment 11, the velocity controller 19, the electric current controller 20 and the velocity estimation-calculation unit 21, and, in the velocity estimation-calculation unit 21, a mechanism for estimating an angular velocity $\omega_{rm}$ of the rotating electric machine 4 is included. The velocity estimation-calculation unit 21 carries out estimation calculations on an angular velocity $\omega_{rm}$ of the rotating electric machine 4 and a phase θ thereof, on the basis of a voltage reference value Vref and on that of a detected electric current value Iuvw of the electric current detection unit 17.

The calculation of a velocity of the rotating electric machine 4 according to the power conversion device 100K of Embodiment 12 is not carried out by the state observation unit 34 through its calculation, but is carried out by using the velocity estimation-calculation unit 21 that is newly provided for. The power conversion device 100K differs, from the power conversion devices 100I and 100J according to respective Embodiments 10 and 11, in a point in which the power conversion device 100K comprises the velocity estimation-calculation unit 21, or to put it another way, in a point in which the power conversion device 100K comprises an adjustive or adaptive magnetic-flux observer. In what follows, the same reference numerals and symbols designate equivalent items or portions for a constituent element(s) having a similar function(s) to Embodiments 1 through 11, and thus their explanation is omitted. And then, the explanation will be made focusing on different points from those of Embodiments 1 through 11.

Figure 49:
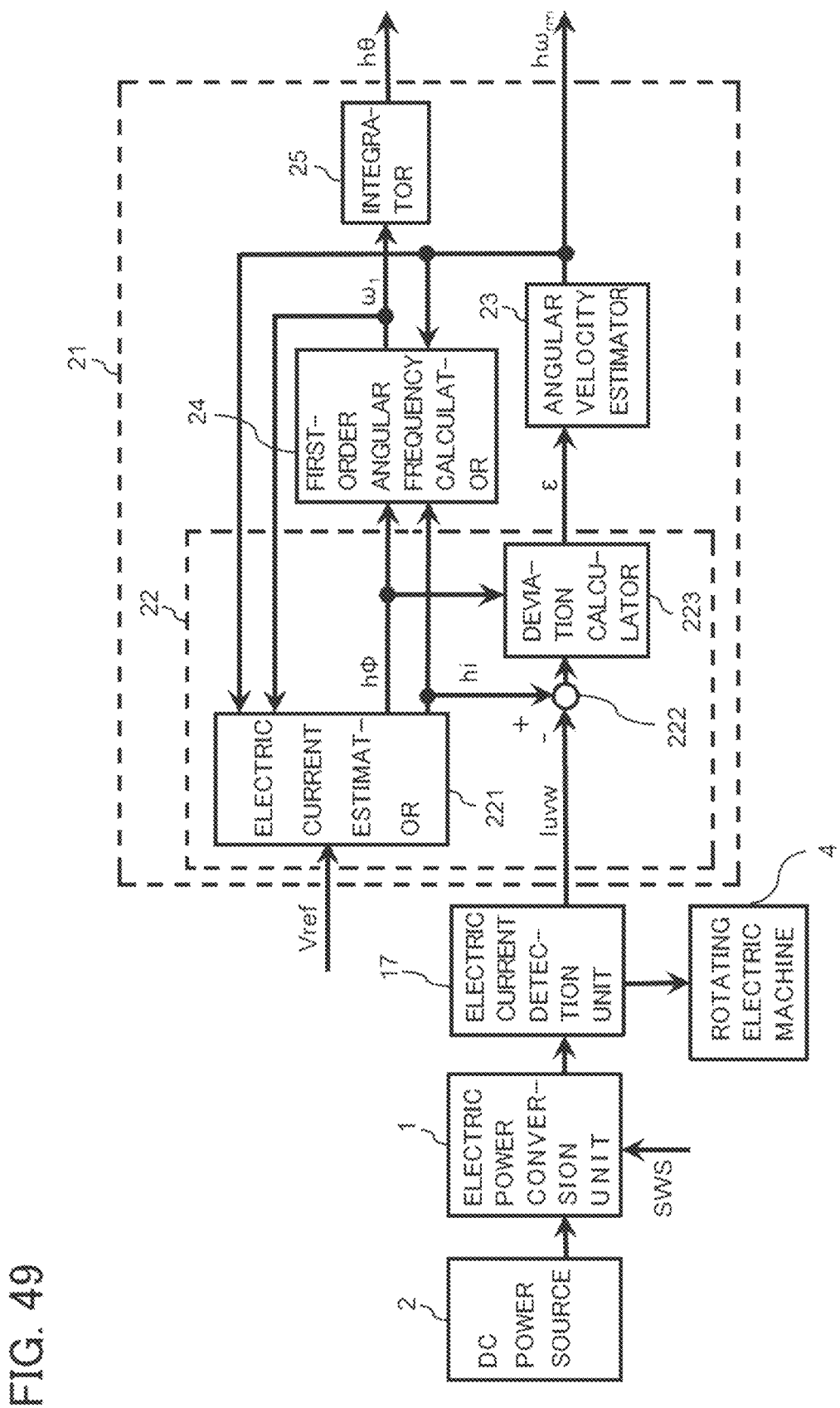
FIG. 49 is a block diagram illustrating a configuration of a velocity estimation-calculation unit of the power conversion device according to Embodiment 12.

FIG. 49 is a block diagram illustrating a configuration of the velocity estimation-calculation unit 21. The velocity estimation-calculation unit 21 is made of an adjustive or adaptive observer, and carries out estimation calculations on a phase θ of the rotating electric machine 4 and on an angular velocity $\omega_{rm}$ thereof. Because the adaptive observer is specified by an equation of states taking on stator's magnetic flux φs of the rotating electric machine 4 and rotor's magnetic flux φr thereof as state parameters, the adaptive observer is also referred to as an adaptive magnetic-flux observer. Note that, as those state parameters, the adaptive observer can also be made by utilizing an extended induced-voltage, an electric current or the like.

The velocity estimation-calculation unit 21 illustrated in FIG. 49 calculates, by using a voltage reference value Vref and a detected electric current value Iuvw, an estimate value of an angular velocity $\omega_{rm}$ of the rotating electric machine 4 (herein, stated as an angular velocity estimate value $h\omega_{rm}$) and an estimate value of a phase 9 of the rotating electric machine 4 (herein, stated as a phase estimate value $h\omega_{rm}$, and outputs an angular velocity estimate value $h\omega_{rm}$ having been calculated and a phase estimate value hθ having been calculated. The voltage reference value Vref is a value calculated by the electric current controller 20 (not shown in the figure), and the detected electric current value Iuvw is a value detected by the electric current detection unit 17. Here, into the velocity estimation-calculation unit 21, the voltage reference value Vref is inputted; however, by detecting a voltage output value Vout outputted from the electric power conversion unit 1 and inputted into the rotating electric machine 4, the voltage output value Vout therefrom may also be used as an input value into the velocity estimation-calculation unit 21.

The velocity estimation-calculation unit 21 includes the model deviation calculation unit 22, the angular velocity estimator 23, the first-order angular frequency calculator 24 and the integrator 25. The model deviation calculation unit 22 calculates a model deviation ε on the basis of a voltage reference value Vref, on that of a detected electric current value Iuvw, on that of a first-order angular frequency $\omega_1$ and on that of angular velocity estimate value $h\omega_{rm}$. The angular velocity estimator 23 calculates an angular velocity estimate value $h\omega_{rm}$ on the basis of the model deviation ε. The first-order angular frequency calculator 24 calculates a first-order angular frequency $\omega_1$ on the basis of an estimate value of magnetic flux φ (herein, stated as a magnetic flux estimate value hφ), on that of an estimate value of an electric current i (herein, stated as an electric current estimate value hi) and on that of the angular velocity estimate value $h\omega_{rm}$. The integrator 25 outputs a phase estimate value hθ by integrating the first-order angular frequency $\omega_1$.

The model deviation calculation unit 22 includes the electric current estimator 221, the subtracter 222 and the deviation calculator 223. The electric current estimator 221 calculates a magnetic flux estimate value hφ and an electric current estimate value hi on the basis of a voltage reference value Vref, on that of a detected electric current value Iuvw, on that of a first-order angular frequency $\omega_1$ and on that of an angular velocity estimate value $h\omega_{rm}$, and outputs the magnetic flux estimate value hφ and the electric current estimate value hi which have been calculated. The subtracter 222 calculates an electric current deviation Ierr by subtracting the detected electric current value Iuvw from the electric current estimate value hi, and outputs the electric current deviation Ierr having been calculated.

The deviation calculator 223 calculates a model deviation ε on the basis of the electric current deviation Ierr having been calculated by the subtracter 222 and on that of the magnetic flux estimate value hφ having been calculated thereby. Here, when an electric current deviation Ierr is expressed as a vector quantity and a magnetic flux estimate value hφ is expressed as a vector quantity, a vector of electric current deviation Ierr is defined as an input, and an orthogonal or quadrature component of the vector of magnetic flux estimate value hφ is extracted as a scalar quantity, so that the scalar quantity being extracted is outputted as the model deviation ε. As a scheme of extracting an orthogonal or quadrature component of the vector of magnetic flux estimate value hφ as the scalar quantity, publicly known technologies are a scheme of performing the transformation of coordinate system for a vector of electric current deviation Ierr onto a rotating orthogonal coordinate system, and a scheme of calculating the magnitude of an outer product value between the vector of electric current deviation Ierr and a vector of magnetic flux estimate value hφ.

The electric current estimator 221 calculates an electric current estimate value hi and a magnetic flux estimate value hφ from equations of states of the rotating electric machine 4. It is presumed herein that the rotating electric machine 4 is an interior permanent magnet synchronous motor of a general type; however, as far as an equation(s) of states can be formulated as an expression(s), such an electric motor of any other kinds as an induction motor, a surface permanent magnet type synchronous motor, a field winding type synchronous motor, or a reluctance-type synchronous motor and the like may also be suitable for. Namely, the electric current estimator 221 can also perform the electric current estimation on the other kinds of electric motors according to a similar method.

In a case in which the rotating electric machine 4 is an interior permanent magnet synchronous motor, equations of states are expressed as given in Expression (1) and Expression (2) described above. Here, symbol "Ld" designates a d-axis inductance; symbol "Lq," a q-axis inductance; symbol "id," a d-axis electric current; symbol "iq," a q-axis electric current; symbol "φds," stator's d-axis magnetic flux; symbol "φqs," stator's q-axis magnetic flux; symbol "φdr," rotor's d-axis magnetic flux; and symbol "^" (an item to which the symbol "^" is added in an upper portion of a character), an estimate value (for example, "hφ" being an estimate value of φ is represented; the same also applies to a case of another estimate value). In addition, symbol "Ra" designates an armature resistance; symbol "vd," a d-axis voltage; symbol "vq," a q-axis voltage; and symbols "$h_{11}$" "$h_{12}$," "$h_{21}$," "$h_{21}$," "$h_{31}$," and "$h_{32}$," observer gains each. Here, a first-order angular frequency $\omega_1$ is given as Expression (3) described above. Note that, in Expression (3), symbol "$h_{41}$" and symbol "$h_{42}$" designate observer gains each.

Expression (1) and Expression (2) described above are expressions given on the basis of usual induced-voltages; however, by adding the modification to Expression (1) and that to Expression (2) described above, similar calculations can also be achieved by expressing in a form of extended induced-voltages. Note that, Expression (1) and Expression (2) described above are mathematical expressions in d-q coordinates on the rotational coordinates; however, similar calculations can also be achieved by performing transformation of coordinate system on Expression (1) and that on Expression (2) described above, and by expressing them by another system of coordinates such as the α-β coordinates of two-phase alternating currents on the static coordinates, or the uvw coordinates of three-phase alternating currents.

In Expression (1), an angular velocity estimate value $h\omega_{rm}$ is included, and so, when the angular velocity estimate value $h\omega_{rm}$ and an actual angular velocity $\omega_{rm}$ are not coincident with each other, an error is caused in an electric current estimate value hi. Here, a model deviation ε is defined as given in Expression (4) described above, and the velocity estimation-calculation unit 21 adjusts the angular velocity estimate value $h\omega_{rm}$ by using the angular velocity estimator 23 so that the model deviation ε takes on zero. The angular velocity estimator 23 is made of, for example, a proportional and integral controller to which an integrator is directly connected.

In accordance with Expression (3) described above, the first-order angular frequency calculator 24 calculates a first-order angular frequency $\omega_1$ on the basis of a magnetic flux estimate value hϕ, on that of an electric current estimate value hi and on that of an angular velocity estimate value $h\omega_{rm}$. The integrator 25 calculates a phase estimate value hθ by integrating the first-order angular frequency $\omega_1$. Advantageous effects of an adaptive observer are points in which the robustness is achieved with respect to variation of the number of interlinkage magnetic-flux lines, and a velocity estimation error in a steady state is not caused. For these reasons, the adaptive observer is capable of estimating at a high level in its performance an angular velocity $\omega_{rm}$ of the rotating electric machine 4.

Next, the explanation will be hereinafter made referring to the drawings for the control operations in the power conversion device 100K according to Embodiment 12.

Figure 50:
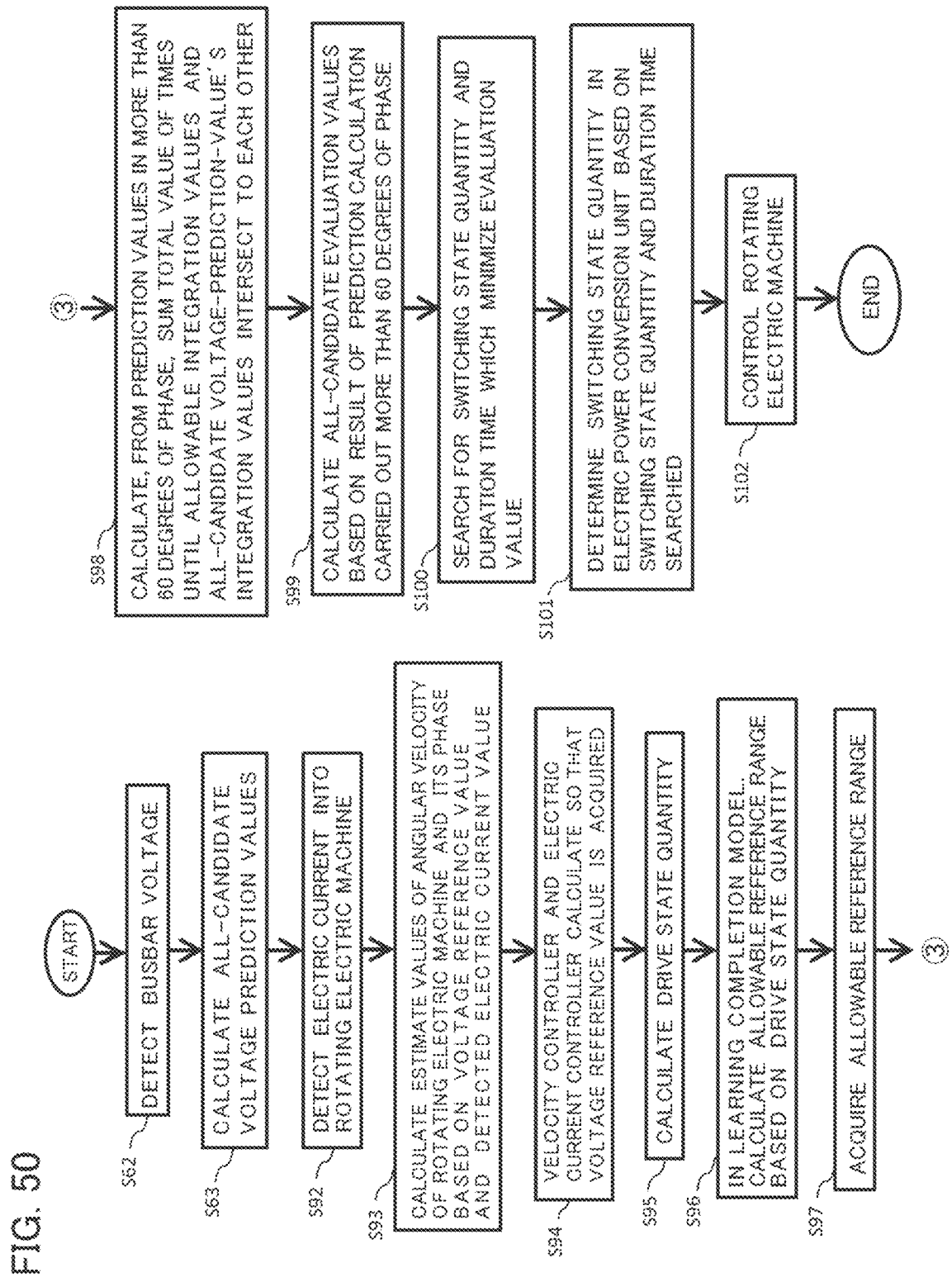
FIG. 50 is a flowchart diagram showing, by way of example, the operations of the power conversion device according to Embodiment 12.

FIG. 50 is a flowchart for explaining the control operations in the power conversion device 100K.

First, the processing is carried out in similar procedures to those of Embodiment 10, the switching prediction unit 33B acquires all-candidate voltage prediction values Vpredall having been calculated by the voltage prediction unit 32 (Step S62, Step S63).

The electric current detection unit 17 detects an electric current flowing into the rotating electric machine 4 similarly to Embodiment 10 (Step S92).

According to the procedures of FIG. 49, the velocity estimation-calculation unit 21 calculates, on the basis of a voltage reference value Vref and on that of a detected electric current value Iuvw, a parameter "$h\omega_{rm}$" being an estimate value of an angular velocity $\omega_{rm}$ of the rotating electric machine 4, and a parameter "hθ" being an estimate value of a phase θ of the rotating electric machine 4 (Step S93).

Next, on the basis of the angular velocity estimate value $h\omega_{rm}$ calculated by the velocity estimation-calculation unit 21, on that of the phase estimate value hθ calculated thereby and on that of the detected electric current value Iuvw, the velocity controller 19 and the electric current controller 20 carry out the calculation processing, so that switching prediction unit 33B acquires a voltage reference value Vref (Step S94).

Next, the state observation unit 34 calculates magnetic flux ϕ of the rotating electric machine 4, torque τ thereof and a loss Mloss thereof as a drive state quantity Mstate thereof, on the basis of the voltage reference value Vref, on that of the detected electric current value Iuvw, on that of the angular velocity estimate value $h\omega_{rm}$ calculated by the velocity estimation-calculation unit 21, on that of the phase estimate value hθ calculated thereby (Step S95).

Subsequently, the learning completion model 26 calculates, similarly to Embodiment 11, an allowable reference range ΔPref to be set on a voltage reference integration value Pref, on the basis of the drive state quantity Mstate having been calculated at Step S95 (Step S96).

And then, the switching prediction unit 33B carries out the processing in similar procedures to those of Embodiment 10 on the basis of a voltage allowance value Pdelta in which the allowable reference range ΔPref is set on the voltage reference integration value Pref and on that of all-candidate voltage-prediction-values' integration values Ppredall, and calculates, on the basis of the Pdelta and the Ppredall which are extended to 60 degrees of phase or more in a voltage reference value, a sum total value of the times, Tcrosssum, until the voltage allowance value Pdelta for which the allowable reference range ΔPref is set and a voltage-prediction-value's integration value Ppred intersect to each other, so that the reciprocal 1/Tcrosssum of the sum total value of the times, Tcrosssum, having been calculated until making the intersection is defined as the evaluation value J (from Step S97 through Step S99).

Next, the switching prediction unit 33B searches, in similar procedures to those of Embodiment 8 on the basis of the evaluation value J having been calculated at Step S99, a switching state quantity SWS in the electric power conversion unit 1 and a duration time Tsw to continue the switching state quantity, and determines a switching state quantity SWS in the electric power conversion unit 1, on the basis of the switching state quantity SWS having been searched for and on that of its duration time Tsw (Step S100, Step S101).

The electric power conversion unit 1 converts, similarly to Embodiment 10, DC power into AC power through the switching state quantities SWS in the electric power conversion unit 1 having been determined at Step S101, and controls the rotating electric machine 4 (Step S102).

The power conversion device 100K of Embodiment 12 comprises: the electric power conversion unit 1 for converting DC power of the DC power source 2 into AC power, and for supplying it into the rotating electric machine 4; the busbar voltage detection unit 15 for detecting a busbar voltage Vdc of the DC power source 2; the voltage prediction unit 32 for calculating a voltage prediction value Vpred, on the basis of the busbar voltage Vdc and on that of all-candidate switching state quantities SWSall in the electric power conversion unit 1; the electric current detection unit 17 for detecting as a detected electric current value Iuvw an electric current flowing between the electric power conversion unit 1 and the rotating electric machine 4; the velocity estimation-calculation unit 21 for calculating an estimate value of an angular velocity $\omega_{rm}$ of the rotating electric machine 4 and that of a phase thereof, on the basis of a voltage reference value Vref and on that of the detected electric current value Iuvw; the velocity controller 19 for calculating an electric current reference value Iref, on the basis of an angular velocity reference value $\theta_{rm}$ref and on that of the angular velocity estimate value $h\omega_{rm}$ calculated by the velocity estimation-calculation unit 21; the electric current controller 20 for calculating the voltage reference value Vref, on the basis of the electric current reference value Iref calculated by the velocity controller 19, on that of the phase estimate value hθ calculated by the velocity estimation-calculation unit 21 and on that of the detected electric current value Iuvw detected by the electric current detection unit 17; the state observation unit 34 for calculating a drive state quantity Mstate indicating a drive status of the rotating electric machine 4, on the basis of the voltage reference value Vref calculated by the electric current controller 20, on that of the detected electric current value Iuvw detected by the electric current detection unit 17, on that of the angular velocity estimate value $h\omega_{rm}$ calculated by the velocity estimation-calculation unit 21 and on that of the phase estimate value hθ calculated thereby; the learning completion model 26 for making, in accordance with information having been obtained through machine learning based on training data, the reasoning or inference on the basis of a drive state quantity Mstate inputted from the state observation unit 34, and for calculating an allowable reference range ΔPref to be set on a voltage reference integration value Pref; the switching prediction unit 33B for calculating a switching state quantity SWS of a plurality of switching devices in the electric power conversion unit 1 and a duration time Tsw of the switching state quantity therein to continue it, on the basis of a voltage allowance value Pdelta in which an allowable reference range ΔPref is set on a voltage reference integration value Pref and on that of all-candidate voltage-prediction-values' integration values Ppredall calculated by the voltage prediction unit 32; and the switching output unit 28 for determining a switching state quantity SWS of the plurality of switching devices in the electric power conversion unit 1, on the basis of a switching state quantity SWS calculated by the switching prediction unit 33B and on that of a duration time Tsw of the switching state quantity calculated thereby. In the power conversion device 100K, the switching prediction unit 33B calculates a sum total value of the times, Tcrosssum, covering 60 degrees of phase or more in a voltage reference value until a voltage allowance value Pdelta in which an allowable reference range ΔPref is set on a voltage reference integration value Pref and all-candidate voltage-prediction-values' integration values Ppredall intersect to each other, and outputs a switching state quantity SWS and a duration time Tsw of the switching state quantity by which the reciprocal 1/Tcrosssum of the sum total value of the times, Tcrosssum, until making the intersection takes on the smallest, so that, in accordance with these outputs, the switching output unit 28 determines a switching state quantity SWS of the plurality of switching devices in the electric power conversion unit 1.

For this reason, the power conversion device 100K of Embodiment 12 estimates an angular velocity $\omega_{rm}$ of the rotating electric machine 4 by the velocity estimation-calculation unit 21 in a high degree of accuracy; and thus, the power conversion device 100K is capable of achieving a velocity control of the rotating electric machine 4 at a higher level in its performance in comparison with Embodiment 11, and, because the accuracy of the angular velocity $\omega_{nm}$ is also enhanced at a time when a drive state quantity Mstate being an input of the learning completion model 26 is calculated, the learning completion model 26 can suitably calculate the allowable reference range ΔPref in conformance with a drive status of the rotating electric machine 4.

Here, the explanation has been made for an evaluation value J as the reciprocal 1/Tcrosssum of a sum total value of the times, Tcrosssum, until making the intersection; however, as for the evaluation value J, the evaluation value J is defined as division "SWcountsum/Tcrosssum" covering 60 degrees of phase or more in a voltage reference value by also taking into consideration of a sum total value of number of switching changeovers, SWcountsum, on a turn-on in a switching state quantity SWS and on a turn-off therein, whereby the rotating electric machine 4 can be driven so that a switching loss SWloss in the electric power conversion unit 1 is also reduced. In addition, the 60 degrees of phase are given herein; however, even when it is changed to a further extent to give a shorter section or a longer section instead of the 60 degrees of phase, the switching state quantity SWS in the electric power conversion unit 1 and the duration time Tsw therein can be calculated in similar procedures.

The configurations described in the embodiments as stated above are merely examples which describe the contents in the disclosure of the application concerned; and so, there arise cases not being exemplified which are included as a case in which other publicly known technologies can be combined with such a configuration(s), and further a case in which limitless modification examples of eliminating part of the configuration and/or changing it can be presumed within the scope without departing from the gist of the technologies disclosed in the disclosure of the application concerned.

EXPLANATION OF NUMERALS AND SYMBOLS

Numeral "1" designates an electric power conversion unit; "2," DC power source; "3," load; "4," rotating electric machine; "10," "10A," "10B," "10C," "10D," "10E," "10F," "10G," "10H," "101," control device; "11," "11A," voltage output calculation unit; "12," integration value calculation unit; "13," "13A," "13B," switching update-determination unit; "14," "14A," "14B," switching determination table; "15," busbar voltage detection unit; "16," offset adjustment unit; "17," electric current detection unit; "18," allowable reference range calculation unit; "19," velocity controller; "20," electric current controller; "21," velocity estimation-calculation unit; "22," model deviation calculation unit; "23," angular velocity estimator; "24," first-order angular frequency calculator; "25," integrator; "26," learning completion model; "27," switching calculation unit; "28," switching output unit; "29," harmonics processing unit; "30," harmonic current controller; "31," low frequency extraction unit; "32," voltage prediction unit; "33," "33A," "33B," switching prediction unit; "34," state observation unit; "40," processor; "41," storage device; "42," control program; "43," processing data; "50," learning unit; "51," learning data; "52," training data acquisition unit; "53," input data acquisition unit; "54," label data acquisition unit; "55," training-use input data; "56," training-use label data; "57," training data; "60," machine learning device; "61," processor; "62," storage device; "63," RAM; "64," HDD; "65," learning program; "66," training data; "67," learning result; "100," "100A," "100B," "100C," "100D," "100E," "100F," "100G," "100H," "100I," "100J," "100K," power conversion device; "221," electric current estimator; "222," subtracter; "223," deviation calculator; and "300," switching determination unit. Symbol "C" designates an initial value; "D," diode; "Ifund," electric-current low frequency value; "Iref," electric current reference value; "Ithd," harmonic current; "Ithdref," harmonic current reference value; "Iuvw," detected electric current value; "Iαβ," two-phase current; "J," evaluation value; "Mloss," loss; "Mstate," drive state quantity; "Pdelta," voltage allowance value; "Perr," integration deviation (difference between Pref and Ppred); "Perrsum," sum total value of integration deviations; "Plower," lower limit value of voltage allowance value; "Pref," voltage reference integration value; "Pout," voltage output integration value; "Ppred," voltage-prediction-value's integration value; "Ppredall," all-candidate voltage-prediction-values' integration values; "Pupper," upper limit value of voltage allowance value; "Q1" through "Q6," switching devices each; "SetSW," setting signal; "SWcount," number of switching changeovers; "SWcountsum," sum total value of number of switching changeovers; "SWloss," switching loss; "SWS," switching state quantity; "SWSall," all-candidate switching state quantity; "SWSn," switching state quantity (n-th order switching state quantity (symbol "n" is a positive number)); "SWP," switching pattern; "Tcross," intersection reach time; "Tsw," "T1sw," "T2sw," "T3sw," duration time; "Vdc," busbar voltage; "Vout," voltage output value (multi-phase voltage output value); "Vpred," voltage prediction value; "Vpredall," all-candidate voltage prediction values; "Vref," voltage reference value (multi-phase voltage reference value); "Vthd," harmonic voltage component; "hi," electric current estimate value; "hθ," phase estimate value; "hϕ," magnetic flux estimate value; "hωrm," angular velocity estimate value; "ΔPref," allowable reference range; "E," model deviation; "θ," phase (phase of rotating electric machine); "τ," torque; "ϕ," magnetic flux; "ϕαβ," two-phase magnetic flux; "ω₁," first-order angular frequency; "ωrm," angular velocity; and "ωrmref," angular velocity reference value.

The invention claimed is:

1. A power conversion device, comprising:
   an electric power conversion circuitry including a plurality of switching devices, for converting direct-current power into alternating-current power in accordance with a switching state quantity of the plurality of switching devices each, and for supplying the alternating-current power into a load;
   a voltage output calculation device for calculating a voltage output value on a multi-phase alternating current supplied from the electric power conversion circuitry into the load, on a basis of a switching state quantity in the electric power conversion circuitry;
   an integration value calculation device for acquiring through calculation a voltage reference integration value and a voltage output integration value by integrating a voltage reference value on the multi-phase alternating current supplied from the electric power conversion circuitry and a voltage output value on a multi-phase alternating current calculated by said voltage output calculation device, respectively; and
   a switching determination device for determining a switching state quantity in the electric power conversion circuitry by using the voltage reference integration value and the voltage output integration value, and for outputting the switching state quantity being determined.

2. The power conversion device as set forth in claim 1, wherein
   the switching determination device comprises:
   a switching calculation device for outputting a setting signal for determining a switching state quantity in the electric power conversion circuitry, on a basis of the voltage reference integration value, on that of the voltage output integration value and on that of an allowable reference range being externally inputted to the switching calculation device; and
   a switching output device for determining a switching state quantity in the electric power conversion circuitry on a basis of the setting signal.

3. The power conversion device as set forth in claim 2, wherein the switching calculation device calculates a switching state quantity in the electric power conversion circuitry in accordance with relationships among the voltage reference integration value, the voltage output integration value and the allowable reference range.

4. The power conversion device as set forth in claim 2, wherein the switching calculation device outputs as the setting signal a switching state quantity in the electric power conversion circuitry.

5. The power conversion device as set forth in claim 2, wherein the switching calculation device outputs as the setting signal a switching state quantity in the electric power conversion circuitry and a duration time of the switching state quantity therein.

6. The power conversion device as set forth in claim 2, wherein
   the switching calculation device calculates, at a time of continuously using a switching state quantity at a current-time, a duration time of switching state quantity at the current-time until the voltage output integration value intersects onto a limit value of the allowable reference range being set on the voltage reference integration value each other;
   the switching calculation device calculates a switching state quantity on a basis of a phase making the intersection onto the limit value, on that of a switching determination table for determining the switching state quantity, and on that of either one of a phase of voltage reference integration value at the time of making the intersection and a phase of voltage output integration value thereat; and
   the switching calculation device outputs as the setting signal a duration time of switching state quantity at the current-time making the intersection and the switching state quantity being calculated thereat.

7. The power conversion device as set forth in claim 2, wherein
   the switching calculation device calculates, at a time of continuously using a switching state quantity at a current-time, a first duration time of switching state quantity at the current-time until the voltage output integration value intersects onto a limit value of the allowable reference range being set on the voltage reference integration value each other;
   the switching calculation device calculates a second duration time of switching state quantity from a time-point having made the intersection onward until a time-pint when the voltage output integration value next intersects onto a limit value of the allowable reference range each other, on a basis of a plurality of switching state quantities each;
   the switching calculation device selects a first switching state quantity by which the second duration time being calculated becomes a longest; and
   the switching calculation device outputs as the setting signal the first duration time and the first switching state quantity.

8. The power conversion device as set forth in claim 7, wherein
   the switching calculation device selects the first switching state quantity by which the second duration time being calculated becomes a longest;
   the switching calculation device calculates, by changing over the first switching state quantity after the voltage output integration value intersects onto a limit value of the allowable reference range each other, a third duration time of switching state quantity until the voltage output integration value next intersects onto a limit value of the allowable reference range each other, on a basis of a plurality of switching state quantities each;
   the switching calculation device selects a second switching state quantity by which the third duration time being calculated becomes a longest; and
   the switching calculation device outputs as the setting signal respective combinations between the first duration time being calculated and the second duration time being calculated, and the first switching state quantity being selected and the second switching state quantity being selected.

9. The power conversion device as set forth in claim 7, wherein the switching calculation device calculates up to an N-th switching state quantity in which an (N+1)-th duration time of switching state quantity becomes a longest, and outputs respective combinations between the number N of duration times and the number N of switching state quantities.

10. The power conversion device as set forth in claim 7, wherein
the switching calculation device selects, at a time when a switching state quantity is selected from the plurality of switching state quantities each, a switching state quantity by which duration times of plurality of switching state quantities become a longest; or
the switching calculation device selects, at a time when a switching state quantity is selected from the plurality of switching state quantities each, a switching state quantity by which, on a basis of a number of switching changeovers in each phase on the plurality of switching state quantities and on that of duration times of plurality of switching state quantities thereof,
an evaluation value acquired by dividing a sum total value of the number of switching changeovers in each phase by a sum total value of the duration times
takes on a smallest evaluation value based thereon.

11. The power conversion device as set forth in claim 2, wherein
the load includes a rotating electric machine, the power conversion device further comprising:
an electric current detection device for detecting an electric current flowing into the rotating electric machine as a detected electric current value, and the power conversion device yet further comprising:
a harmonics processing device for calculating electric-current harmonics data being a harmonic component of a detected electric current value being detected by the electric current detection device;
a harmonic current controller for calculating the allowable reference range, on a basis of electric-current harmonics data calculated by the harmonics processing device and on that of a harmonic current reference value;
a low frequency extraction device for calculating an electric-current low frequency value being a low frequency component of a detected electric current value being detected by the electric current detection device; and
an electric current controller for calculating a voltage reference value on a multi-phase alternating current supplied from the electric power conversion circuitry, on a basis of an electric-current low frequency value calculated by the low frequency extraction device and on that of an electric current reference value.

12. The power conversion device as set forth in claim 11, wherein the low frequency extraction device detects detected electric current values being detected by the electric current detection device at two or more points, and calculates the electric-current low frequency value, on a basis of the detected electric current values being detected at the two or more points.

13. The power conversion device as set forth in claim 11, wherein the harmonics processing device detects detected electric current values being detected by the electric current detection device at two or more points, and calculates the electric-current harmonics data, on a basis of the detected electric current values being detected at the two or more points.

14. The power conversion device as set forth in claim 1, wherein the switching determination device calculates a switching state quantity in the electric power conversion circuitry, on a basis of the voltage reference integration value whose offset is adjusted and on that of the voltage output integration value whose offset is adjusted.

15. The power conversion device as set forth in claim 1, wherein said voltage output calculation device calculates a voltage output value on a multi-phase alternating current supplied from the electric power conversion circuitry, on a basis of a direct-current power source voltage of a direct-current power source and on that of a switching state quantity in the electric power conversion circuitry.

16. The power conversion device as set forth in claim 3, wherein the switching calculation device outputs as the setting signal a switching state quantity in the electric power conversion circuitry.

17. The power conversion device as set forth in claim 3, wherein the switching calculation device outputs as the setting signal a switching state quantity in the electric power conversion circuitry and a duration time of the switching state quantity therein.

18. The power conversion device as set forth in claim 4, wherein the switching calculation device outputs as the setting signal a switching state quantity in the electric power conversion circuitry and a duration time of the switching state quantity therein.

19. The power conversion device as set forth in claim 16, wherein the switching calculation device outputs as the setting signal a switching state quantity in the electric power conversion circuitry and a duration time of the switching state quantity therein.

20. The power conversion device as set forth in claim 3, wherein
the switching calculation device calculates, at a time of continuously using a switching state quantity at a current-time, a duration time of switching state quantity at the current-time until the voltage output integration value intersects onto a limit value of the allowable reference range being set on the voltage reference integration value each other;
the switching calculation device calculates a switching state quantity on a basis of a phase making the intersection onto the limit value, on that of a switching determination table for determining the switching state quantity, and on that of either one of a phase of voltage reference integration value at the time of making the intersection and a phase of voltage output integration value thereat; and
the switching calculation device outputs as the setting signal a duration time of switching state quantity at the current-time making the intersection and the switching state quantity being calculated thereat.

* * * * *